US010710802B2

(12) United States Patent
Grosse et al.

(10) Patent No.: US 10,710,802 B2
(45) Date of Patent: Jul. 14, 2020

(54) AUTOMATED STORAGE SYSTEM AND METHOD FOR STORING SUSPENDED GOODS IN SAID STORAGE SYSTEM

(71) Applicant: TGW Mechanics GmbH, Wels (AT)

(72) Inventors: Eric Grosse, Langen (DE); Martin Rausch, Gmunden (AT); Alfred Sadlauer, Leonding (AT); Johannes Schauer, St. Marienkirchen an der Polsenz (AT)

(73) Assignee: TGW Mechanics GmbH, Wels (AT)

( * ) Notice: Subject to any disclaimer, the term of this patent is extended or adjusted under 35 U.S.C. 154(b) by 204 days.

(21) Appl. No.: 15/766,135

(22) PCT Filed: Oct. 5, 2016

(86) PCT No.: PCT/EP2016/073794
§ 371 (c)(1),
(2) Date: Aug. 6, 2018

(87) PCT Pub. No.: WO2017/060301
PCT Pub. Date: Apr. 13, 2017

(65) Prior Publication Data
US 2018/0346242 A1 Dec. 6, 2018

(30) Foreign Application Priority Data
Oct. 6, 2015 (AT) .............................. A 50849/2015

(51) Int. Cl.
*B65G 1/04* (2006.01)
(52) U.S. Cl.
CPC .... *B65G 1/0414* (2013.01); *B65G 2201/0229* (2013.01)
(58) Field of Classification Search
CPC .... B65G 1/0414; B65G 1/0457; B65G 1/026; B65G 1/0435; B65G 2201/0229
(Continued)

(56) References Cited

U.S. PATENT DOCUMENTS 3,756,433 A 9/1973 Richins
4,717,305 A * 1/1988 Edwards .............. B65G 1/0457
198/375
(Continued)

FOREIGN PATENT DOCUMENTS

AT 513 930 A1 8/2014
AT 516410 B1 5/2016
(Continued)

OTHER PUBLICATIONS

International Search Report of PCT/EP2016/073794, dated Mar. 30, 2017.

*Primary Examiner* — Glenn F Myers
(74) *Attorney, Agent, or Firm* — Collard & Roe, P.C.

(57) ABSTRACT

The invention relates to a method for storing hanging goods (2) in an automated storage system (1), comprising a stationary storage rack (5) with storing regions for the hanging goods (2) in storage levels (13) lying one above the other, and at least one goods transport device (7) having a base frame (30), which is displaceable in a first direction in front of the storage rack (5), and at least one storage and removal device (33) having a goods displacement means (42) which is displaceable relative to the base frame in a second direction perpendicular to the first direction. The hanging goods are moved by the goods displacement means between a goods receiving carrier (12) associated with one storage region and a goods receiving carrier (34) associated with the goods transport device, the goods receiving carrier (12) remaining in the storage regions in the storage rack (5). The invention further relates to an automated storage system for carrying out said method.

35 Claims, 27 Drawing Sheets

Figure 1:
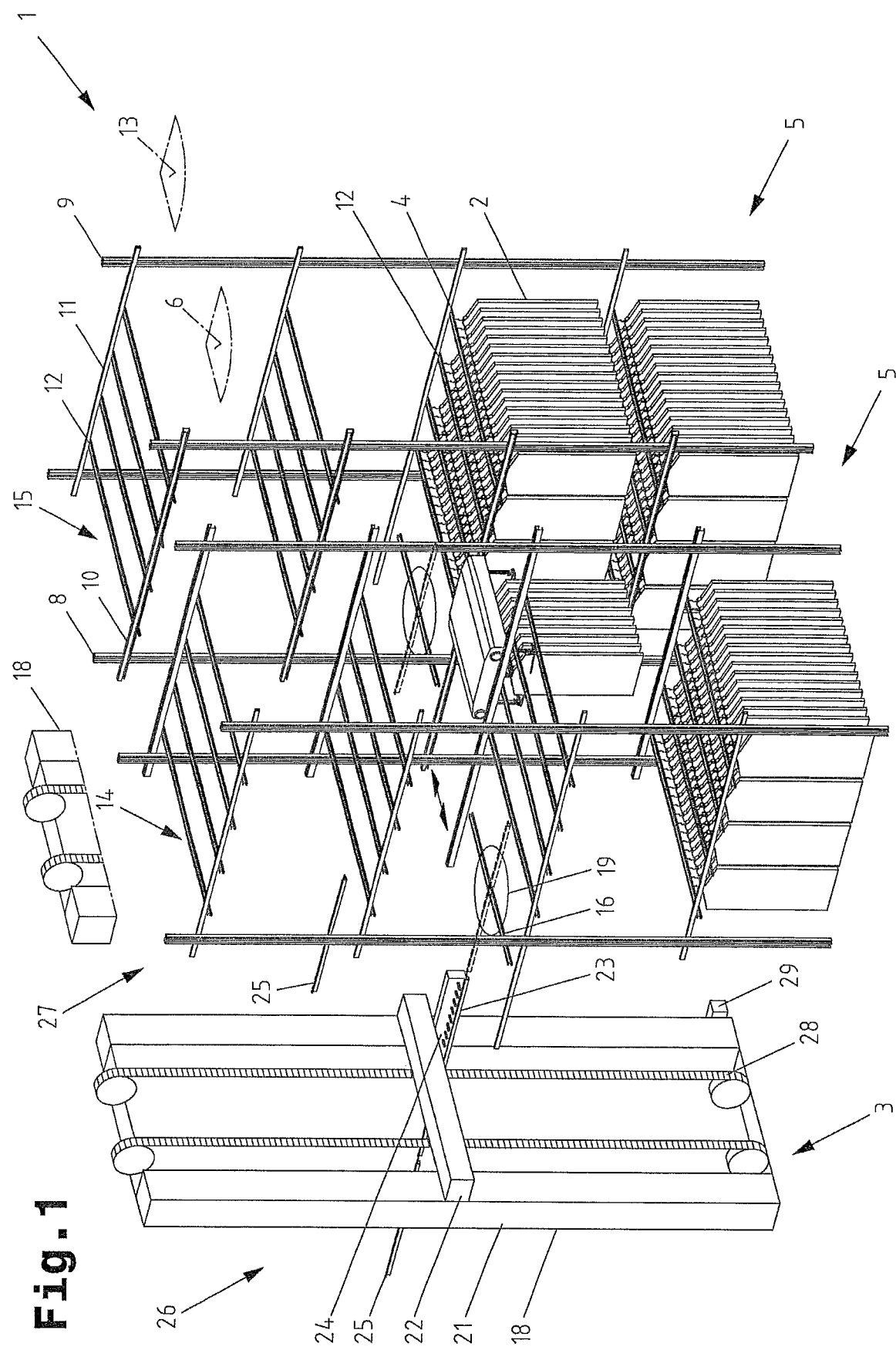

(58) Field of Classification Search
USPC .................. 414/266, 268, 280, 282; 104/129
See application file for complete search history.

(56) References Cited

U.S. PATENT DOCUMENTS

| | | | |
|---|---|---|---|
| 4,972,778 A * | 11/1990 | Suominen | B65G 1/0414 |
| | | | 104/183 |
| 6,558,102 B2 | 5/2003 | Klein et al. | |
| 8,776,981 B2 | 7/2014 | Gardelle et al. | |
| 9,169,068 B2 | 10/2015 | Wend et al. | |
| 9,764,900 B2 | 9/2017 | Grosse | |
| 2001/0051085 A1 | 12/2001 | Klein et al. | |
| 2003/0223850 A1 | 12/2003 | Hendriks et al. | |
| 2010/0316468 A1 | 12/2010 | Lert et al. | |
| 2012/0001047 A1 | 1/2012 | Spichtig et al. | |
| 2014/0037403 A1* | 2/2014 | Wend | B65G 1/026 |
| | | | 414/266 |
| 2015/0274446 A1 | 10/2015 | Wend | |

FOREIGN PATENT DOCUMENTS

| | | |
|---|---|---|
| CN | 201165414 Y | 12/2008 |
| CN | 102625773 A | 8/2012 |
| CN | 103648928 A | 3/2014 |
| CN | 204038312 U | 12/2014 |
| DE | 36 39 468 A1 | 5/1988 |
| DE | 37 35 607 C1 | 5/1989 |
| DE | 195 02 003 A1 | 8/1995 |
| DE | 102 14 471 A1 | 11/2002 |
| DE | 20 2004 002 337 U1 | 5/2004 |
| DE | 10 2008 018 310 A1 | 10/2009 |
| DE | 10 2008 035 651 A1 | 2/2010 |
| EP | 1 972 577 A1 | 9/2008 |
| EP | 2 130 789 A1 | 12/2009 |
| EP | 2 419 365 B1 | 6/2013 |
| EP | 2 692 667 A1 | 2/2014 |
| EP | 2 923 970 A1 | 9/2015 |
| FR | 2 723 689 A1 | 2/1996 |
| GB | 2 255 971 B | 12/1993 |
| GB | 2 286 578 A | 8/1995 |
| JP | S62-244805 A | 10/1987 |
| JP | H07-330116 A | 12/1995 |
| WO | 91/04931 A1 | 4/1991 |
| WO | 2010/118412 A1 | 10/2010 |
| WO | 2012/106745 A1 | 8/2012 |
| WO | 2015/027261 A1 | 3/2015 |

* cited by examiner

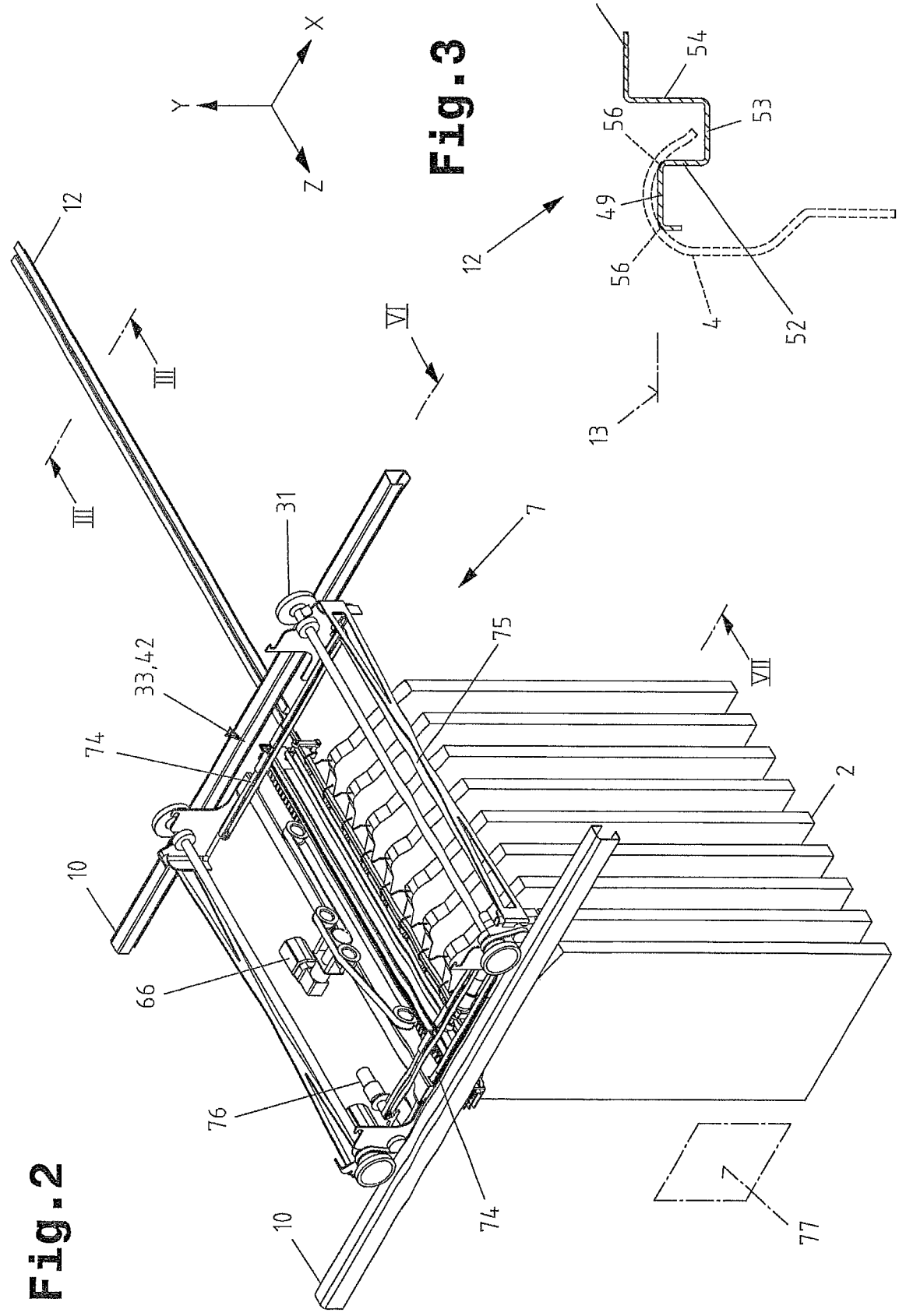

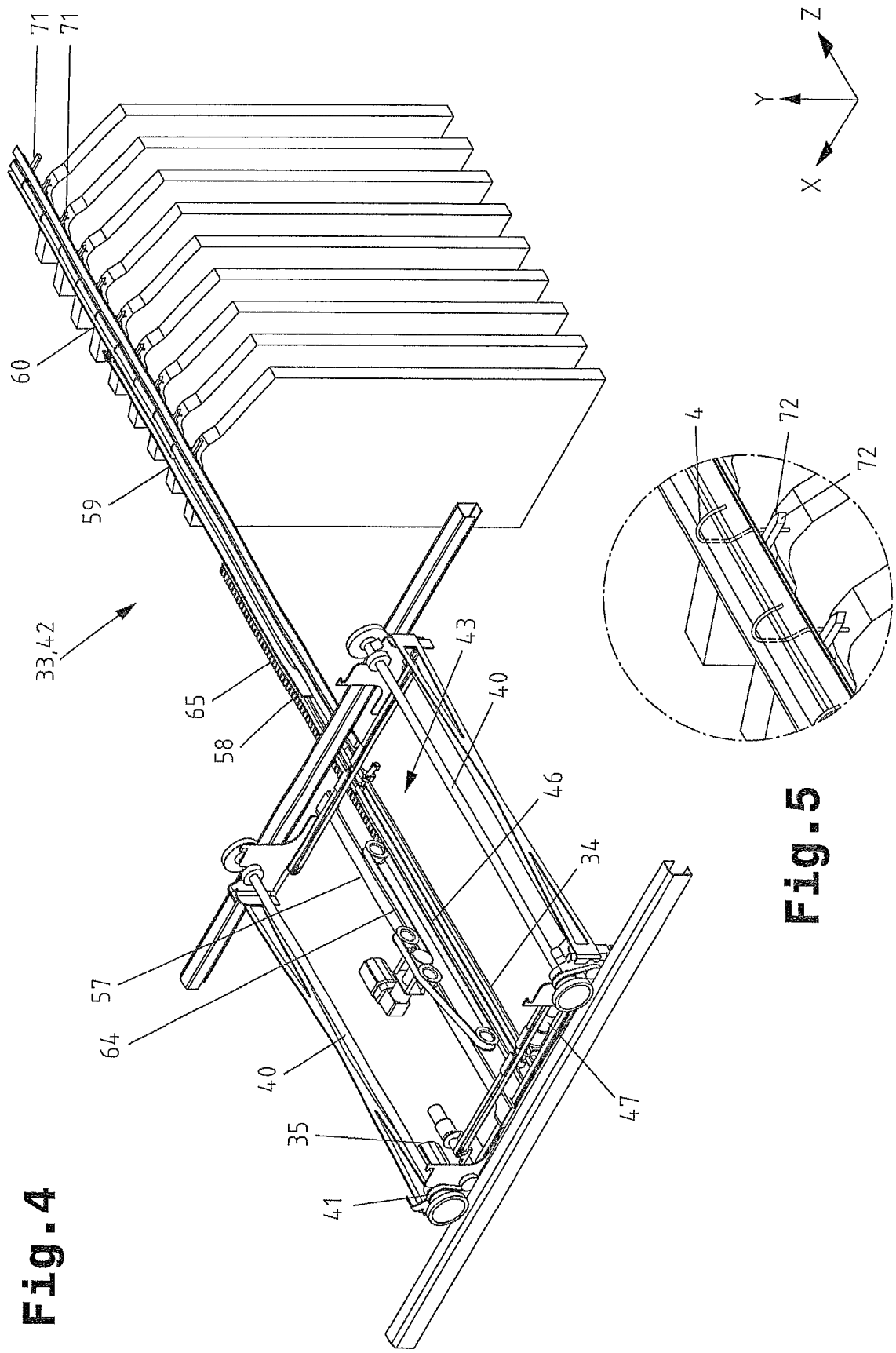

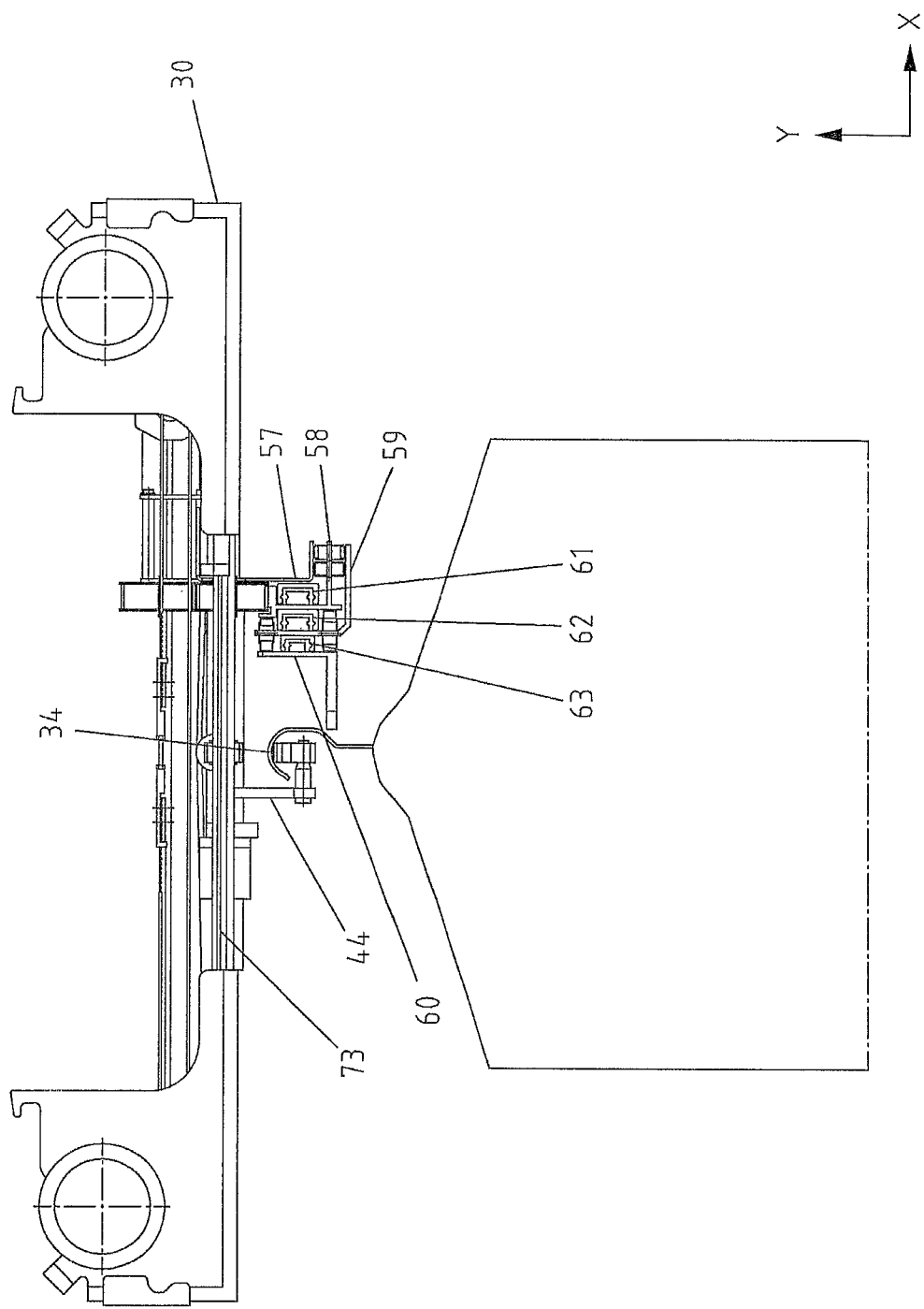

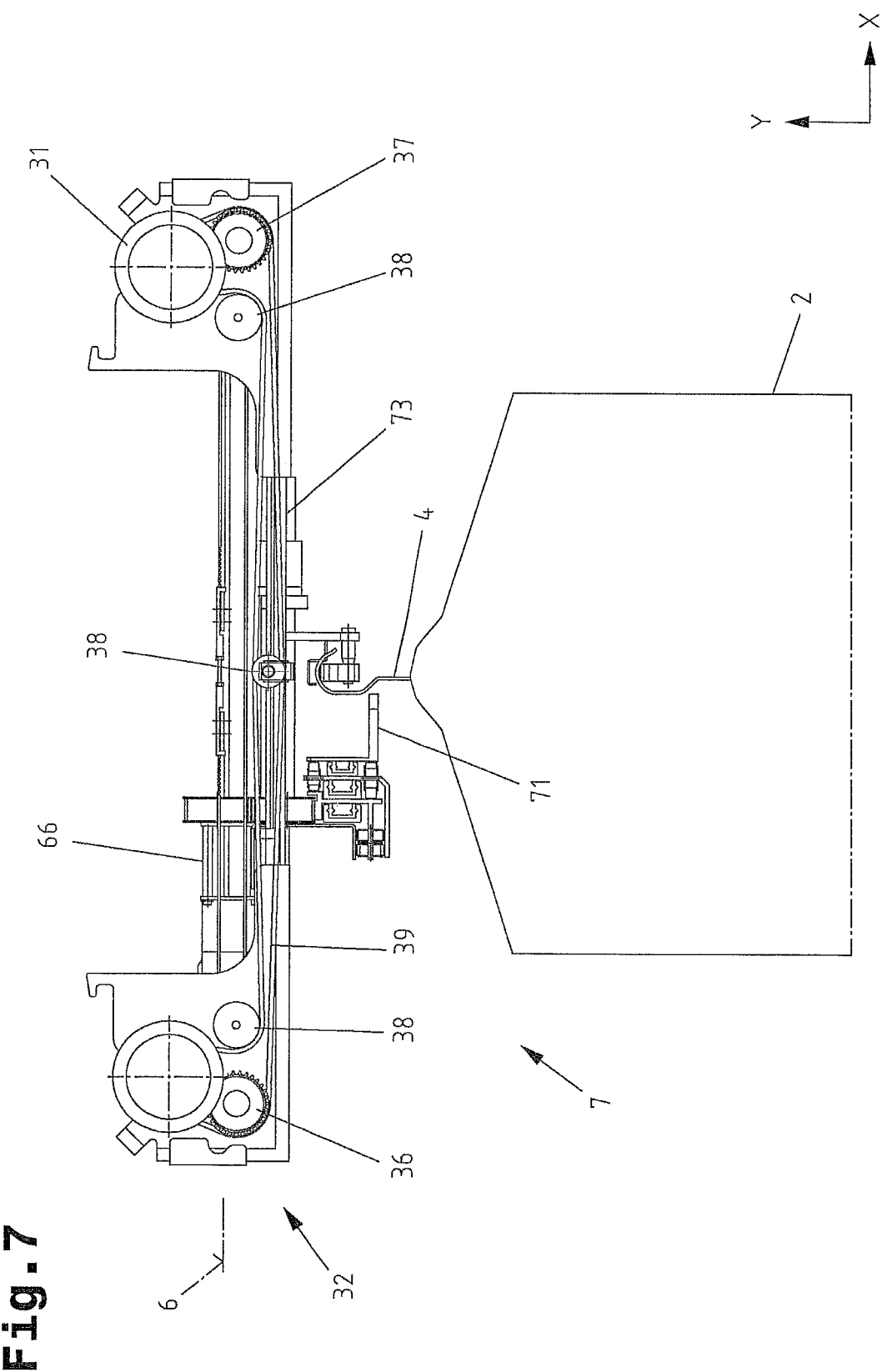

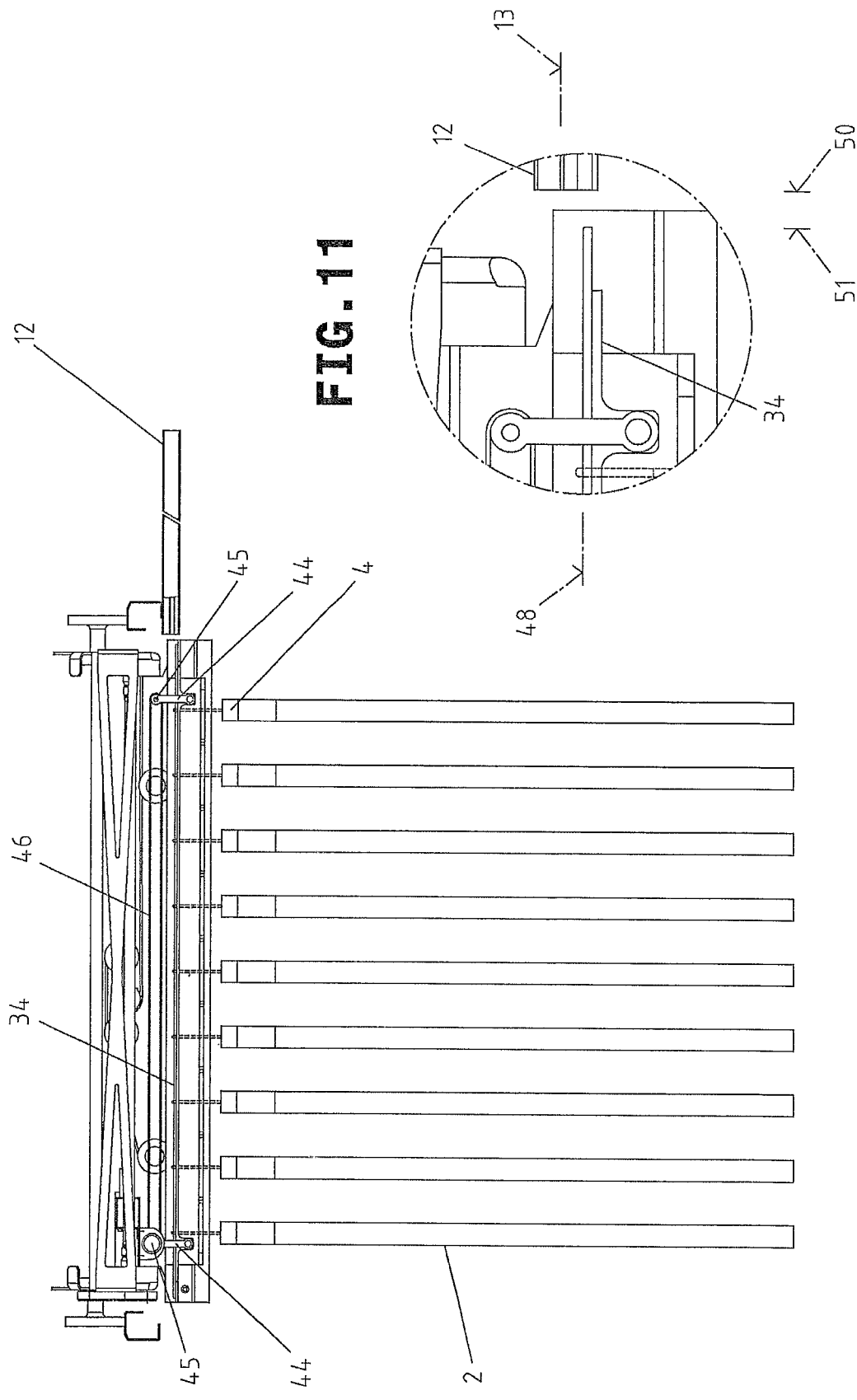

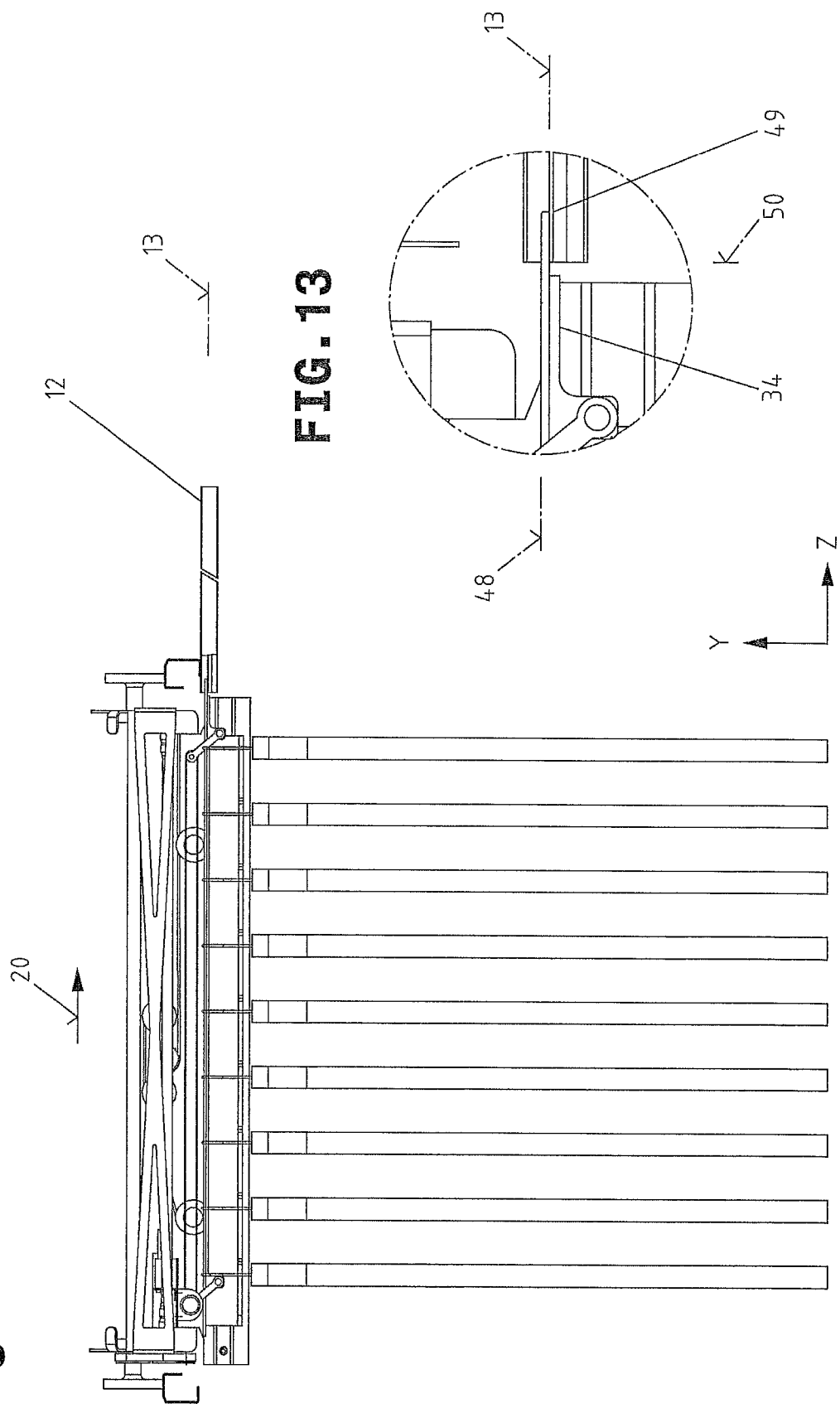

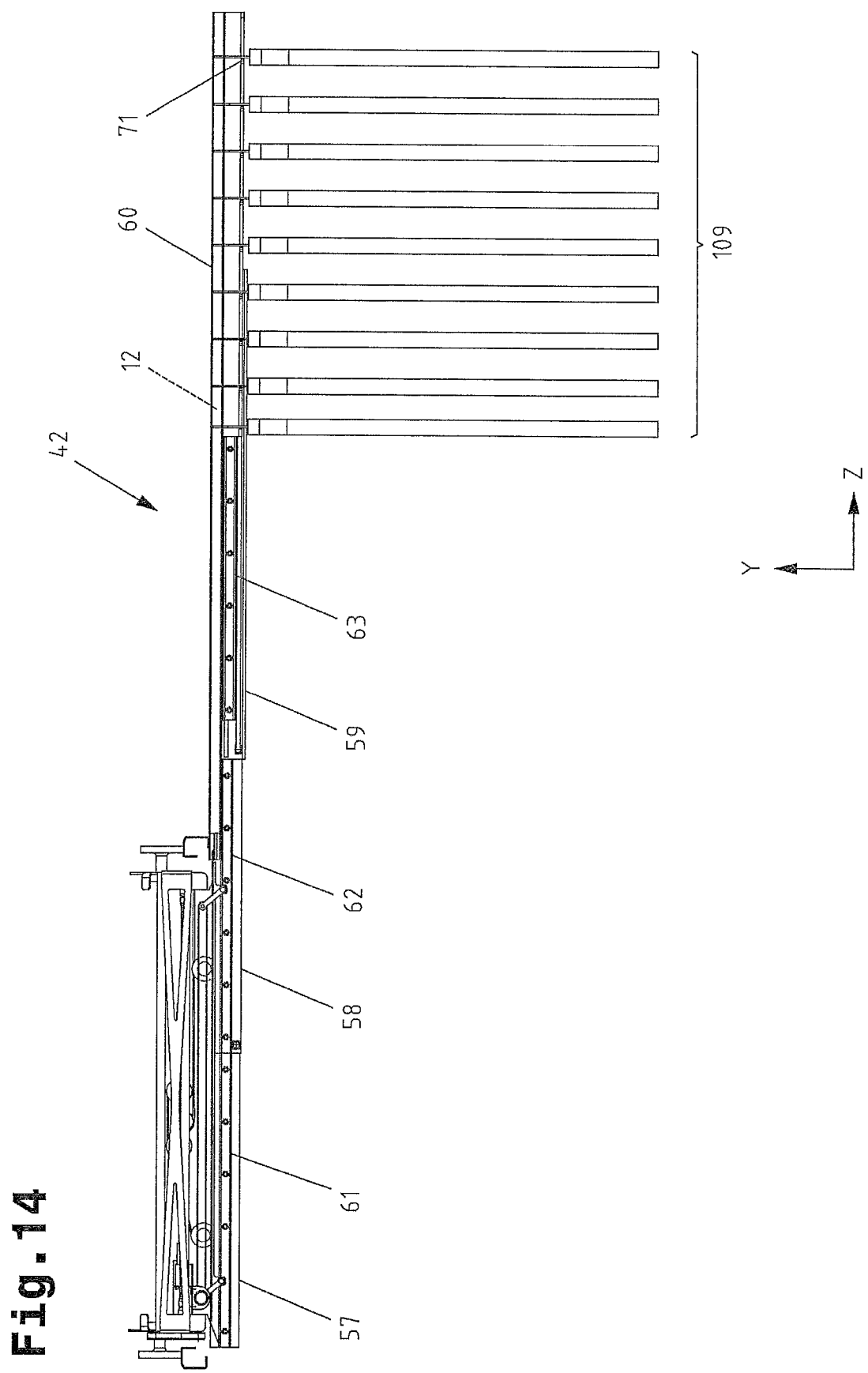

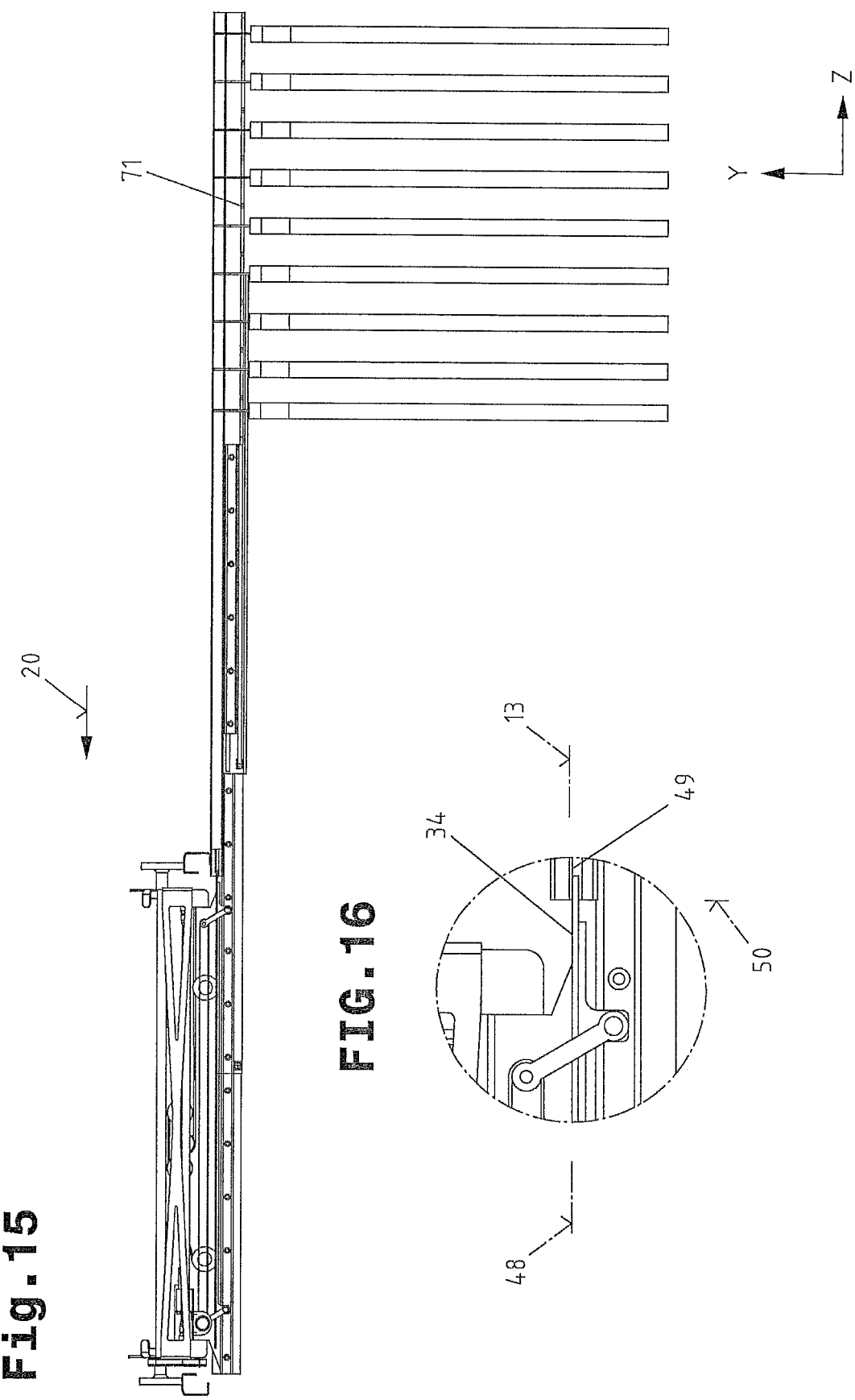

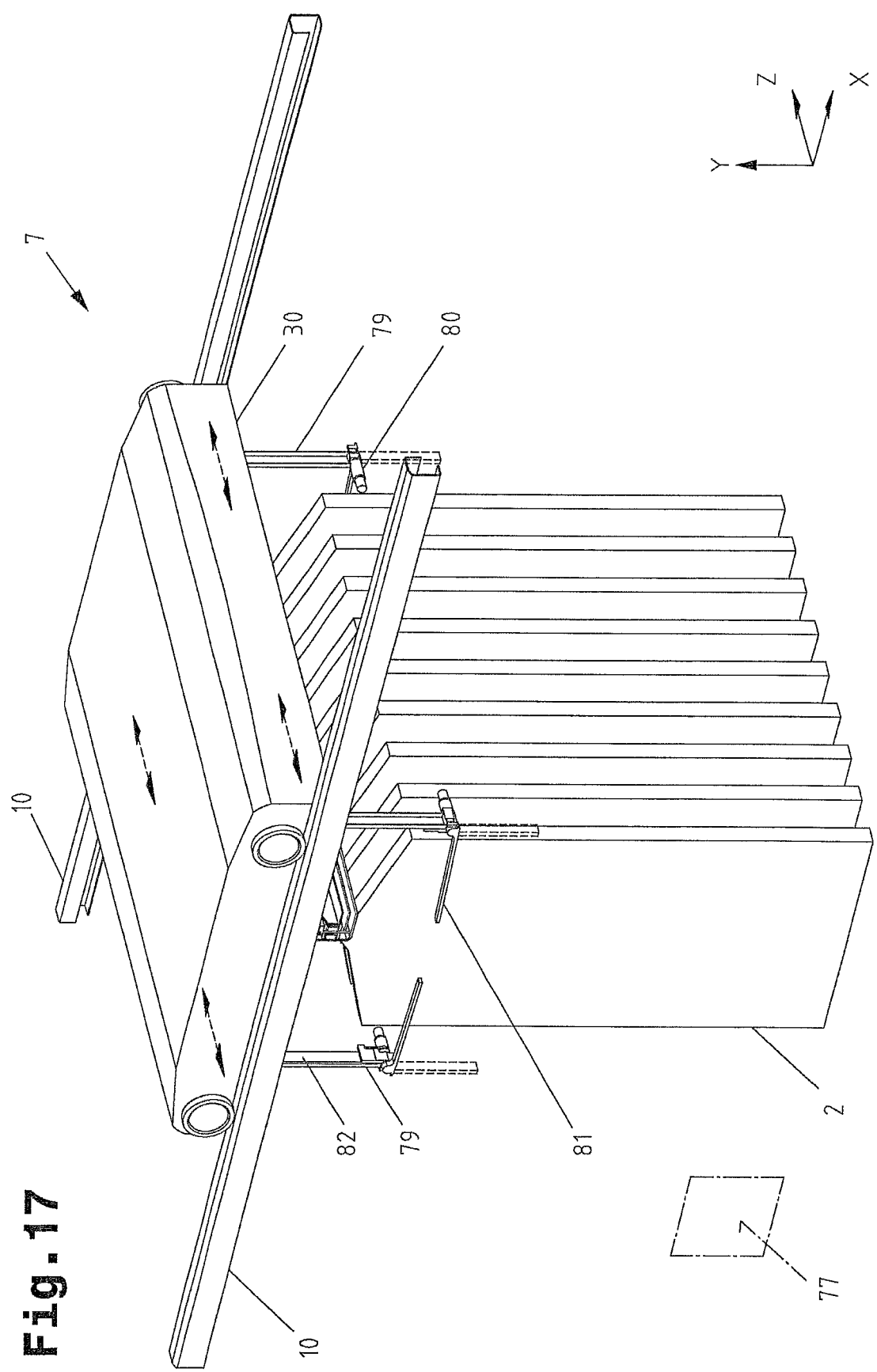

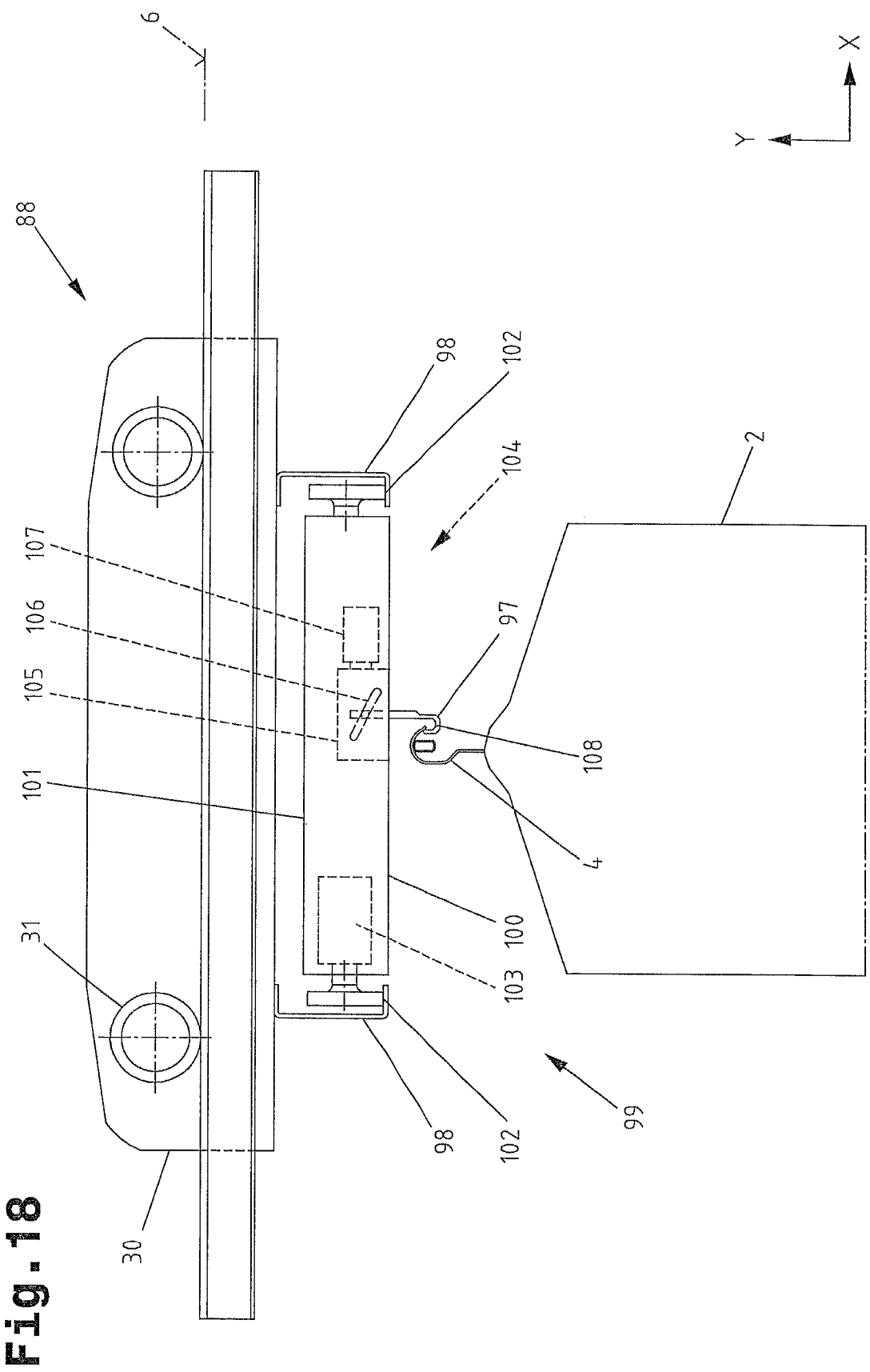

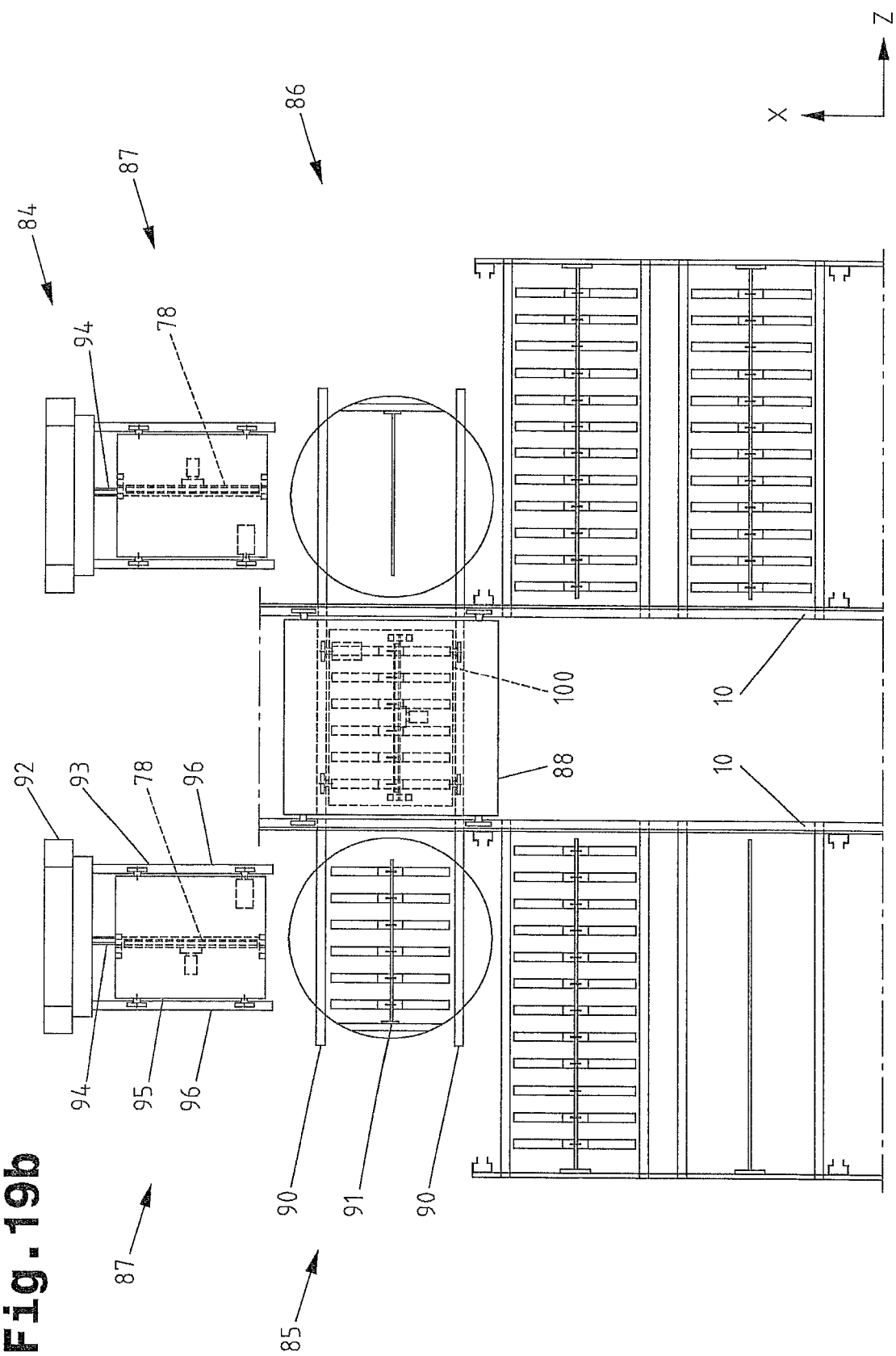

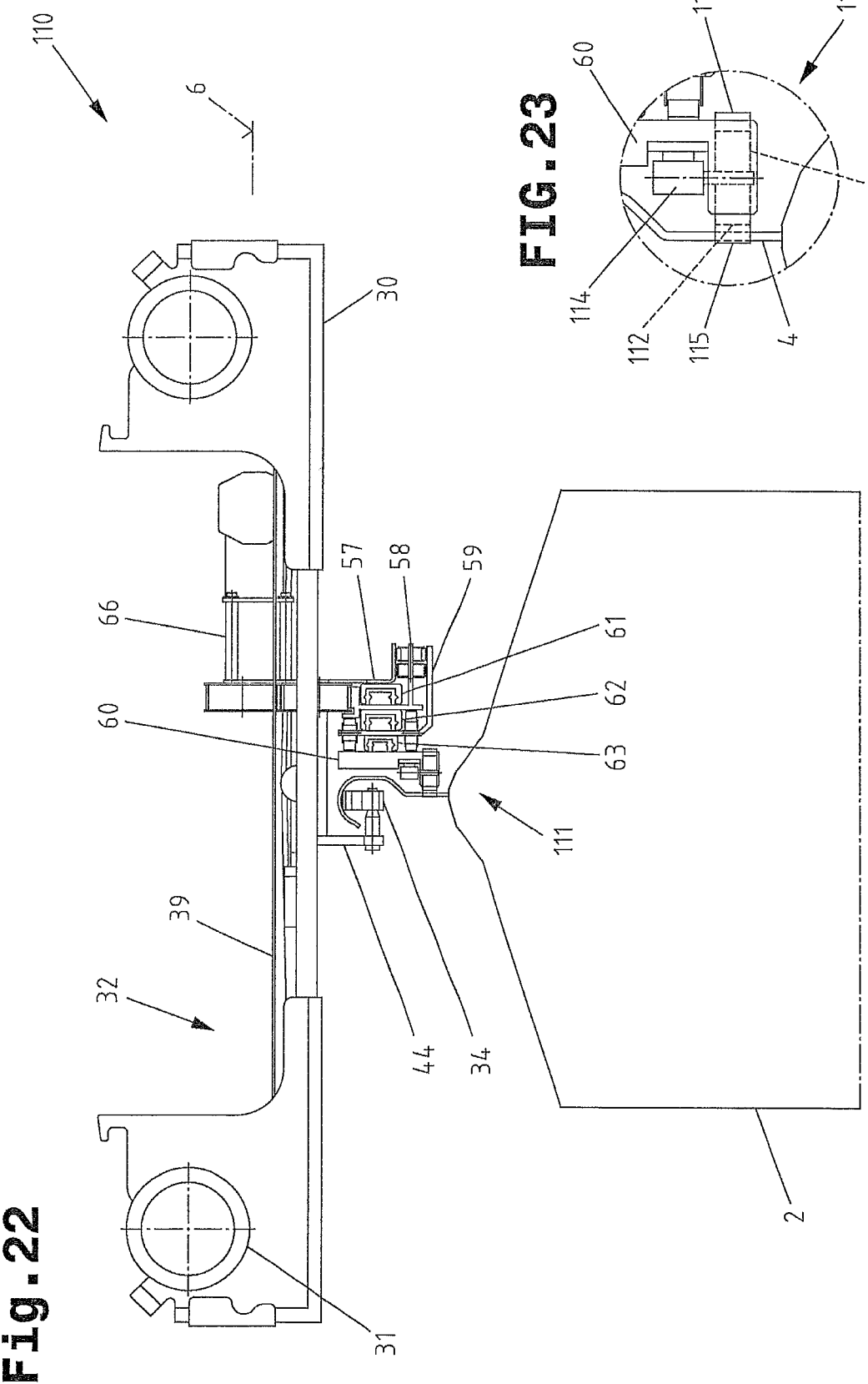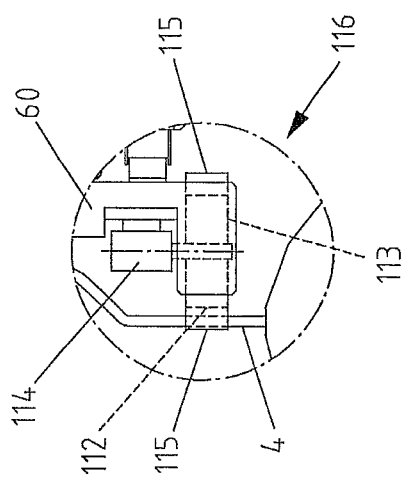

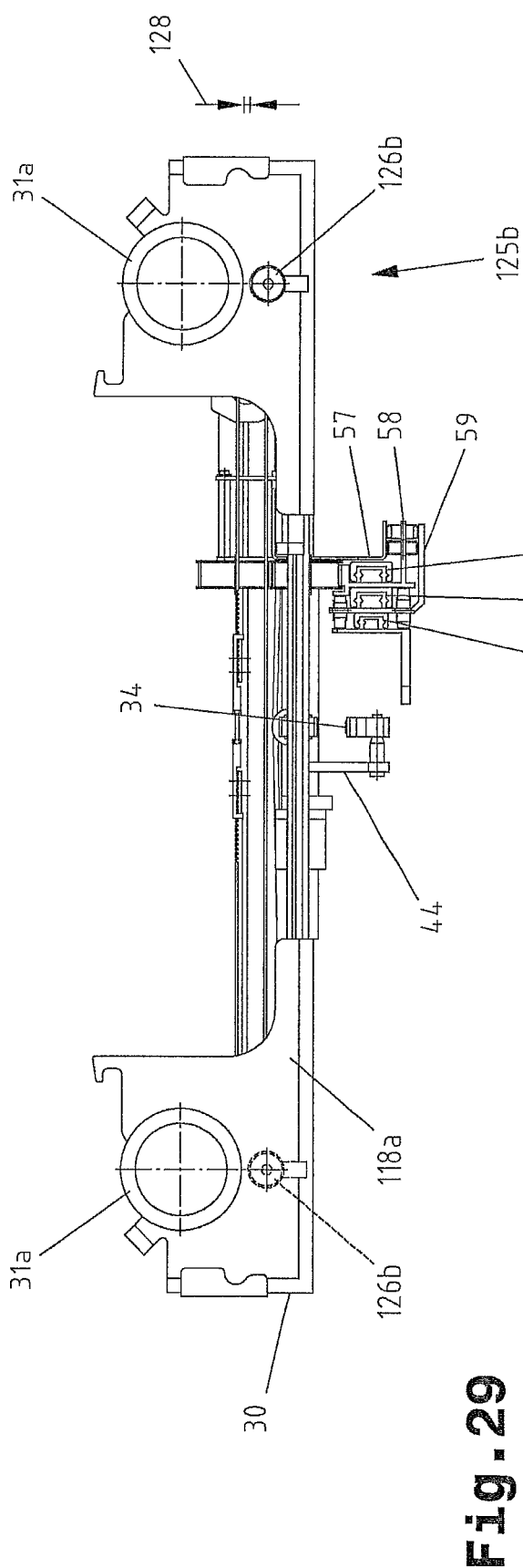
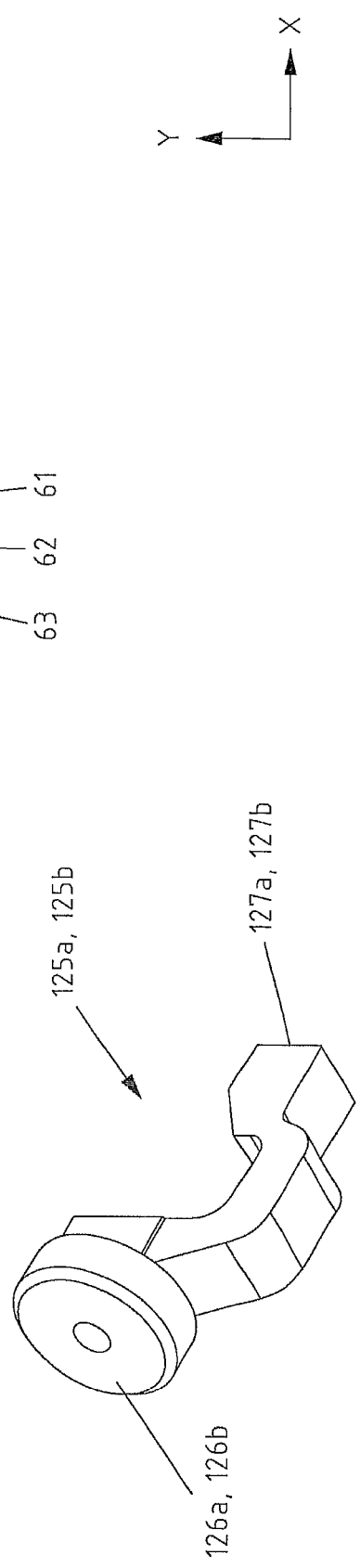
Fig. 25
Fig. 29

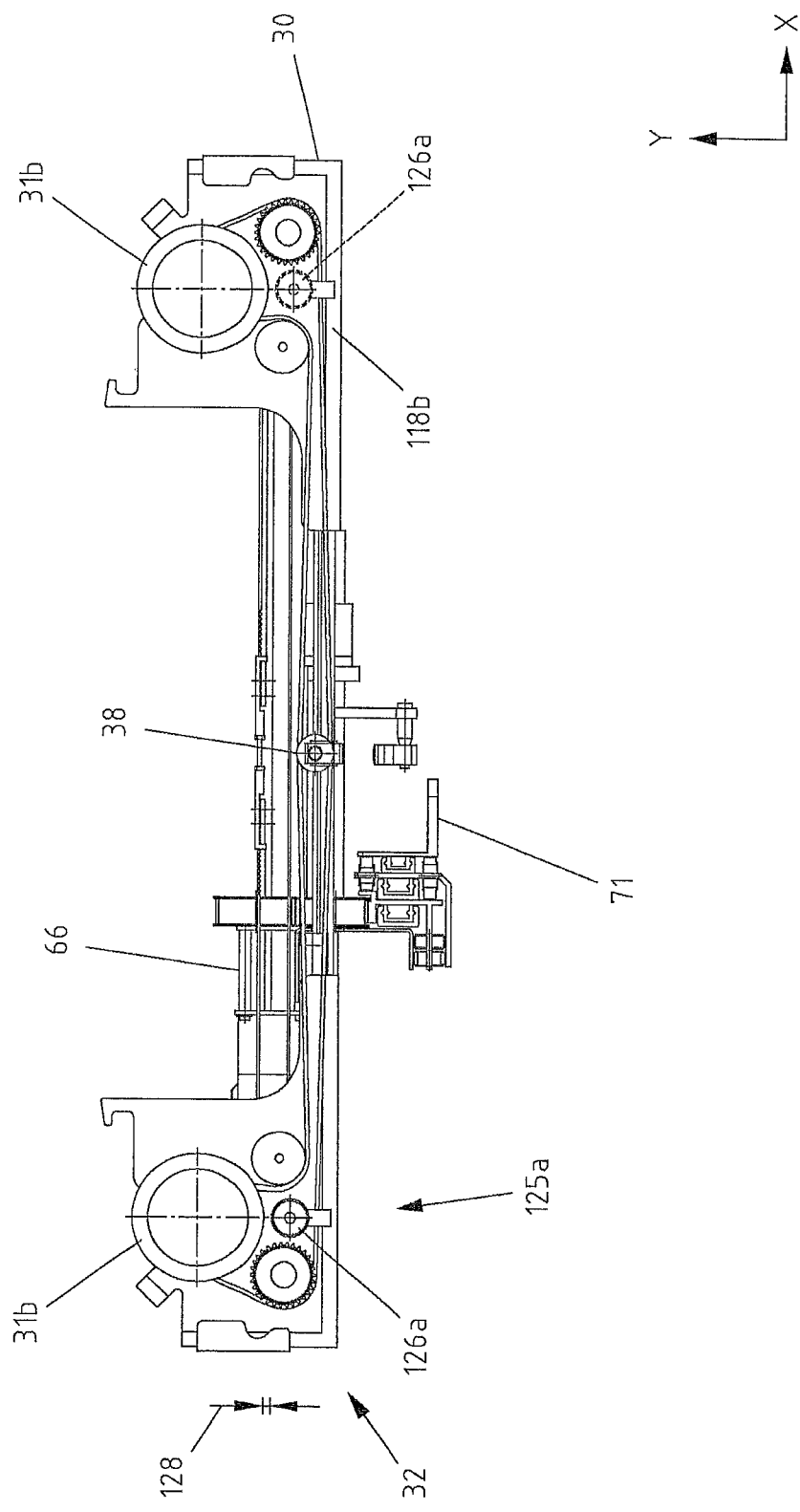

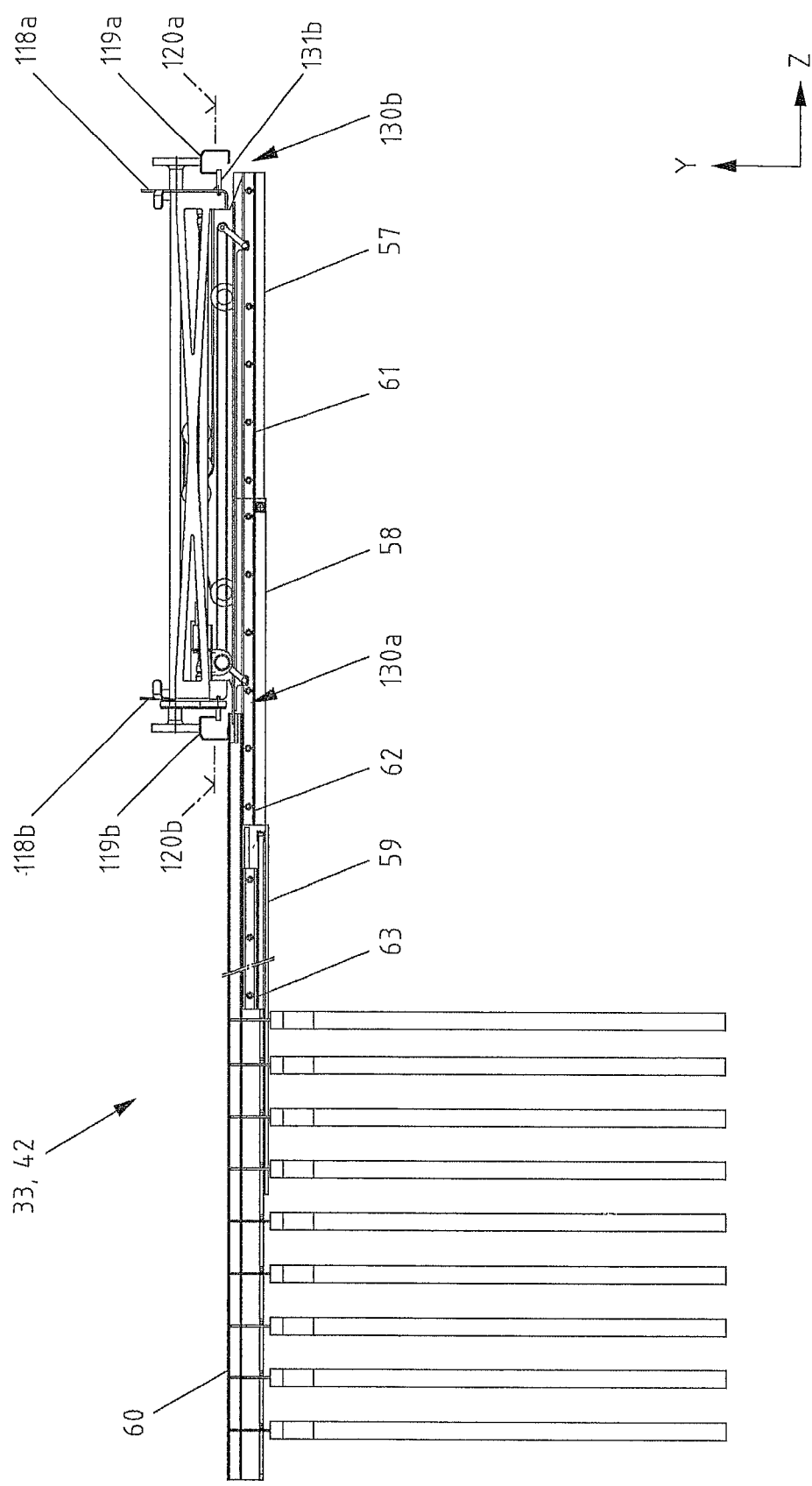

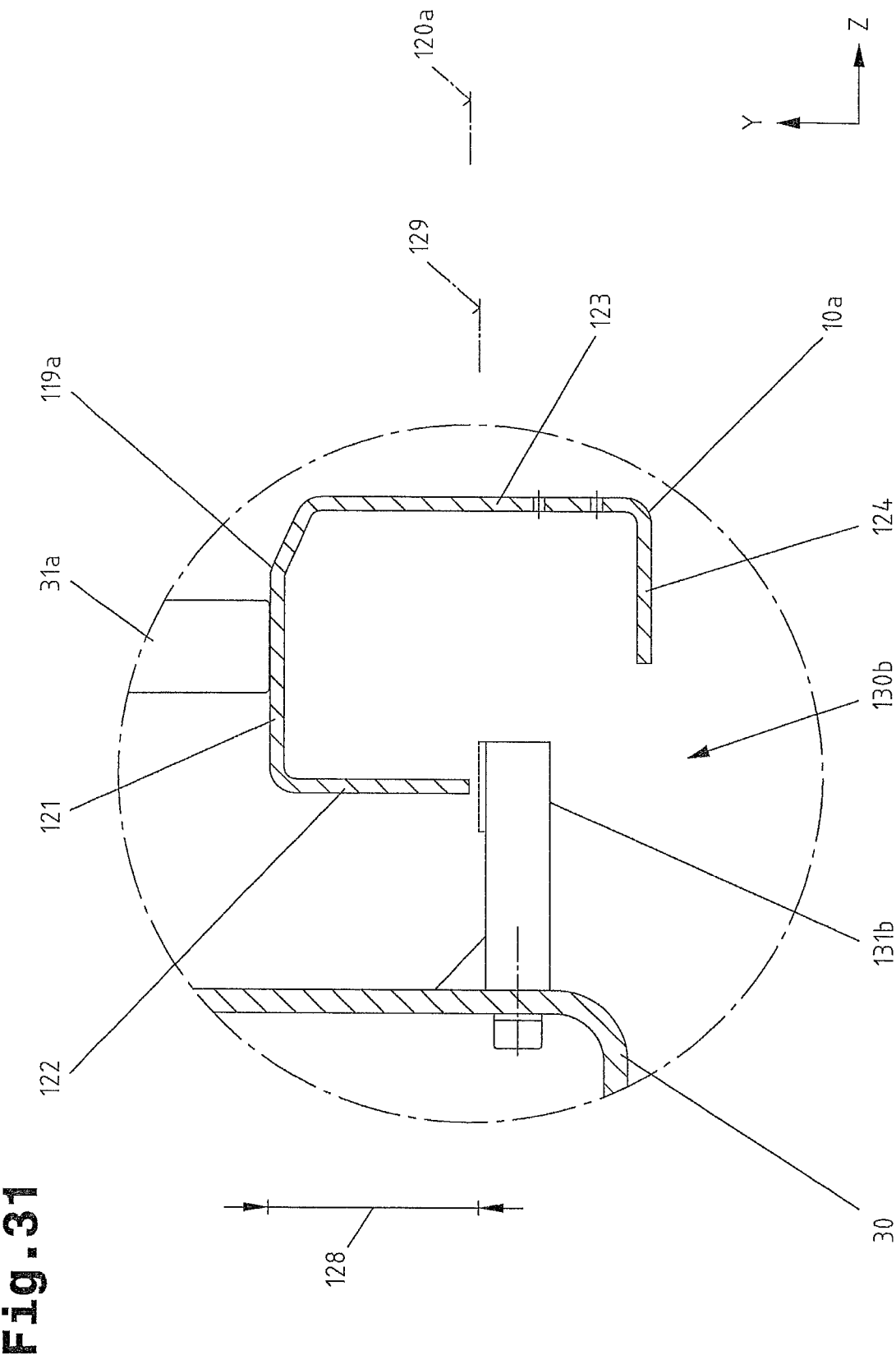

AUTOMATED STORAGE SYSTEM AND METHOD FOR STORING SUSPENDED GOODS IN SAID STORAGE SYSTEM

CROSS REFERENCE TO RELATED APPLICATIONS

This application is the National Stage of PCT/EP2016/073794 filed on Oct. 5, 2016, which claims priority under 35 U.S.C. § 119 of Austrian Application No. A 50849/2015 filed on Oct. 6, 2015, the disclosure of which is incorporated by reference. The international application under PCT article 21(2) was not published in English.

The invention relates to a method for storing hanging goods in an automated storage system, comprising a stationary storage rack with storage regions for the hanging goods which are arranged in storage levels one above the other, and at least one goods transport device having a base frame which is displaceable in front of the storage rack in a first direction (x-direction), and at least one storage and removal device having a goods displacement means which is displaceable relative to the base frame in a second direction (z-direction) perpendicular to the first direction (x-direction). The invention further relates to an automated storage system for carrying out the method.

U.S. Pat. No. 6,558,102 B2 discloses an automated storage system for hanging goods, in particular articles of clothing such as coats, jackets, suits, overalls, etc., comprising a hanging conveyor having trolleys travelling on rails, storage racks with storage regions disposed in storage levels disposed one above the other and goods transport devices (storage and retrieval machines) displaceable between the storage racks in a first direction (x-direction) having a base frame which can be raised and lowered and a storage and removal device for each goods transport device which can be moved relative to the base frame in a second direction (z-direction) perpendicular to the first direction (x-direction) for loading and unloading the storage racks. The hanging goods are suspended on storage rods by means of clothes hangers and are also transported and stored in the storage system by means thereof. To this end, the storage rods are fixed in a positively fitting arrangement during transportation and storage.

DE 102 14 471 A1 discloses an automated storage system for hanging goods using goods carriers provided with sliding elements and hooks for the hanging goods. The storage regions and the base frame of the goods transport device which can be raised and lowered are equipped with support rails along which the goods carriers travel. The base frame may be equipped with a storage and removal device by means of which the goods carriers can be moved between a storage region and the goods transport device.

Based on EP 1 972 577 B1, the automated storage system for hanging goods comprises a conveyor system, a storage and retrieval machine, storage racks and a receiving station and the hanging goods are transferred to storage bars and/or taken off the storage bars by the conveyor system in the receiving station, and the storage and retrieval machine is configured to collect empty or full storage bars from the receiving station or deliver them to the receiving station. The storage and retrieval machine also has gripper units by means of which the storage bar can be secured during transportation from the receiving station to the storage rack. EP 2 130 789 B1 additionally proposes an intermediate step of picking up an empty storage bar underneath the gripper units and depositing an empty storage bar in the storage rack.

DE 10 2008 035 651 A1 describes an automated storage system which, instead of storage bars, uses goods carriers comprising hanger supports on a bottom face on which the hanging goods can be hung.

DE 10 2008 018 310 A1 discloses a method for operating a high-shelf warehouse for hanging goods which comprises the steps:

hanging hanging goods on a loose storage bar in a goods-in area,
transferring the storage bar and hanging goods to a storage and retrieval machine,
storing the storage bar and hanging goods in a free storage region of a storage rack,
taking the storage bar and hanging goods out of the storage rack to the storage and retrieval machine,
receiving the storage bar and hanging goods on the storage and retrieval machine,
and taking the hanging goods off the storage bar,
transporting the empty storage bar to a buffer store.

The storage systems known from the prior art are very complicated because a large number of storage bars and/or goods carriers are used which have to be manipulated in conjunction with the hanging goods. The storage and retrieval machines and the storage regions have to be equipped with appropriate fixing means to secure the storage bars and/or goods carriers again after each changeover.

A storage and retrieval machine for a rack storage system having storage regions for hanging goods disposed in storage levels lying one above the other is known from EP 2 923 970 A1. The storage and retrieval machine is displaceable in front of the storage rack in a first direction (x-direction) and is provided with a storage and removal device. The storage and removal device comprises a transfer device displaceable in a second direction (z-direction) perpendicular to the first direction (x-direction) having several vertically displaceable lifting units by means of which a clothes rail can be respectively manipulated between the storage and retrieval machine and the storage region. DE 37 35 607 C1 and FR 2 723 689 A1 disclose a storage system for hanging goods comprising a storage and retrieval machine which is displaceable in front of a storage rack in a first direction (x-direction), a storage and removal device having a gripper device which can be moved in a second direction (z-direction) perpendicular to the first direction (x-direction) and storage racks having goods receiving carriers. The goods receiving carriers extend parallel with the first direction (x-direction) and the hanging goods are manipulated by the gripper device between the storage and retrieval machine and the goods receiving carriers.

US 2003/0223850 A1 and WO 91/04931 A1 disclose a storage system for hanging goods which comprises an operating device displaceable on rails and goods receiving carriers extending parallel therewith on either side of the operating device. The operating device is equipped with a lifting device by means of which suspended articles can be manipulated between the operating device and the goods receiving carriers.

The underlying objective of this invention is to propose a method for storing hanging goods and an automated storage device by means of which a high throughput rate can be achieved and which can be operated more easily compared with the prior art.

The objective of the invention is achieved due to the fact that the hanging goods are moved by means of the goods displacement means between a goods receiving carrier assigned to the storage region and a goods receiving carrier assigned to the goods transport device, and the goods receiving carriers in the storage regions remain in the storage rack. In accordance with the invention, the hanging goods are manipulated between the goods receiving carriers of the storage region and the goods transport device. In this context, the hanging goods can be either pushed relative to the goods receiving carriers or raised/lowered relative to the goods receiving carriers. The clothes hanger with its hook is used not only for hanging the hanging goods but also for transportation. This makes the work involved in manipulating the hanging goods much simpler than is the case with the storage systems known from the prior art. Furthermore, this now also enables the hanging goods to be accessed individually. In other words, packing or picking orders can be processed very efficiently because hanging goods can also be retrieved from storage in just the number in which they are required for a packing or picking order. Based on the prior art, a storage rail with a plurality of hanging goods has to be retrieved for every packing or picking order even if only a fraction thereof are needed. Overall, therefore, a significantly more efficient storage system can be obtained. Furthermore, additional fixing means in the storage region are not necessary, thereby also enabling a compact and cost-effective construction of the storage racks to be achieved.

It is also of advantage if, prior to being stored in the storage rack, the hanging goods are received by a goods receiving carrier at a delivery station and, after having being retrieved from the storage rack are deposited on a goods receiving carrier at a receiving station, and during the receiving and/or deposition operation the hanging goods are moved by means of the goods displacement means between the goods receiving carrier assigned to the goods transport device and the goods receiving carrier assigned to the delivery and/or receiving station, and the goods receiving carrier at the delivery and/or receiving station remains in the delivery and/or receiving station. The delivery station and receiving station may be disposed on both sides of the goods transport device or may form a combined delivery and receiving station which is disposed on one side of the goods transport device. The hanging goods are manipulated between the goods receiving carriers of the goods transport device and the receiving and/or delivery station. In this context, the hanging goods may be either shifted relative to the goods receiving carriers or raised/lowered relative to the goods receiving carriers. This makes the work involved in manipulating the hanging goods much simpler than is the case with the storage systems known from the prior art.

It has proved to be of particular advantage if a direction of movement for the hanging goods during the receiving and/or deposition movement between the goods receiving carriers extends parallel with the second direction (z-direction). During both the receiving and/or deposition movement between the goods receiving carrier of the goods transport device and one of the goods receiving carriers of the storage rack and between the goods receiving carrier of the goods transport device and one of the goods receiving carriers of the receiving and/or delivery station, the hanging goods extend parallel with the second direction (z-direction). This is conducive to obtaining a simple design of a goods displacement means for manipulating the hanging goods.

It is also of advantage if the hanging goods on the goods receiving carriers each define a hanging plane extending in a direction perpendicular to the goods receiving carriers. The hanging goods are therefore oriented in the x-direction. This enables travel resistance to be reduced when the hanging goods are being moved by the goods transport device in the x-direction. This is primarily because an air flow is possible between the hanging goods. At least one goods transport device can therefore be operated even more dynamically in the x-direction and the efficiency of the system increased.

Based on one feature of the invention, the hanging goods are each stored and transported on the goods receiving carriers hanging on a clothes hanger, and the goods displacement means grips at least one clothes hanger by means of a gripper unit mounted on the goods displacement means and can move the hanging goods between the goods receiving carriers. The gripper unit grips the clothes hanger, in particular a hook of the clothes hanger, to prevent damage to the hanging goods. If only individual hanging goods have to be removed from a group of hanging goods, the foremost one of the hanging goods can be respectively accessed by means of the gripper unit.

If correspondingly high performance rates are necessary and a packing and/or picking order comprises a high number of hanging goods of the same type, the goods displacement means can grip a plurality of clothes hangers by means of the gripper unit and move the hanging goods as a hanging goods group between the goods receiving carriers.

Based on another feature of the invention, the hanging goods are each stored and transported on the goods receiving carriers hanging on a clothes hanger, and the goods displacement means has a gripper unit, and these gripper units are mounted on the goods displacement means, each grip a clothes hanger and can move the hanging goods separately between the goods receiving carriers. Although the hanging goods are handled as hanging goods groups, the hanging goods are transported on the goods receiving carrier at a defined distance from one another, which is in turn conducive to creating the air circulation between the hanging goods.

If the hanging goods in the respective storage region are stored on a goods receiving carrier as separated hanging goods groups, a high number of hanging goods can be stored in a storage rack in the available storage capacity and particularly efficient use is made of the goods transport device.

A particularly high storage efficiency and/or retrieval efficiency is achieved if the hanging goods are transported between the storage region and the goods transport device or between the delivery and/or receiving station and the goods transport device and on the goods transport device as a hanging goods group.

The objective of the invention is also achieved due to the fact that a goods receiving carrier is assigned to the storage regions and to the goods transport device respectively and the goods displacement means moves the hanging goods between the goods receiving carrier for the storage regions and the goods receiving carrier for the goods transport device and the goods receiving carriers in the storage regions remain in the storage rack.

Also of advantage is an embodiment of the invention whereby the storage system adjoins a goods distribution system, comprising a delivery station at which hanging goods to be placed in storage are collected by the goods transport device, and a receiving station at which hanging goods to be removed from stock are deposited, and the delivery station is equipped with at least one goods receiving carrier and/or the receiving station is equipped with at least one goods receiving carrier, and during the receiving and/or deposition operation, the hanging goods are moved by means of the storage and removal device between the goods receiving carrier assigned to the goods transport device and the goods receiving carrier assigned to the delivery and/or receiving station.

Based on one embodiment of the invention, the goods receiving carriers are disposed parallel with the second direction (z-direction) and the hanging goods on the goods receiving carriers each define a hanging plane extending in a direction perpendicular to the goods receiving carriers.

It is also of advantage if the goods receiving carrier for the storage region is fixedly connected to the storage rack and the goods receiving carrier for the goods transport device is arranged on the base frame, and the goods displacement means is movable relative to the goods receiving carriers in the second direction (z-direction) and is provided with a gripper unit which grips at least one clothes hanger and can move the hanging goods between the storage region and the goods transport device. Based on this embodiment, optimal use can be made of the available spatial volume and a maximum number of hanging goods stored because the amount of space needed to accommodate the goods receiving carrier in the storage rack is small.

Based on another embodiment of the invention, it is also possible for the goods displacement means to be movable relative to the goods receiving carriers in the second direction (z-direction) and to be provided with a gripper unit which grips at least one clothes hanger and can move the hanging goods between the delivery station and the goods transport device and/or between the receiving station and the goods transport device.

It is also of particular advantage if the goods displacement means comprises at least one telescopic unit with a supporting frame arranged on the base frame and rails that are displaceable relative to the supporting frame, and the rail with the biggest range of motion (in the z-direction) is provided with an outer gripper at its mutually opposite end regions, and the gripper units are each displaceable (in the x-direction) between an initial position in which the gripper unit is retracted from a clothes hanger and an operating position in which the gripper unit is able to grip a clothes hanger. The clothes hangers are picked up between the gripper units and positively engaged during a receiving and/or deposition movement. This enables the clothes hangers to be reliably carried even if clothes hangers become entangled.

To enable a better separation (spacing) to be obtained between the clothes hangers, the rail with the biggest range of motion may additionally be provided with inner gripper units between the outer gripper units, and the inner gripper units are each displaceable (in the x-direction) between an initial position in which the gripper unit is retracted from a clothes hanger and an operating position in which the gripper unit is able to grip a clothes hanger.

It is also of advantage if the goods displacement means comprises at least one telescopic unit having a supporting frame mounted on the base frame and rails that are displaceable relative to the supporting frame, and the rail with the biggest range of motion (in the z-direction) is equipped with a traction means which is coupled with a drive and disposed on the mutually spaced gripper units, and the gripper units are each able to grip a clothes hanger. As a result of this embodiment, the storage and retrieval times can be optimized.

It has also proved to be of advantage if
the stationary storage rack in the storage levels lying one above the other and within the storage regions comprises mutually spaced guide rails extending parallel with the second direction (z-direction), and the goods transport device comprises mutually spaced guide rails secured to the base frame and extending parallel with the second direction (z-direction), and the goods displacement means is configured as a storage and retrieval vehicle which is displaceable by means of a bogie (for example castors) on the guide rails between the goods transport device and a storage region in the storage rack and which is equipped with a goods receiving carrier, and the goods receiving carrier forms a gripper unit which is able to grip one or more clothes hangers and can move the hanging goods between the storage region and the goods transport device.

In this context, during the operation of depositing hanging goods on the goods receiving carrier of the storage rack and transferring hanging goods to the goods receiving carrier of the goods transport device, the goods displacement means is positioned above the goods receiving carrier in the storage rack in the z-direction. The deposition and/or receiving movement is a vertical movement so that the hanging goods are lowered or raised relative to the goods receiving carrier of the storage rack. This enables the hanging goods to be reliably received and/or deposited.

Finally, it is also of advantage if the goods transport device is a single-level rack serving device and the storage system has a number of single-level rack serving devices and every single-level rack serving device is provided with the storage and removal device and the single-level rack serving device of a storage level serves the storage regions in this storage level. Accordingly, at least one single-level rack serving device is provided for every storage level or at least one single-level rack serving device is provided in only some of the storage levels respectively. Uncoupling the storage and retrieval operations of several single-level rack serving devices enables the highest storage and retrieval efficiency rates to be achieved.

The invention further relates to a goods transport device for storing unit loads, for example hanging goods, containers, packaging units and such like, in a storage rack and retrieving unit loads from a storage rack in a storage system having horizontally extending travel planes lying one above the other and a first guide rail and second guide rails disposed in front of the storage rack of each travel plane along which a goods transport device is movable in a first direction (x-direction). The goods transport device comprises a base frame having mutually opposite longitudinal sides, one of which longitudinal sides forms a first longitudinal side and one of which longitudinal sides forms a second longitudinal side, wheels which lie so as to roll on a guide on the first guide rail and a guide on the second guide rail and are mounted on the base frame on the mutually opposite longitudinal sides, and at least one storage and removal device having a goods displacement means that is movable relative to the base frame in a second direction (z-direction) perpendicular to the first direction (x-direction) in order to store unit loads in the storage rack in depth positions lying one behind the other and to retrieve unit loads from the storage rack from depth positions disposed one behind the other. The invention further relates to an automated storage system for unit loads having at least one such goods transport device for storing unit loads, for example hanging goods, containers, packaging units and such like, in a storage rack and retrieve unit loads from a storage rack.

Automated storage systems are known from the prior art, whereby the unit loads are conveyed to the storage regions by means of a goods transport device (single-level rack serving device) movable along the storage racks in a first direction (x-direction) and conveyed into the storage regions by means of a goods displacement means which can be moved out from the goods transport device in a second direction (z-direction) into the storage regions. The goods transport device comprises a base frame having mutually opposite longitudinal sides and first wheels which lie so as to roll on a guide and are mounted on the base frame on the first longitudinal side and second wheels which lie so as to roll on a guide and are mounted on the base frame on the second longitudinal side. Also mounted on the base frame is the goods displacement means. The goods displacement means is equipped with at least one outer transport element respectively at mutually opposite end regions and at least one inner transport element disposed in between in order to store the unit loads in the storage regions in depth positions lying one behind the other and retrieve the unit loads from the storage regions from depth positions lying one behind the other.

In this storage system, an aisle between the storage racks is narrower than the storage depth in the storage racks. Furthermore, there is an increasing requirement for greater efficiency. Greater efficiency and improved dynamics of the goods transport device can be achieved if the intrinsic weight of the goods transport device is reduced. If the unit loads have to be stored in a rear depth position in the storage rack relative to the aisle or the unit loads have to be retrieved from a rear depth position in the storage rack relative to the aisle, the goods displacement means has to be extended correspondingly far. This can result in the goods transport device tipping on the wheels facing the direction of the storage movement or retrieval movement during the storage movement or retrieval movement as the goods displacement means moves to a rear depth position in the storage rack. In order to prevent a tipping movement, the intrinsic weight of the goods transport device is increased but this has a detrimental effect on the dynamics of the goods transport device.

The underlying objective of this invention is to propose a goods transport device which can be used for highly dynamic travel movement in an automated storage system and will contribute to achieving a high throughput rate in the storage system.

The objective of the invention is achieved due to the fact that the goods transport device is equipped with a first stop device on the base frame which acts as at least one stop element which is able to cooperate with a stop surface on the second guide rail in such a way that a tipping movement of the goods transport device about the wheels disposed on a first longitudinal side is prevented or limited when the goods displacement means is moved out in the second direction (z-direction) and extends out beyond the first longitudinal side.

The objective of the invention is also achieved by an automated storage system wherein the first guide rail and/or the second guide rail has a stop surface spatially separated from the guide for each travel plane and a first stop device is provided on the base frame forming at least one stop element which is arranged between the second guide rail and the base frame and cooperating with a stop surface on the second guide rail in such a way as to prevent or limit a tipping movement of the goods transport device about the wheels disposed on a first longitudinal side when the goods displacement means is moved out in the second direction (z-direction) and projects out from the first longitudinal side.

The first stop device also prevents a tipping movement of the goods transport device when the goods displacement means of the storage and retrieval device projects far out from the first longitudinal side. The track spacing between the first guide rail and second guide rail can be minimized and the number of depth positions lying one behind the other (storage spaces) on which unit loads can be placed can be maximized. Specifically, better use can be made of the storage capacity. In addition, the goods transport device can be produced with a lower intrinsic weight, which in turn has a positive effect on the dynamics and throughput rate in the storage system.

If storage racks are erected on both sides of an aisle and if the goods displacement means of the storage and removal device is able to store unit loads in the storage racks and retrieve them from the storage racks, a second stop device is also provided on the base frame forming at least one stop element which cooperates with a stop surface on the first guide rail in such a way that a tipping movement of the goods transport device about the wheels disposed on a second longitudinal side is prevented or limited when the goods displacement means is moved out in the second direction (z-direction) and projects out from the second longitudinal side.

It is also of advantage if the first stop device and/or second stop device comprises a supporting frame mounted on the base frame and the stop element is configured as a stop wheel mounted on the supporting frame and forms a pivot shaft extending parallel with a respective pivot shaft of the wheels. As a result, it is possible to travel unobstructed across any increment (difference in height) of a few millimeters which might exist between consecutive guide rails in the direction of movement.

It may also be of advantage if the stop wheel comprises an elastically flexible tread, in particular made from plastic. Due to its elastic property, the tread is suitable for compensating an increment between consecutive guide rails in the direction of movement or also for any unevenness on the contact surfaces of the guide rails at least to a limited degree.

A particularly simple embodiment of the invention is obtained if the stop element of the first stop device and/or second stop device is configured as a stop bracket arranged on the base frame.

It is also of advantage if the stop element is assigned to one of the wheels of each longitudinal side, in which case the stop element and this wheel are disposed at a mutual distance one above the other.

The distance may be selected so that the stop element lies against the guide rail by means of an engaging surface on the stop surface. This prevents a tipping movement of the goods transport device even if the goods displacement means is moved out to the maximum.

However, the distance may also be selected so that the stop element is disposed with an engaging surface at a short distance from the stop surface. The distance between the engaging surface and the stop surface is only a few millimeters, for example at most three millimeters. On the one hand this offers low-wear operation of the goods transport device and on the other hand, ensures that a tipping movement of the goods transport device is limited to an admissible degree if the goods transport device should tip when the goods displacement means is moved out. Another advantage of such an embodiment is that guide rails with greater manufacturing tolerances can be used.

To provide a clearer understanding, the invention will be explained in more detail with reference to the appended drawings.

Figure 8:
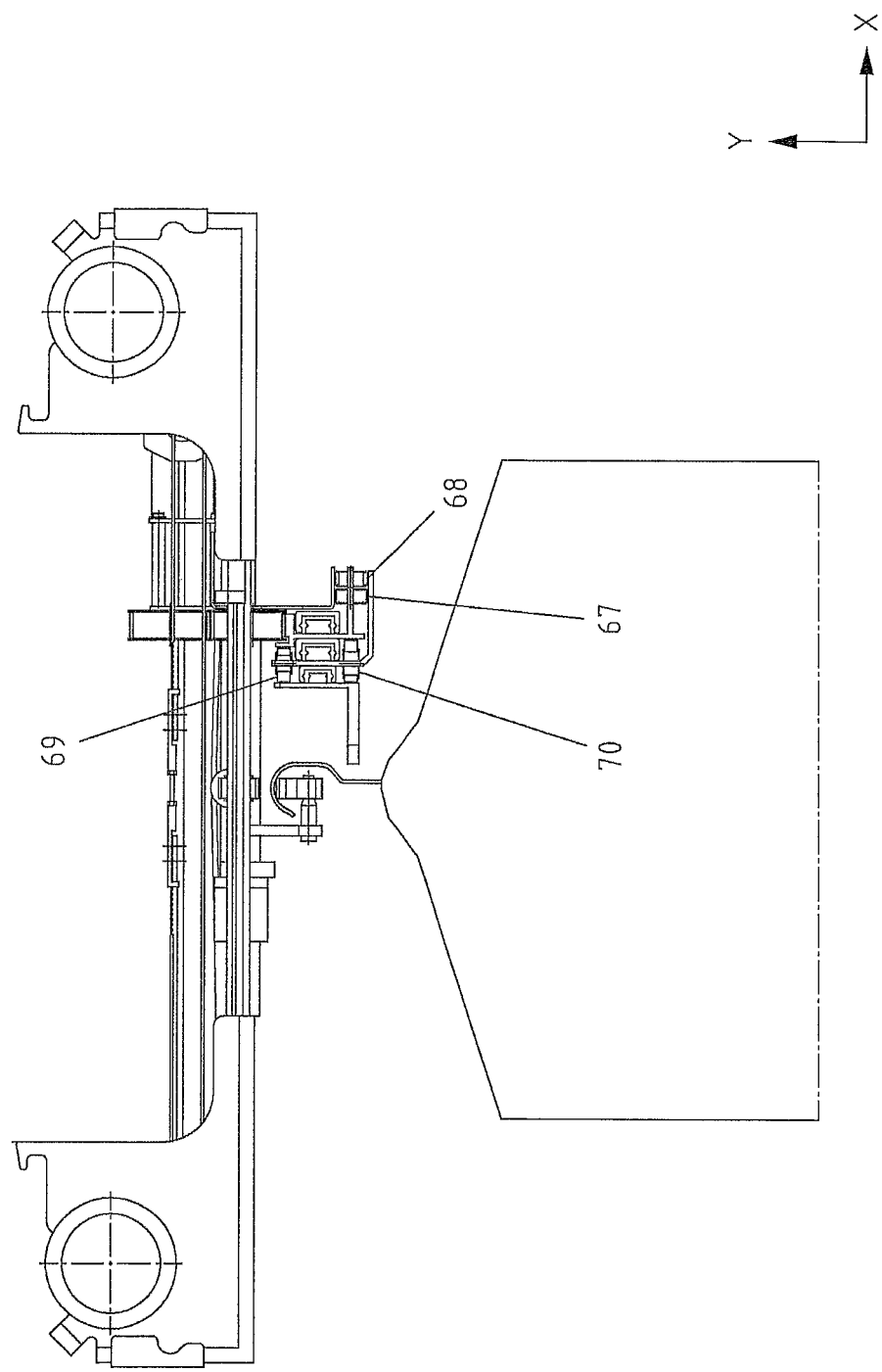
Figure 9:
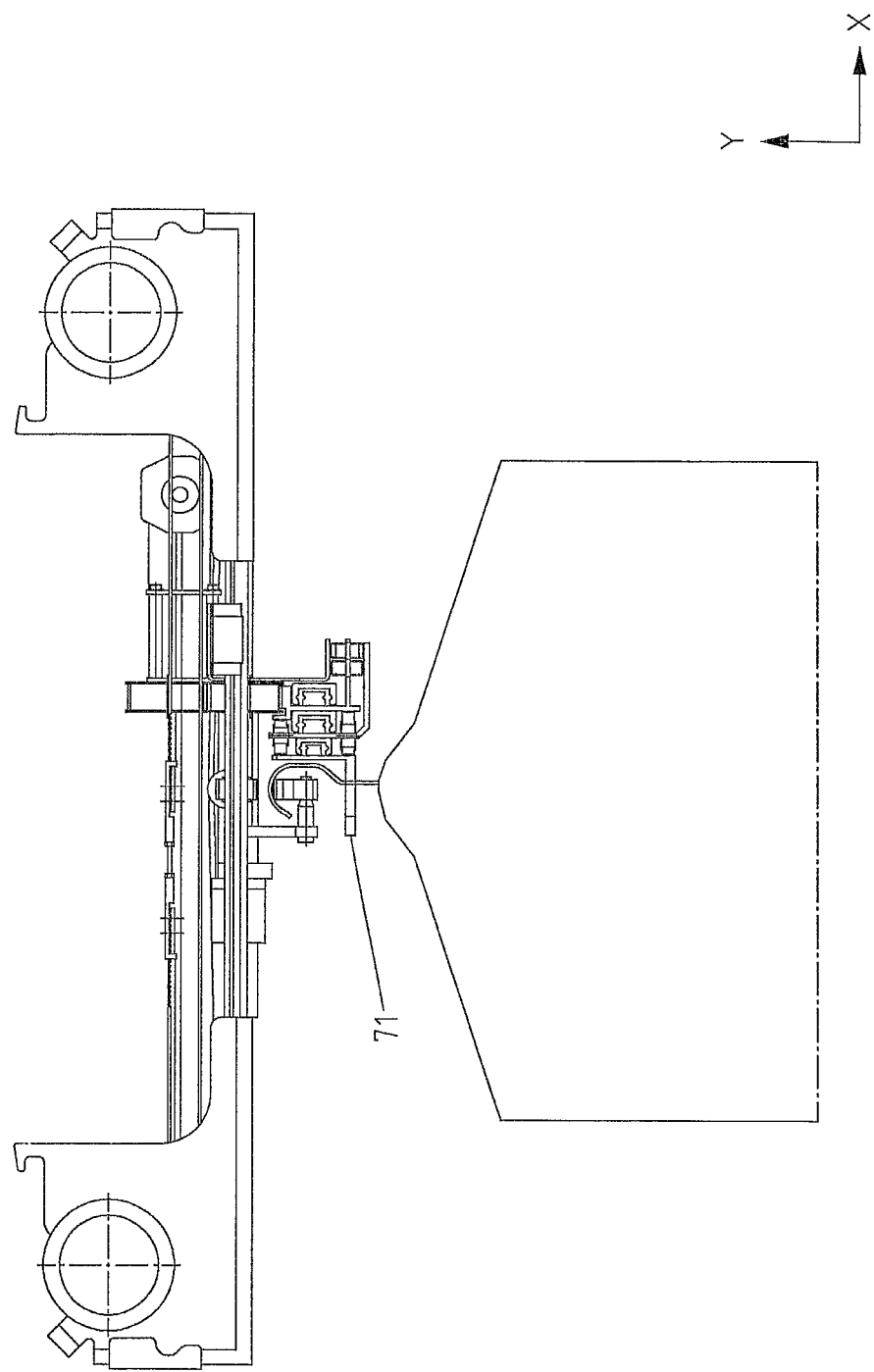
Figure 19A:
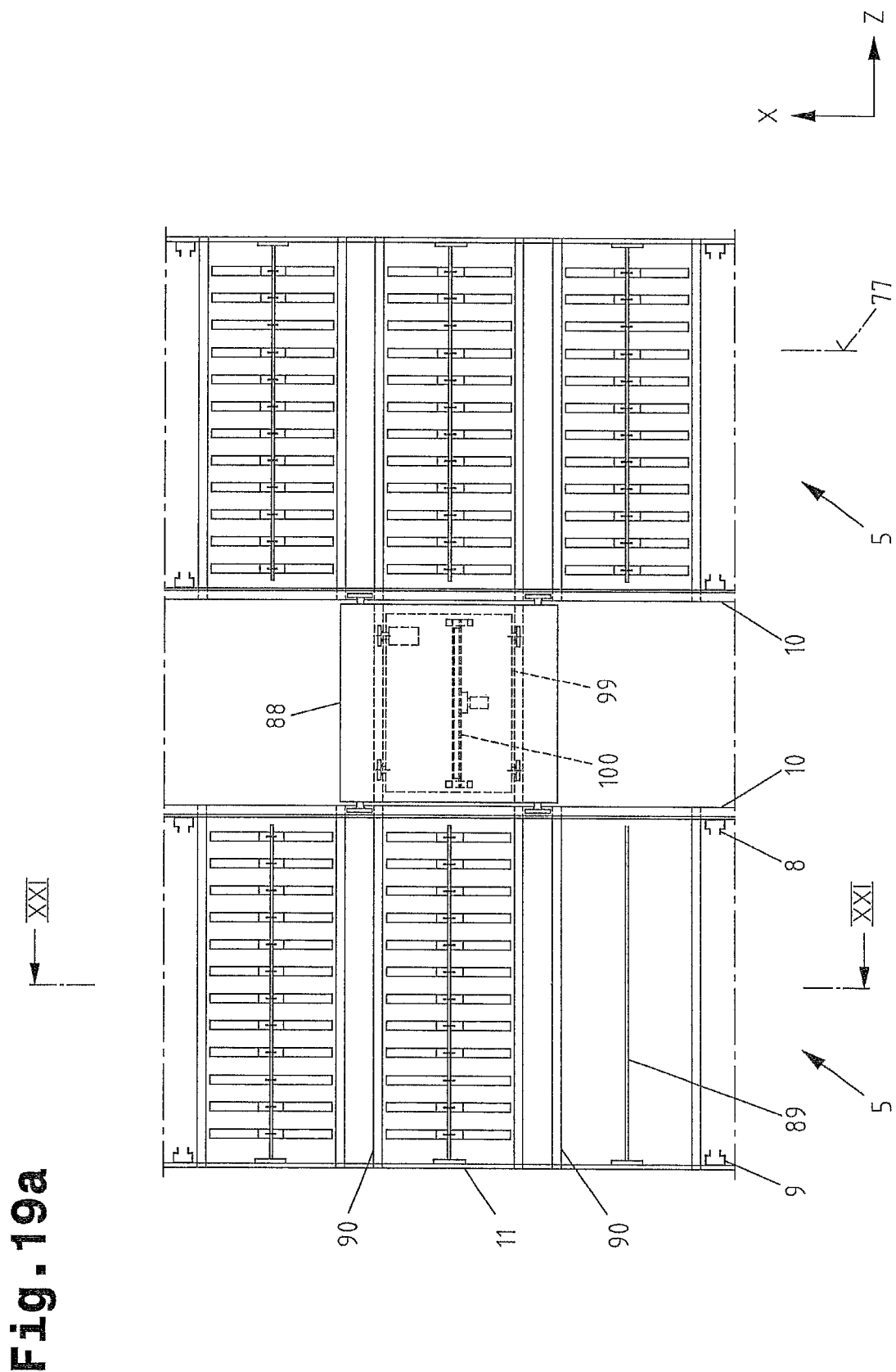
Figure 20:
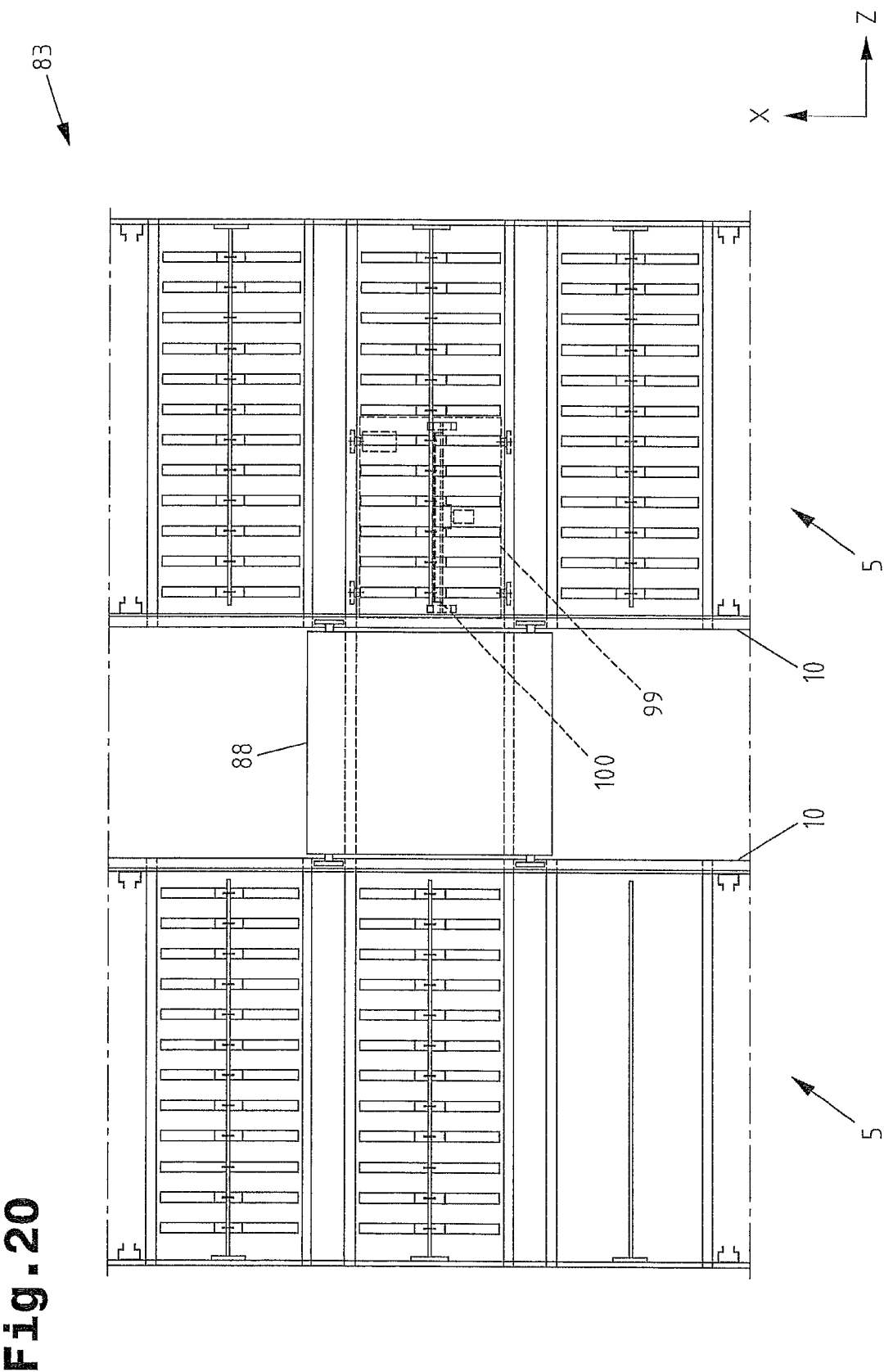
Figure 21:
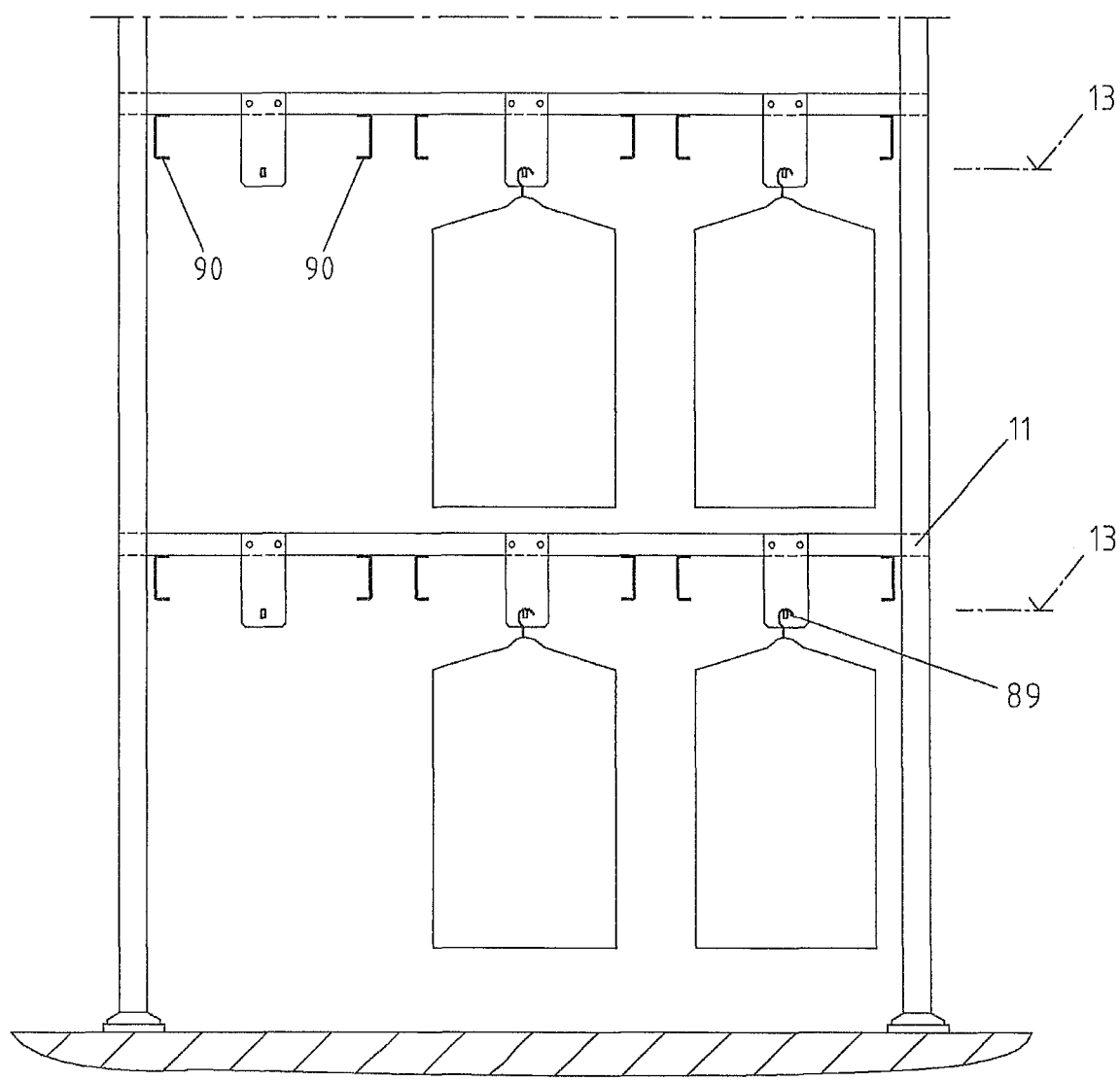
Figure 24:
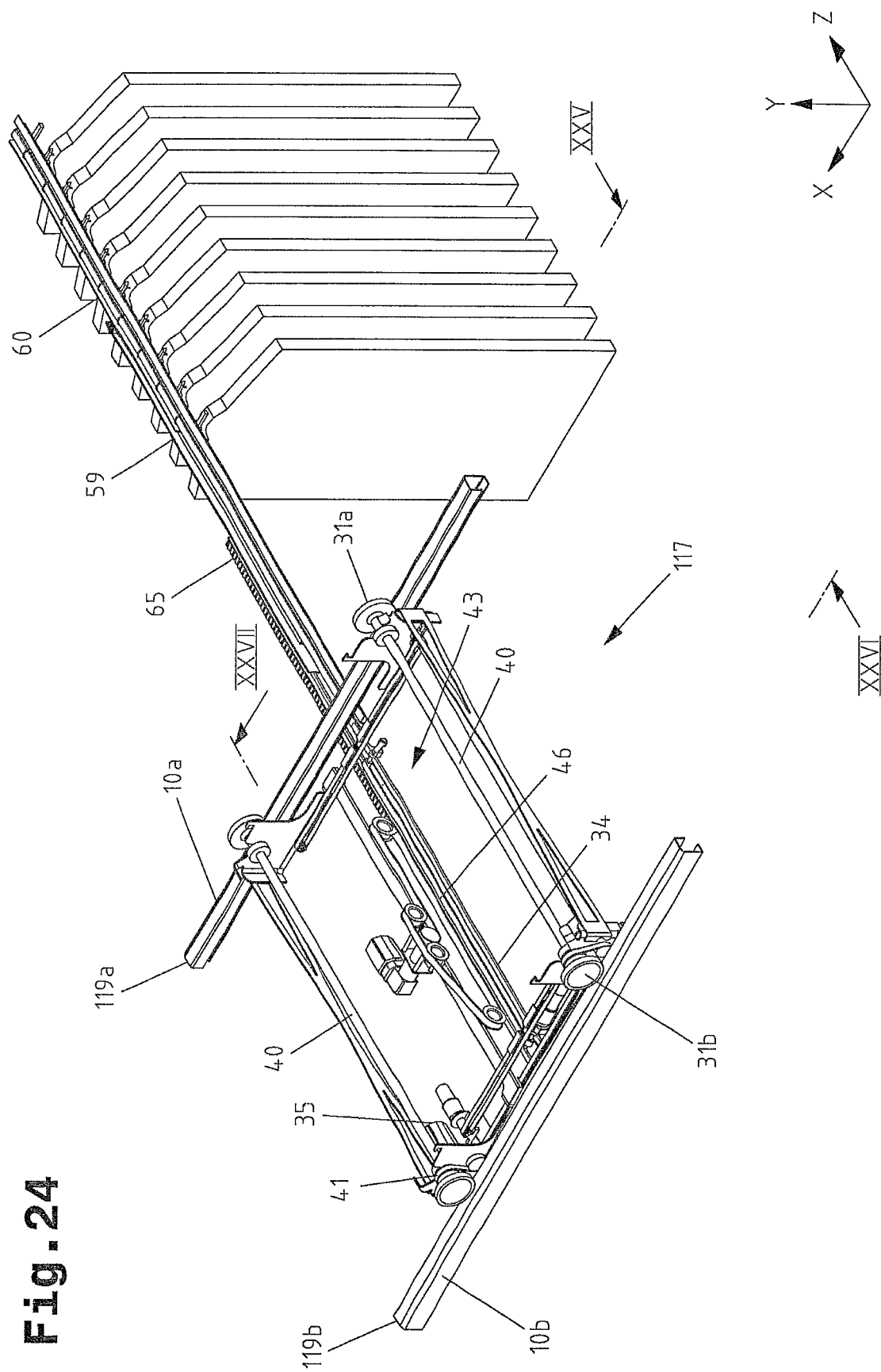
Figure 27A:
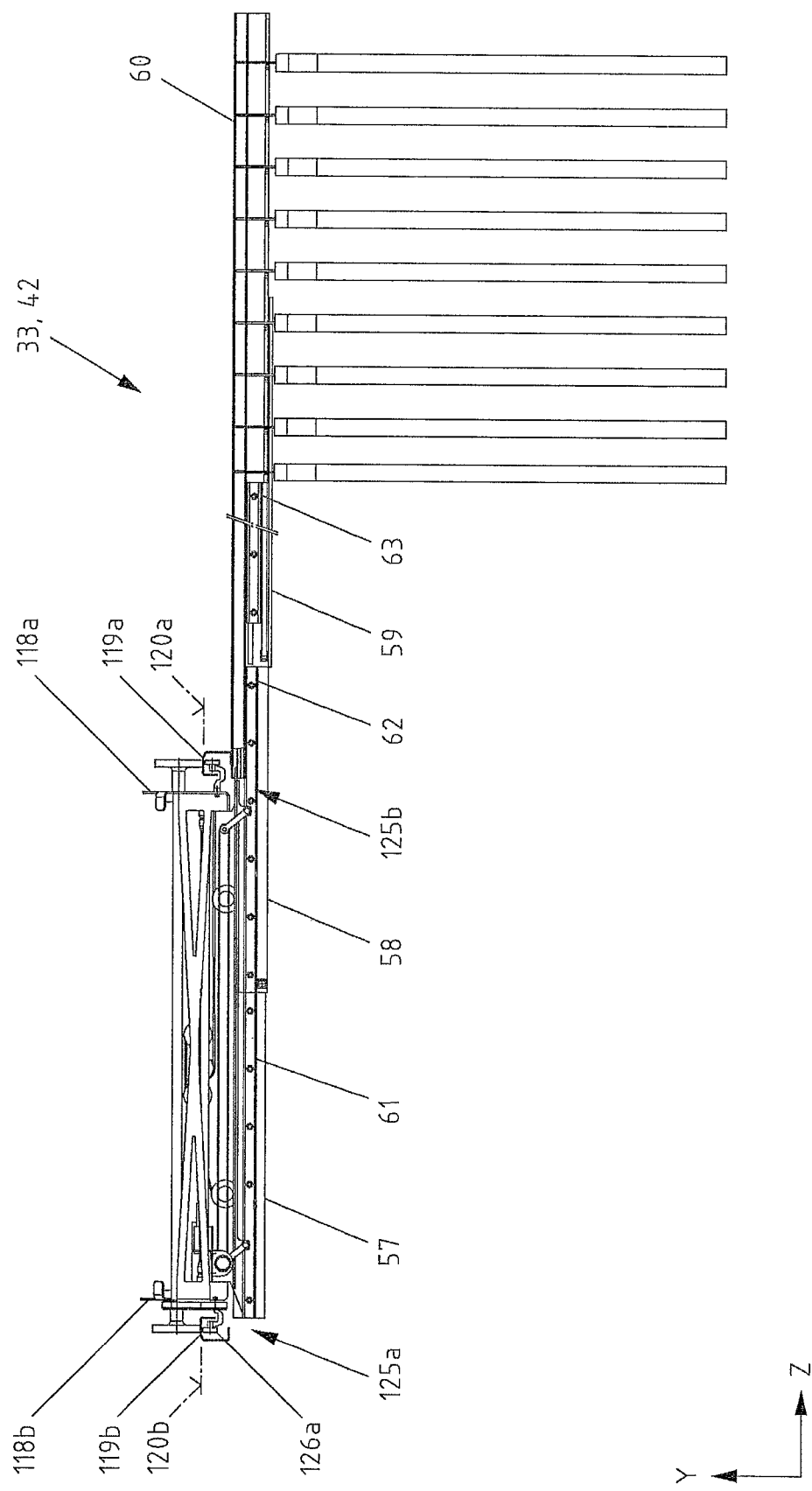
Figure 27B:
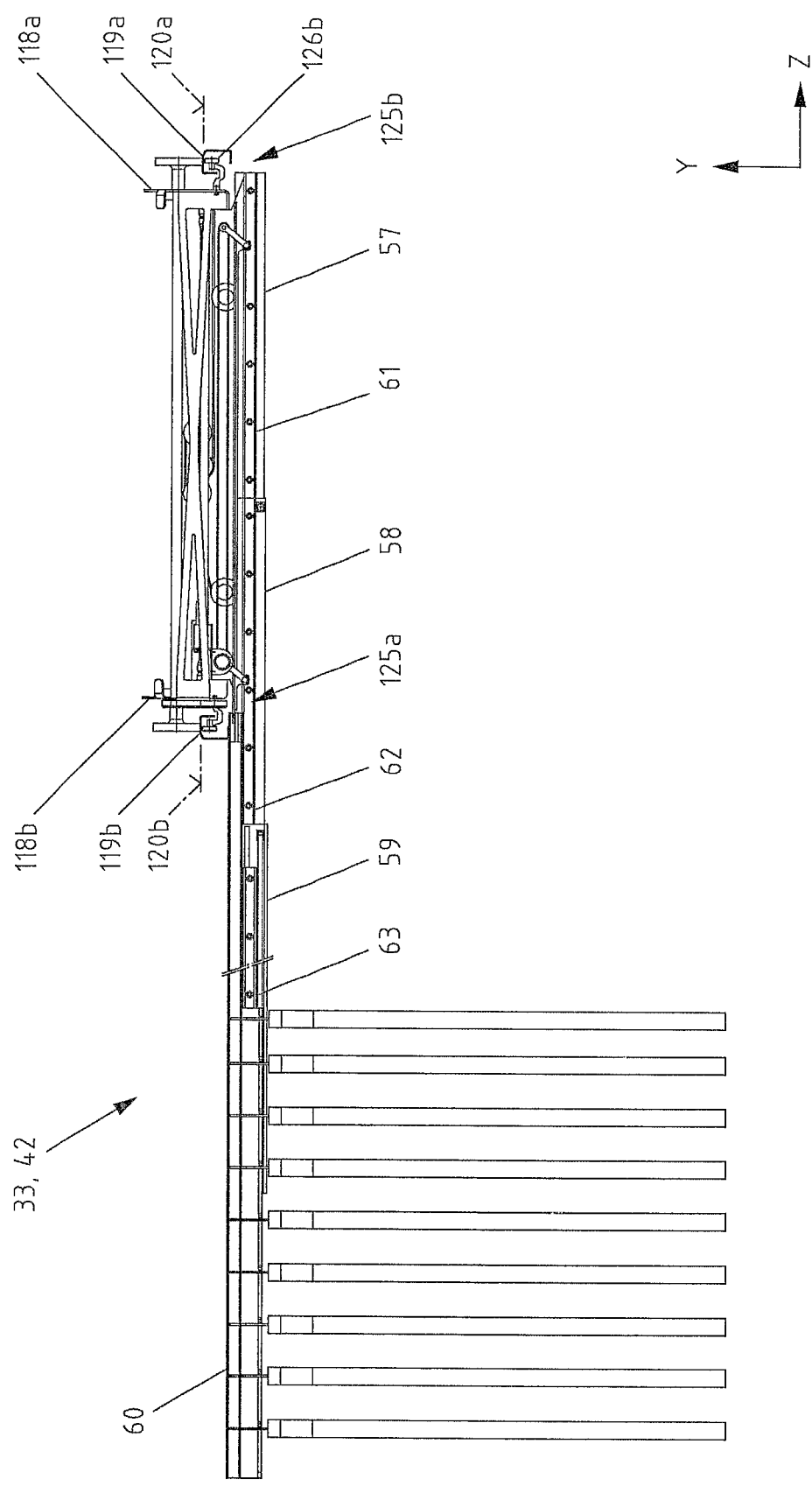
Figure 28:
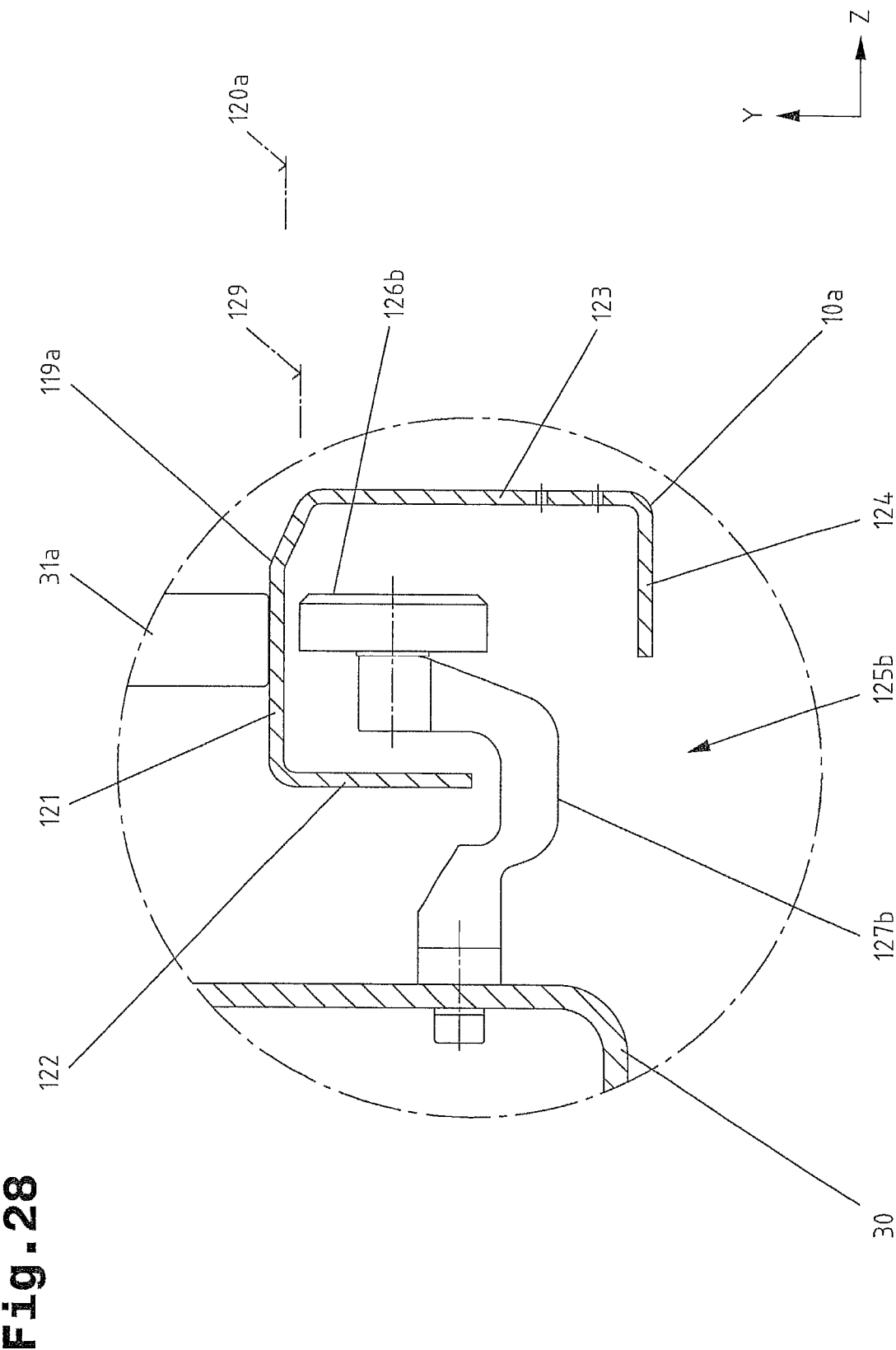
Figure 30A:
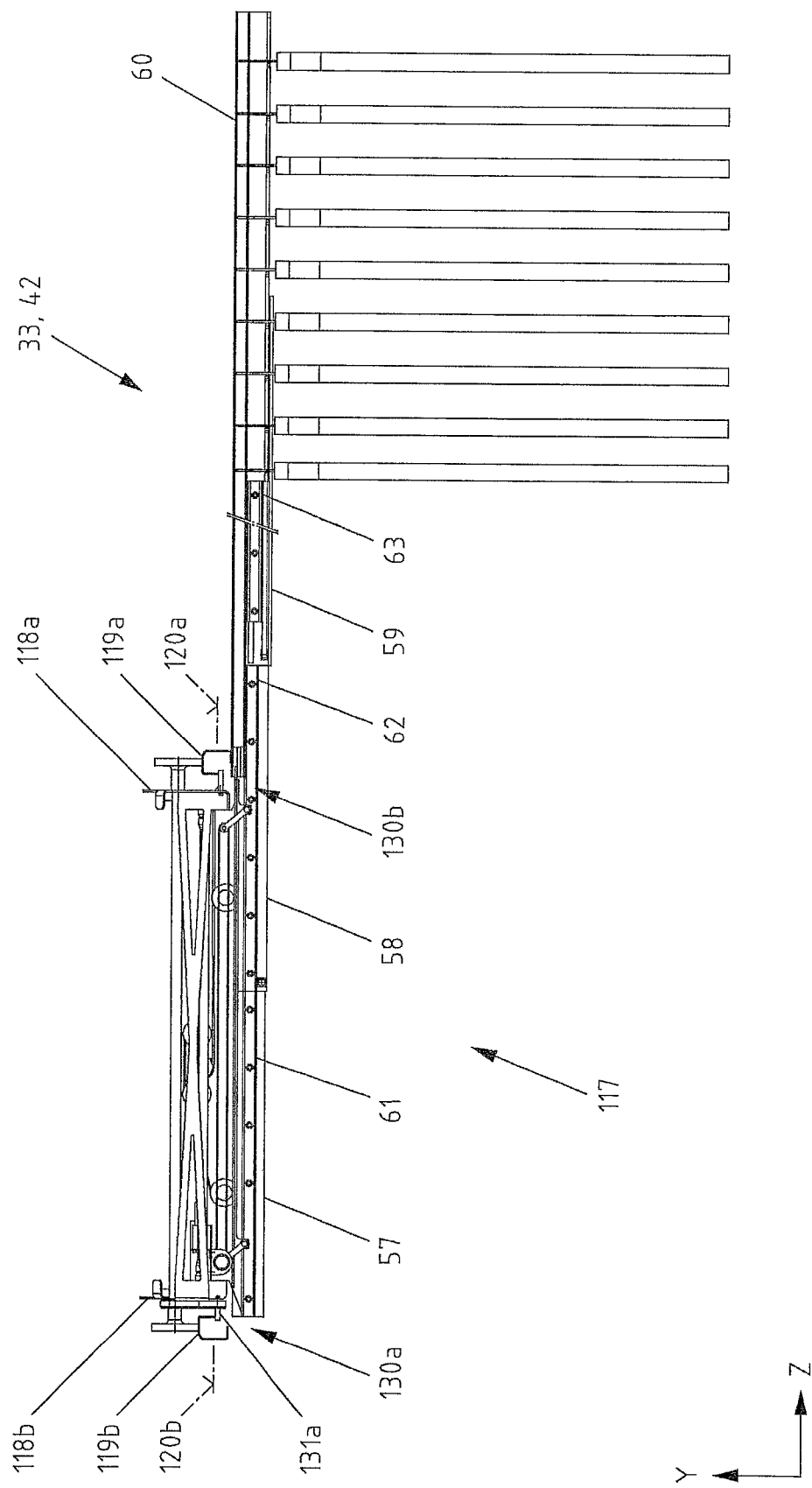

These are highly simplified, schematic diagrams illustrating:

FIG. 1 a first embodiment of a storage system for storing hanging goods, in a perspective view;

FIG. 2 a goods transport device for the storage system having a goods receiving carrier in an initial position and a goods displacement means in an initial position retracted in the z-direction, in a perspective view;

FIG. 3 a goods receiving carrier of a storage rack, viewed in section along line III-III indicated in FIG. 2;

FIG. 4 the goods transport device for the storage system having a goods receiving carrier in a first depositing position and a goods displacement means in a depositing position moved out in the z-direction, in a perspective view;

FIG. 5 a detail from FIG. 4 on a larger scale with the goods receiving carrier and the goods displacement means;

FIG. 6 the goods transport device with a goods receiving carrier in an initial position and a goods displacement means in an initial position retracted in the x-direction, viewed along line VI-VI indicated in FIG. 2;

FIG. 7 the goods transport device with a goods receiving carrier in an initial position and a goods displacement means in an initial position retracted in the x-direction, viewed along line VII-VII indicated in FIG. 2;

FIG. 8 the goods transport device with a goods receiving carrier in a first depositing position and a goods displacement means in an initial position retracted in the x-direction;

FIG. 9 the goods transport device with a goods receiving carrier in a first depositing position and a goods displacement means in an operating position retracted in the x-direction;

FIG. 10 the goods transport device from FIG. 6 with a goods receiving carrier in an initial position and a goods displacement means in an initial position retracted in the x-direction and in an initial position retracted in the z-direction, in a side view;

FIG. 11 a detail from FIG. 10 on a larger scale with the goods receiving carrier of the goods transport device in an initial position and the goods receiving carrier of the storage rack;

FIG. 12 the goods transport device with a goods receiving carrier in a first depositing position and a goods displacement means in an operating position retracted in the x-direction and in an initial position retracted in the z-direction, in a side view;

FIG. 13 a detail from FIG. 12 on a larger scale with the goods receiving carrier of the goods transport device in a first depositing position and the goods receiving carrier of the storage rack;

FIG. 14 the goods transport device with a goods receiving carrier in a first depositing position and a goods displacement means in an operating position retracted in the x-direction and in a depositing position (storage operation), retracted in the z-direction, in a side view;

FIG. 15 the goods transport device with a goods receiving carrier in a second depositing position and a goods displacement means in an operating position retracted in the x-direction and in a receiving position (retrieval operation) retracted in the z-direction, in a side view;

FIG. 16 a detail from FIG. 15 on a larger scale with the goods receiving carrier of the goods transport device in a second depositing position and the goods receiving carrier of the storage rack;

FIG. 17 the goods transport device from FIG. 1 with a goods displacement device lock system, in a perspective view;

FIG. 18 a goods transport device with a goods displacement means for a second embodiment of a storage system for storing hanging goods based on FIGS. 19a, 19b viewed in elevation;

FIG. 19a, 19b a second embodiment of a storage system for storing hanging goods with the goods displacement means on the goods transport device, seen in plan view;

FIG. 20 a detail from the storage system with the goods transport device and the separate goods displacement means, seen in plan view;

FIG. 21 a detail from the storage system, viewed along line XXI-XXI indicated in FIG. 19a;

FIG. 22 an alternative embodiment of a goods transport device and a goods displacement means, seen in plan view;

FIG. 23 a detail from FIG. 22 on a larger scale with the goods displacement means in front view;

FIG. 24 the goods transport device based on the embodiment illustrated as an example in FIG. 2 in a modified embodiment with a goods receiving carrier in a first depositing position and a goods displacement means in a depositing position moved out in the z-direction, in a perspective view;

FIG. 25 the goods transport device from FIG. 24, viewed along line XXV;

FIG. 26 the goods transport device from FIG. 24, viewed along line XXVI;

FIG. 27a, 27b the goods transport device with a first embodiment for a stop device from FIG. 24 and goods transport means moved out in the opposite direction, in a front view;

FIG. 28 a detail of the goods transport device from FIG. 24 with the stop device and a guide rail for the goods transport device, in a front view seen in section along line XXVII-XXVII;

FIG. 29 the stop device from FIG. 28, in a perspective view seen from underneath;

FIG. 30a, 30b the goods transport device with a second embodiment for a stop device and goods transport means moved out in the opposite direction, in a front view;

FIG. 31 a detail of the goods transport device from FIGS. 30a, 30b with the stop device and a guide rail for the goods transport device, in a front view seen in section.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIG. 1 illustrates a first embodiment of an automated storage system 1 for storing hanging goods 2 (hereafter referred to as hanging goods) and an automated goods distribution system 3 in a perspective view. The goods 2 are articles of clothing for example, which are hung on clothes hangers 4. The goods distribution system 3 comprises a delivery and receiving station 14, 15 and vertical conveyor(s) 18 which will be described below. It should be pointed out that with a view to retaining better clarity, the vertical conveyor 18 is only partially illustrated. The goods receiving carriers 16 of the delivery and receiving station 14, 15 are also illustrated in only one of the storage levels with a view to retaining better clarity.

In the embodiment illustrated, the storage system 1 comprises storage racks 5 and goods transport devices 7 displaceable independently of one another in a first direction (x-direction) in travel planes 6 lying one above the other in front of the storage racks 5. The goods transport devices 7 are used to place store the goods 2 in storage in the storage rack 5 and/or retrieve the goods 2 from the storage rack 5. In FIG. 1, with a view to retaining better clarity, only some of the goods transport devices 7 are illustrated. Such a storage system 1 is usually provided with a goods transport device 7 in each travel plane 6. However, there may be fewer goods transport devices 7 than there are travel planes 6, in which case the goods transport devices 7 can then be converted to a lifting device between the travel planes 6, although this is not illustrated.

The storage racks 5 comprise vertical front rack posts 8, vertical rear rack posts 9, front longitudinal members 10, rear longitudinal members 11 and goods receiving carriers 12. The front longitudinal members 10 extend horizontally in the x-direction and are secured to the front posts 8, and the front longitudinal members 10 lying opposite one another in pairs respectively form a travel plane 6 along which the goods transport device 7 is moved. The front longitudinal members 10 thus form guide rails for the goods transport device 7 in each travel plane 6. The rear longitudinal members 11 extend horizontally in the x-direction and are secured to the rear posts 9.

The goods receiving carriers 12 extend respectively horizontally in a storage level 13 in a depth direction (z-direction) of the storage rack 5 between the front longitudinal members 10 and rear longitudinal members 11 and the goods 2 are hung on the goods receiving carriers 12 by means of the clothes hangers 4. The goods receiving carriers 12 are disposed in a stationary arrangement in the storage rack 5, for example screwed to the longitudinal members 10, 11. Every goods receiving carrier 12 forms a storage space and a plurality of goods 2 can be stored in a storage space. Accordingly, each storage rack 1 forms a plurality of storage spaces or storage regions in the storage levels lying one above the other 13 respectively adjacent to one another.

As illustrated by a front view in section in FIG. 3, the goods receiving carrier 12 has a supporting flange and a mounting flange. The supporting flange is formed by a horizontal supporting leg 49 and a profile leg 52 extending downwards therefrom. The mounting flange is formed by a horizontal profile leg 53, a profile leg 54 extending upwards therefrom and a mounting leg 55. Profile leg 52 and profile leg 54 extend parallel with one another at a mutual distance apart and thus form a groove-type receiving region into which the clothes hangers 4, indicated by broken lines, can extend. At the top end, the supporting leg 49 forms the storage level 13 for the clothes hangers 4 (indicated by broken lines). The mounting leg 55 is laid against the longitudinal members 10, 11 and screwed to them, for example. It may also be of advantage if the goods receiving carrier 12 (optionally) has notches 56 disposed one after the other on the supporting leg 49 along the parallel longitudinal edges and lying opposite one another. These notches 56 enable the clothes hangers 4 to be positioned and/or centered relative to the goods receiving carrier 12.

As schematically illustrated in FIG. 1, the storage system 1 further comprises a delivery station 14 along which the front longitudinal members 10 of each travel plane 6 extend and at which hanging goods 2 to be stored are collected by the goods transport device 7 and transferred to a receiving station 15 along which the front longitudinal members 10 in each travel plane 6 extend and to which hanging goods 2 to be retrieved are transferred by the goods transport device 7. The delivery and receiving stations 14, 15 serve as a buffer between a vertical conveyor 18 and the goods transport device 7.

In this example of an embodiment, the delivery station 14 and receiving station 15 of each storage level 13 have at least one goods receiving carrier 16. However, more than one goods receiving carrier 16 may also be provided, for example the delivery station 14 and receiving station 15 of each storage level 13 may have two goods receiving carriers 16. If the delivery station 14 and receiving station 15 are disposed on both sides of the goods transport device 7, a goods receiving carrier 16 is disposed in the delivery station 14 in each storage level 13 and a goods receiving carrier 16 is disposed in the receiving station 15 in each storage level 13. Such an embodiment is of particular advantage if a high performance rate is required.

The goods receiving carriers 16 of the delivery station 14 are respectively displaceable by means of an actuator drive between a holding position (as indicated by broken lines) and a depositing position (as indicated by solid lines), and in the holding position, goods 2 can be picked up by a vertical conveyor 18 that will be described in more detail below and placed on the goods receiving carrier 16 and in the depositing position, goods 2 can be transferred from the goods receiving carrier 16 to the goods transport device 7.

The actuator drive comprises a mounting plate 19 that is rotatable about a vertical axis by means of a drive motor (not illustrated), on which the at least one goods receiving carrier 16 is mounted. The at least one goods receiving carrier 16 extends parallel with the goods receiving carriers 12 in the holding position and perpendicular to the goods receiving carriers 12 in the depositing position.

The goods receiving carriers 16 of the receiving station 15 are respectively displaceable by means of an actuator drive between a receiving position (as indicated by solid lines) and a dispatching position (as indicated by broken lines) and in the receiving position, goods 2 can be transferred by the goods transport device 7 to the goods receiving carrier 16 and in the dispatching position, goods 2 can be transferred from the goods receiving carrier 16 to a vertical conveyor 18 that will be described in more detail below. The actuator drive comprises a mounting plate 19 that is rotatable by means of a drive motor (not illustrated) about a vertical axis on which the at least one goods receiving carrier 16 is mounted. The at least one goods receiving carrier 16 extends parallel with the goods receiving carriers 12 in the receiving position and perpendicular to the goods receiving carriers 12 in the dispatching position.

In the embodiment illustrated, the goods receiving carrier 16 of the receiving and/or delivery station 14, 15 is of the same design as the goods receiving carrier 12 of the storage rack 5.

The vertical conveyor 18 connects the storage levels 13 to at least one conveyor system plane and is disposed in the extension of the storage racks 5. Accordingly, the first vertical conveyor 18 may be disposed at the end in front of the delivery station 14 and the second vertical conveyor 18 at the end in front of the receiving station 15. Alternatively, the first vertical conveyor 18 may also be integrated in the first storage rack 5 and the second vertical conveyor 18 may also be integrated in the second storage rack 5 so that storage spaces may be disposed before and after the vertical conveyor 18 in the x-direction, although this is not illustrated.

The vertical conveyors 18 respectively comprise a guide frame 21, a lifting frame 22 which can be raised and lowered, at least one goods receiving carrier 23 and a goods transfer device 24. The at least one goods receiving carrier 23 is secured on the lifting frame 22 and extends parallel with the x-direction. In the embodiment illustrated, the goods receiving carrier 23 of the vertical conveyor 18 is of the same design as the goods receiving carrier 12 of the storage rack 5.

The goods 2 can be conveyed by means of the goods transfer device 24 between the goods receiving carrier 16 of the receiving and/or delivery station 14, 15 and the goods receiving carrier 23 on the vertical conveyor 18. The goods 2 may also be conveyed by means of the goods transfer device 24 between the goods receiving carrier 23 and the vertical conveyor 18 and a goods receiving carrier 25 of a conveyor system 26, 27.

The guide frame 21 is made up of vertical frame parts, a bottom cross-member connecting the latter to one another and a top cross-member connecting them to one another. The vertical frame parts are respectively provided with a guide device on which the lifting frame 22 is mounted via guide elements. The guide elements are preferably configured as guide wheels which are able to roll on guide tracks of the guide device.

The lifting frame 22 is coupled with a displacement device which, in the embodiment illustrated as an example, comprises a traction drive 28 mounted on the guide frame 21 and at least one lift drive 29. The traction drive 28 comprises synchronously driven, continuously circulating traction means which are respectively guided around a (top) guide pulley and a (bottom) drive wheel coupled with the lift drive. The traction means is provided in the form of a toothed belt, a chain or similar, for example. The lift drive 29 is preferably provided in the form of an electric motor, in particular an asynchronous motor, synchronous motor and similar, and is mounted on the guide frame 21. Due to the rotating movement of the drive wheels, the lifting frame 22 together with the goods receiving carrier 23 is moved relative to the storage levels 13 in the vertical direction (y-direction).

The first vertical conveyor 18 adjoins a first conveyor system for transporting goods 2 in and the second vertical conveyor 18 adjoins a second conveyor system for conveying goods 2 out. The first conveyor system 26 and second conveyor system 27 are preferably operated on an automated basis.

FIGS. 2 and 4 illustrate the front longitudinal members 10 of one of the travel planes 6, the goods transport device 7 and a storage space with a goods receiving carrier 12 in a perspective view.

The goods transport device 7 (see also FIGS. 6 to 16) based on this embodiment is a single-level rack serving device and has a base frame 30, wheels 31, a drive unit 32, a storage and removal device 33 and a goods receiving carrier 34. The wheels 31 are disposed on the two longitudinal sides of the base frame 30.

Based on a first possible embodiment, the drive unit 32 (FIGS. 4, 7) comprises an electric drive motor 35, a drive wheel 36, a guide pulley 37, guide wheels 38, a continuously circulating traction means 39 and drive shafts 40. The wheels 31 are attached to the ends of the drive shafts 40. The traction means 39 is guided around the drive wheel 36, guide pulley 37 and guide wheels 38 and about a drive section 41 on the drive shafts 40. In this manner, the two wheels 31 on the first side of the goods transport device 7 are driven. The drive shafts 40 transmit the driving torque from the first side to the second side of the goods transport device 7 so that the two wheels 31 on the second side are also driven.

If all four of the wheels are to be driven, each wheel may be coupled with a drive motor based on a second embodiment and the drive motors are controlled on a synchronized basis.

Based on a third embodiment, it may be that only one drive wheel pair is driven, for example the front drive wheel pair or rear drive wheel pair in the direction of travel of the goods transport device 7.

In the embodiment illustrated, the storage and removal device 33 comprises a goods displacement means 42 that can be moved in the z-direction relative to the goods receiving carrier 34.

As may be seen from the drawings, the goods receiving carrier 34 is configured as a lifting bar which extends in the z-direction and is displaceable by means of a displacement device 43 between an initial position (FIGS. 2, 6, 7, 10, 11) and a first/second depositing position (FIGS. 4, 8, 9, 12, 13, 15, 16). The displacement device 43 comprises a pivot lever arrangement and a traction drive. The pivot lever arrangement has a first pivot lever 44 and a second pivot lever 44 which are respectively connected in a (top) first end region to a pivot shaft 45 extending in the x-direction. The pivot shafts 45 are pivotable on a frame profile (not illustrated) which is mounted on the base frame 30. The traction drive comprises a traction means, in particular a toothed belt 46, which is guided around a drive section on the pivot shafts 45. One of the pivot shafts 45 is coupled with a drive motor 47.

The lifting bar is articulatingly connected at its front end region to the first pivot lever 44 and at its rear end region to the second pivot lever 44, as may be seen in FIG. 10 for example.

In FIGS. 10, 11, the goods receiving carrier 34 and/or the lifting bar is in the initial position. The goods 2 are hung on the lifting bar by clothes hangers 4. In the initial position, a horizontal support plane 48 extends on the goods receiving carrier 34 underneath the storage level 13 and a front edge 51 of the goods receiving carrier 34 is set back from the front edge 50 of the goods receiving carrier 12 in the z-direction, as illustrated by the detail in FIG. 11.

In FIGS. 12, 13, the goods receiving carrier 34 or lifting bar is in a first depositing position. In the first depositing position, the gap between the front edge 50 of goods receiving carrier 12 and the front edge 51 of goods receiving carrier 34 is bridged. Accordingly, the goods receiving carrier 34 or lifting bar is raised compared with the height in the initial position. A horizontal support plane 48 on the goods receiving carrier 34 extends above the storage level 13 in the first depositing position and the goods receiving carrier 34 extends in the z-direction beyond the front edge 50 of the goods receiving carrier 12 and the goods receiving carrier 34 is supported on the goods receiving carrier 12 by a supporting leg 49 during the movement into storage, as illustrated in the detail in FIG. 13. Even heavy goods 2, for example coats, etc., can be manipulated between the goods receiving carrier 34 of the goods transport device 7 and the goods receiving carrier 12 of the storage rack 5. During the movement of the goods 2 into storage (arrow 20), the clothes hangers 4 slide on the goods receiving carrier 34 of the goods transport device 7 and the goods receiving carrier 12 of the storage rack 5, as will be described in more detail below.

In FIGS. 15, 16, the goods receiving carrier 34 or lifting bar is in a second depositing position. In the depositing position, the gap between the front edge 50 of goods receiving carrier 12 and the front edge 51 of goods receiving carrier 34 is bridged. Accordingly, the goods receiving carrier 34 and/or lifting bar is raised compared with the height in the initial position. A horizontal support plane 48 on the goods receiving carrier 34 extends underneath the storage level 13 in the second depositing position and the goods receiving carrier 34 extends in the z-direction beyond the front edge 50 of goods receiving carrier 12 and the goods receiving carrier 34 is supported on the goods receiving carrier 12 by a supporting leg 49, as illustrated in the detail in FIG. 16. This enables a reliable transfer of the goods 2 during the retrieval movement (arrow 20). During the movement to retrieve the goods 2, the clothes hangers 4 slide on the goods receiving carrier 12 of the storage rack 5 and the goods receiving carrier 34 of the goods transport device 7, as will be described in more detail below.

As may be seen from FIGS. 4, 6 and 14, the storage and removal device 33 based on this example of an embodiment is provided in the form of a telescopic unit which is arranged on the base frame 30 and can be moved out from an initial position in both z-directions so that goods 2 can be stored in and goods 2 can be retrieved from storage racks 5 disposed on both sides of the goods transport device 7.

The telescopic unit has a supporting frame 57 and rails 58, 59, 60 which can be retracted and extended horizontally in the z-direction relative to the supporting frame 57.

The first rail 58 is mounted so as to be slidable by means of a guide arrangement 61 on the supporting frame 57 and the second rail 59 is mounted so as to be slidable by means of a guide arrangement 62 on the first rail 40 and the third rail 60 is mounted so as to be slidable by means of a guide arrangement 63 on the second rail 59. The first rail 58 can be moved relative to the supporting frame 57 by means of a drive device mounted on the supporting frame 57. The drive device comprises a first drive means 64, in particular a traction drive, and a second drive means 65, in particular a toothed rack arrangement. The first drive means 64 and second drive means 65 are connected in a driving relationship. The traction drive comprises at least one driven, continuously circulating traction means which is guided around deflector wheels and a drive wheel coupled with a drive motor 66. The traction means are provided in the form of a toothed belt, a chain or similar, for example. The drive motor 66 is preferably an electric motor. Due to the rotating movement of the drive wheel, the first rail 40 is moved out either in the direction of a first z-direction or in the direction of a second z-direction depending on the direction of rotation.

As illustrated in FIG. 8 for example, a first belt 67 is deflected around a (front) first roller mounted on the first rail 58 and is secured by its first end to the supporting frame 57 and by its second end to the second rail 59. A second belt 68 is deflected around a (rear) second roller mounted on the first rail 58 and is secured by its first end to the supporting frame 57 and by its second end to the second rail 59. When the first rail 58 is moved by the drive device, the second rail 59 is also moved by the belt 67, 68 at the same time, in other words either retracted or moved out.

Furthermore, a first belt 69 is deflected around a (front) first roller mounted on the second rail 58 and is secured by its first end to the first rail 58 and by its second end to the third rail 60. A second belt 70 is deflected around a (rear) second roller mounted on the second rail 58 and is secured by its first end to the first rail 58 and by its second end to the third rail 60. Accordingly, when the second rail 59 is moved, the third rail 60 is also moved by the belt 69, 70 at the same time, in other words either retracted or moved out.

The third rail 60 comprises outer/inner driving members 71 for shifting goods 2 between goods receiving carriers 12, 34 or goods receiving carriers 16, 34. The outer driving members 71 are disposed in oppositely lying end regions of the third rail 60 and the inner driving members 71 are disposed between the outer driving members 71, and every driving member 71 is connected to the third rail 60 in a fixed (non-moving) arrangement. The inner driving members 71 may form inclined engaging surfaces 72 converging at the end region, as may be seen in FIG. 5, thereby enabling tightly packed clothes hangers 4 to be separated. The telescopic unit constitutes the goods displacement means 42. The outer/inner driving members 71 constitute gripper units.

The storage and removal device 33 or telescopic unit is coupled with a displacement device by means of which the storage and removal device 33 or telescopic unit can be moved in the x-direction between an initial position (FIGS. 6, 7, 8) and an operating position (FIG. 9). In the initial position, the outer/inner driving members 71 are moved out of the displacement path of the goods 2, in particular the clothes hangers 4. In the operating position, the outer/inner driving members 71 are moved into the displacement path of the goods 2, in particular the clothes hangers 4, so that the outer/inner driving members 71 engage round the clothes hangers 4 of the goods 2. In other words, the outer/inner driving members 71 and/or gripper units may be moved relative to the goods receiving carrier 34 in the x-direction.

Based on the embodiment illustrated as an example, the displacement device (FIGS. 2, 6, 7) comprises a traction drive mounted on the base frame 30 which is coupled with the supporting frame 57. The supporting frame 57 is mounted by its oppositely lying end regions on guides 73. The guides 73 extend in the x-direction and are secured to the base frame 30. The traction drive comprises synchronously driven, continuously circulating traction means 74, and a first traction means is guided around a guide pulley mounted on the base frame 30 and a drive wheel mounted on the base frame 30 and a second traction means is guided around pulley wheels mounted on the base frame 30. The guide pulley for the first traction means 74 and one of the pulley wheels for the second traction means 74 are connected to one another by a drive shaft 75. The traction means is a toothed belt, a chain or similar, for example. The drive wheel is connected to a drive motor 76.

Based on another embodiment although not illustrated, the outer/inner driving members 71 mounted on the third rail 60 may respectively be coupled with an electric drive motor by means of which the outer/inner driving members 71 can be pivoted between an initial position and an operating position. In this case, the displacement device can be dispensed with. In the initial position, the outer/inner driving members 71 are moved out of the displacement path of the goods 2. In the operating position, the outer/inner driving members 71 are moved into the displacement path of the goods 2 so that the outer/inner driving members 71 engage round the clothes hangers 4 of the goods 2.

FIG. 17 provides a schematic illustration of the goods transport device 7. As may be seen, the goods transport device 7 is additionally equipped with a goods transport lock system which enables the goods 2 suspended on the goods receiving carrier 34 by clothes hangers 4 to be held in position substantially parallel with the hanging plane 77 during the travelling movement of the goods transport device 7. This limits or prevents any turning of the goods 2 relative to the goods receiving carrier 34 during the travelling movement of the goods transport device 7.

The goods transport lock system comprises goods locking means 79 disposed on the mutually opposite longitudinal sides of the goods transport device 7 and secured to its base frame 30 which respectively have a lock finger 81 which can be displaced by means of an actuator drive 80 between an initial position (indicated by broken lines) and a locking position (indicated by solid lines). To this end, the lock fingers 81 are mounted on a retaining arm 82 so as to be pivotable about a pivot shaft extending in the z-direction. The actuator drive 80 comprises a drive motor, in particular an electric motor, which is likewise mounted on the retaining arm 82 and is coupled with the lock finger 81. A positioning plane of the lock finger 81 extends parallel with the hanging plane 77.

In the initial position, the lock fingers 81 are moved out of the displacement path of the goods 2 extending in the z-direction. In the locking position, the lock fingers 81 are moved into displacement path of the goods 2 extending in the z-direction so that the lock fingers 81 engage round either the clothes hangers 4 or the goods 2. When goods 2 are being conveyed between the goods transport device 7 and the storage rack 5 or the goods transport device 7 and the receiving and/or delivery station 14, 15, the lock fingers 81 are moved into the initial position beforehand.

Although the goods locking means 79 is arranged on the base frame 30 so that it cannot move in FIG. 17, it would just as easily be possible for the goods locking means 79 to be displaceable relative to one another in the z-direction, as indicated by broken lines in FIG. 17. This is primarily of advantage if there are fewer goods 2 hanging on the goods receiving carrier 34 than could be accommodated but these goods 2 nevertheless have to be reliably secured to prevent them from turning during the travelling movement. In principle, it would also be possible for the goods 2 hung on the goods receiving carrier 34 by the clothes hangers 4 to be pressed (lightly) together between the lock fingers 81. Before being moved into storage, the goods 2 may also be positioned on the longitudinal side of the goods transport device 7 adjacent to the storage space in which the goods 2 are to be stored, for example.

A storage operation and a retrieval operation will be described below.

Storage Operation (See FIGS. 2, 4, 8, 9, 10, 11, 12, 13, 14, 16)

The goods 2 to be stored are conveyed on the goods receiving carrier 25 of the first conveyor system 26 to the vertical conveyor 18. There, the goods 2 are conveyed from the goods receiving carrier 25 of the first conveyor system 26 to the goods receiving carrier 23 on the vertical conveyor 18. The movement conveying the goods 2 between the goods receiving carriers 23, 25 may take place by means of the goods transfer device 24. After that, the lifting frame 22 together with the goods receiving carrier 23 is moved vertically to the height of one of the storage levels 13 and the goods 2 conveyed from the goods receiving carrier 23 of the vertical conveyor 18 onto the goods receiving carrier 16 of the delivery station 14 (buffer). The movement conveying the goods 2 between the goods receiving carriers 16, 23 may take place by means of the goods transfer device 24. After that, the goods receiving carrier 16 of the delivery station 14 is moved from a holding position into a depositing position. In the depositing position, the goods transport device 7 which is assigned to the storage level 13 in which the goods 2 are to be stored in a storage space can now collect the goods 2 from the delivery station 14.

To this end, the goods transport device 7 is positioned in the x-direction in front of the goods receiving carrier 16 and the goods receiving carrier 34 (lifting bar) of the goods transport device 7 is moved out of an initial position (FIG. 11) into the second depositing position (FIG. 16). In the second depositing position, the horizontal support plane 48 on the goods receiving carrier 34 extends underneath a transfer plane (which corresponds to the storage level 13) and the goods receiving carrier 34 extends in the z-direction beyond the front edge 50 of the goods receiving carrier 16 and is supported on the goods receiving carrier 16, in particular on the supporting leg 49 (in the same way as illustrated on the goods receiving carrier 12 in the storage rack 5 in FIG. 16).

When the goods receiving carrier 34 (lifting bar) of the goods transport device 7 has been moved into the second depositing position (FIG. 16), the goods displacement means 42 is moved out from an initial position laterally adjacent to the goods receiving carrier 34 in the z-direction. After that, the goods displacement means 42 is moved in the x-direction relative to the goods receiving carrier 16 out of the initial position into the operating position in which the driving members 71 engage round the clothes hangers 4. In this context, only a single clothes hanger 4 (in the case winter coats, for example) or several clothes hangers 4 (in the case of summer frocks, for example) can be received between consecutive driving members 71.

As the goods displacement means 42 are retracted in the z-direction into the initial position, the goods 2 are conveyed by means of the driving members 71 from the goods receiving carrier 16 onto the goods receiving carrier 34. As this happens, the clothes hangers 4 slide by means of their hooks along the goods receiving carrier 16 and goods receiving carrier 34. After that, the goods receiving carrier 34 (lifting bar) of the goods transport device 7 is moved back into the initial position again.

Once the goods 2 have been received on the goods transport device 7, the latter can be moved in the x-direction to a defined storage space and positioned in front of a goods receiving carrier 12.

After that, the goods receiving carrier 34 (lifting bar) of the goods transport device 7 is moved out of an initial position (FIG. 11) into the first depositing position (FIG. 13). In the first depositing position, the horizontal support plane 48 on the goods receiving carrier 34 extends above the storage level 13 and the goods receiving carrier 34 extends in the z-direction beyond the front edge 50 of the goods receiving carrier 12 and is supported on the goods receiving carrier 12, in particular on the supporting leg 49.

The storage and removal device 33 or displacement means 42 is then moved in the x-direction out of an initial position (FIG. 6, 7, 8) into an operating position. In the operating position, the outer/inner driving members 71 are moved into the displacement path of the goods 2 so that the outer/inner driving members 71 engage round the clothes hangers 4 or hooks.

When the goods displacement means 42 is then moved out from an initial position laterally adjacent to the goods receiving carrier 34 in the z-direction, the goods 4 are then conveyed by means of the driving members 71 from the goods receiving carrier 34 onto the goods receiving carrier 12. As this happens, the clothes hangers 4 slide by their hooks along the goods receiving carrier 34 and goods receiving carrier 12.

When the goods 2 are disposed in the storage rack 5, the storage and removal device 33 or displacement means 42 is moved in the x-direction out of an operating position into an initial position (FIG. 6, 7, 8). After that, the storage and removal device 33 or displacement means 42 can be retracted in the z-direction into the initial position and the goods receiving carrier 34 (lifting bar) moved into the initial position.

As may be seen from the drawings, the goods 2 may be conveyed and stored as hanging goods groups 109 during the storage operation (FIG. 14). A hanging goods group 109 may comprise up to forty goods 2. In this context, a hanging goods group 109 contains one and the same goods 2. In other words, a hanging goods group 109 is respectively put together on the goods receiving carriers 16 of the delivery station 14 and a hanging goods group 109 is respectively received on the goods receiving carrier 34 of the goods transport device 7 and a hanging goods group 109 is respectively moved into storage on the goods receiving carrier 12 of the storage rack 5. Preferably, the goods receiving carrier 12 in the storage rack 5 can store two hanging goods groups 109 one after the other in the z-direction, as illustrated in FIG. 1.

In principle, it is also possible for the goods 2 to be conveyed and stored individually. This is the case if, after a picking operation, only one of the goods 2 (remaining item) of a hanging goods group 109 is left and has to be placed back in storage in the storage rack 5.

Retrieval Operation (See FIGS. 11, 15, 16)

To this end, the goods transport device 7 is positioned in the x-direction in front of one of the goods receiving carriers 12 and the goods receiving carrier 34 (lifting bar) of the goods transport device 7 is moved out of an initial position (FIG. 11) into the second depositing position (FIG. 16), as described above.

After that, the goods displacement means 42 is moved out from an initial position laterally adjacent to the goods receiving carrier 12 in the z-direction. After that, the goods displacement means 42 is moved in the x-direction relative to the goods receiving carrier 12 out of the initial position into the operating position in which the driving members 71 engage round the clothes hangers 4. In this context, only a single clothes hanger 4 (in the case of winter coats, for example) or several clothes hangers 4 (in the case of summer frocks, for example) may be received between consecutive driving members 71.

When the goods displacement means 42 is now retracted in the z-direction into the initial position, the goods 2 are conveyed by means of the driving members 71 from the goods receiving carrier 12 onto the goods receiving carrier 34. As this happens, the clothes hangers 4 slide by their hooks along the goods receiving carrier 12 and goods receiving carrier 34. When the goods 2 are disposed on the goods receiving carrier 34 (lifting bar), the latter is moved back into the initial position.

Once the goods 2 have been received on the goods transport device 7, the latter can be moved in the x-direction to the receiving station 15 and positioned in front of a goods receiving carrier 16.

After that, the goods receiving carrier 34 (lifting bar) of the goods transport device 7 can be moved out of an initial position (FIG. 11) into the first depositing position (FIG. 13). In the first depositing position, a horizontal support plane 48 on the goods receiving carrier 34 extends above a transfer plane (which corresponds to the storage level 13) and the goods receiving carrier 34 extends in the z-direction beyond the front edge 50 of the goods receiving carrier 12 and the goods receiving carrier 34 is supported on the goods receiving carrier 12, in particular on the supporting leg 49 (in the same way as on goods receiving carrier 12 in storage rack 5 illustrated in FIG. 13).

The goods 2 to be retrieved are then transferred from the goods transport device 7 to the receiving station 15. The goods 2 are thus conveyed by means of the goods displacement means 42 from the goods receiving carrier 34 (lifting bar) onto the goods receiving carrier 12 in the z-direction.

When the goods 2 to be retrieved have been received on a goods receiving carrier 16 of the receiving station 14, the latter is moved out of a receiving position into a dispatching position. After that, the goods 2 are conveyed by means of the goods transfer device 24 from the goods receiving carrier 16 onto the goods receiving carrier 23 of the vertical conveyor 18. After that, the lifting frame 22 together with the goods receiving carrier 23 is moved vertically to the height of a conveyor system plane and the goods 2 are conveyed from the goods receiving carrier 23 of the vertical conveyor 18 onto the goods receiving carrier 25 of the second conveyor system 27. The conveying movement of the goods 2 between the goods receiving carriers 23, 25 may take place by means of the goods transfer device 24. The second conveyor system 27 conveys the goods 2 to a picking station or a packing station.

As may be seen from the drawings, the goods 2 may also be conveyed and stored as hanging goods groups 109 during a retrieval operation.

In principle, it is also possible for the goods 2 to be conveyed and stored separately. This is the case if only a single one of the goods 2 of a hanging goods group 109 is needed for a picking operation/packing operation.

FIGS. 18 to 21 illustrate a second embodiment of an automated storage system 83 for storing hanging goods 2 and will be described together. The storage system 83 likewise comprises an automated goods distribution system 84. The goods distribution system 84 comprises the delivery and receiving stations 85, 86 and the vertical conveyor(s) 87 described below.

In the embodiment illustrated, the storage system 83 comprises storage racks 5 and goods transport devices 88 displaceable independently of one another in front of the storage racks 5 in a first direction (x-direction) in travel planes 6 lying one above the other. The goods transport devices 88 are used to place the goods 2 into storage in the storage rack 5 and/or to retrieve the goods 2 from the storage rack 5. Such a storage system is usually provided with a goods transport device 88 in every travel plane 6. However, it may be that there are fewer goods transport devices 88 than there are travel planes 6, in which case the goods transport devices 88 can be moved between the travel planes 6 by means of a lifting device, although this is not illustrated.

The storage racks 5 comprise vertical front rack posts 8, vertical rear rack posts 9, front longitudinal members 10, rear longitudinal members 11 and goods receiving carriers 89. The front longitudinal members 10 extend one above the other respectively horizontally in the x-direction and are secured to the front posts 8, and the pairs of mutually opposite front longitudinal members 10 respectively form a travel plane 6 along which the goods transport device 88 is moved. The front longitudinal members 10 therefore form guide rails for the goods transport device 7 in each travel plane 6. The rear longitudinal members 11 extend horizontally in the x-direction and are secured to the rear posts 9. The storage racks 5 further comprise mutually spaced guide rails 90 lying one above the other 13 extending horizontally in the z-direction and into the storage levels, and each goods receiving carrier 89 is provided with a first guide rail 90 and a second guide rail 90.

The first guide rail 90 and second guide rail 90 are connected to the front longitudinal member 10 and rear longitudinal member 11. The first/second guide rail 90 has a C-shaped cross-section.

The goods receiving carriers 89 extend in a storage level 13 horizontally in the depth direction (z-direction) of the storage rack 5 between the front longitudinal members 10 and rear longitudinal members 11 and the goods 2 are suspended on the goods receiving carriers 89 by means of clothes hangers 4. The goods receiving carriers 89 are disposed in the storage rack 5 in a stationary arrangement, for example on supporting beams extending out from the rear longitudinal members 11 which are screwed to the rear longitudinal members 11 by means of mounting plates. Every goods receiving carrier 89 therefore forms a storage space and a plurality of goods 2 can be stored in a storage space. Accordingly, every storage rack 1 in the storage levels lying one above the other 13 respectively forms a plurality of storage spaces or storage regions adjacent to one another.

As schematically illustrated in FIG. 19b, the storage system 83 may further comprise a delivery station 85 along which the front longitudinal members 10 of every travel plane 6 extend and from which hanging goods 2 to be stored are collected by the goods transport device 88, and a receiving station 86 along which the front longitudinal members 10 of every travel plane 6 extend and at which hanging goods 2 to be removed from stock are deposited by the goods transport device 88.

In this example of an embodiment, the delivery station 85 and receiving station 86 of each storage level 13 have at least one goods receiving carrier 91 and also guide rails 90. If the delivery station 85 and receiving station 86 are disposed on both sides of the goods transport device 88, a goods receiving carrier 91 is disposed in the delivery station 85 of each storage level 13 and a goods receiving carrier 91 is disposed in the receiving station 86 of each storage level 13.

The goods receiving carriers 91 and guide rails 90 of each storage level 13 are displaceable by means of an actuator drive (not illustrated) between a holding position and a depositing position and/or receiving position and dispatching position. In the holding position, a goods transfer device 95 (self-driving warehouse vehicle) is able to travel from the vertical conveyor 87 into the delivery station 85. After that, the goods 2 are transferred from a goods receiving carrier 78 of the warehouse vehicle onto the goods receiving carrier 91 of the delivery station 85. The goods receiving carrier 91 extends parallel with the x-direction in the holding position and parallel with the z-direction in the depositing position. In the dispatching position, a goods transfer device 95 (self-driving warehouse vehicle) is able to travel from the receiving station 86 to the vertical conveyor 87. Beforehand, the goods 2 are transferred from the goods receiving carrier 91 of the receiving station 86 onto the goods receiving carrier 78 of the warehouse vehicle. The goods receiving carrier 91 extends parallel with the x-direction in the dispatching position and parallel with the z-direction in the receiving position. The actuator drive comprises a mounting plate which can be rotated about a vertical axis by means of a drive motor (not illustrated) on which the guide rails 90 and the at least one goods receiving carrier 91 are mounted.

The goods receiving carrier 91 of the receiving and/or delivery station 85, 86 is of the same design as the goods receiving carrier 89 of the storage rack 5 in the embodiment illustrated.

The vertical conveyor 87 connects the storage levels 13 to at least one conveyor system plane and is disposed on the outer longitudinal side of the storage racks 5. The vertical conveyors 18 respectively comprise a guide frame 92, a lifting frame 93 which can be raised and lowered, at least one goods receiving carrier 94 and a goods transfer device 95 (self-driving warehouse vehicle). The at least one goods receiving carrier 94 is disposed on the lifting frame 93 and extends parallel with the x-direction. In the embodiment illustrated, the goods receiving carrier 94 of the vertical conveyor 87 is of the same design as the goods receiving carrier 89 of the storage rack 5. The goods 2 can be conveyed by means of the goods transfer device 95 between the receiving and/or delivery station 85, 86 and the vertical conveyor 87. The lifting frame 93 is equipped with guide rails 96 so that the goods transfer device 95 is able to travel along the guide rails 90, 96 between the receiving and/or delivery station 85, 86 and the vertical conveyor 87. In the embodiment illustrated, the goods transfer device 95 is configured as a self-driving warehouse vehicle (goods-in vehicle) in the delivery station 85 and a self-driving warehouse vehicle (goods-out vehicle) in the receiving station 86 and the warehouse vehicles can be moved relative to the vertical conveyor 87 and receiving and/or delivery station 85, 86 in the x-direction. The warehouse vehicle comprises a base frame, castors, a drive unit and the goods receiving carrier 78. The warehouse vehicle may also have a power storage in order to supply the drive unit and a displacement device for the goods receiving carrier 97 that will be described in more detail below as well as an electronic control system with power. The castors are disposed on the two longitudinal sides of the base frame. The warehouse vehicle is able to travel on the guide rails 90, 96 by means of the castors between the vertical conveyor 87 and the receiving and/or delivery station 85, 86.

The goods receiving carrier 78 is disposed on the warehouse vehicle and is mounted on the base frame so as to be displaceable by means of a displacement device in the y-direction and z-direction (or only in the y-direction). The warehouse vehicle (goods-in vehicle) which is assigned to the goods-in vertical conveyor 87 and the warehouse vehicle (goods-out vehicle) that is assigned to the goods-out vertical conveyor 87 are preferably of an identical design to the storage and retrieval vehicle assigned to the goods transport device 88. In particular, the same displacement device can be used for the goods receiving carriers. The same applies to the drive unit.

The first vertical conveyor 87 adjoins a first conveyor system for transporting goods 2 in and the second vertical conveyor 87 adjoins a second conveyor system for transporting goods 2 out. The first conveyor system and second conveyor system are preferably operated on an automated basis.

FIGS. 18 and 19a illustrate one of the travel planes 6, the goods transport device 88 and storage spaces, each with a goods receiving carrier 89.

Based on this embodiment, the goods transport device 88 is provided in the form of a single-level rack serving device and has a base frame 30, wheels 31 and a drive unit 32 (not illustrated in detail). The wheels 31 are disposed on the two longitudinal sides of the base frame 30. The drive unit 32 may correspond to the embodiment described above. In addition, mutually spaced guide rails 98 are disposed on a bottom face of the goods transport device 88 secured to the base frame 30 and extending parallel with the z-direction.

The goods transport device 88 is also assigned a storage and removal device 99 which, in the embodiment illustrated, comprises a goods displacement means 100 which can be moved relative to the goods transport device 88 in the z-direction.

The goods displacement means 100 is configured as a self-driving storage and retrieval vehicle having a base frame 101, castors 102, a drive unit and a goods receiving carrier 97. The storage and retrieval vehicle may also have a power storage in order to supply the drive unit and a displacement device for the goods receiving carrier 97 that will be described in more detail below as well as an electronic control system with power. The castors 102 are disposed on the two longitudinal sides of the base frame 101. The storage and retrieval vehicle is able to travel on the guide rails 90, 98 by means of the castors 102 between the goods transport device 88 and a storage space or storage region in the storage rack 5 or between the goods transport device 88 and the receiving and/or delivery station 85, 86. The castors 102 form a bogie.

Based on a first embodiment, the drive unit comprises at least one electric drive motor 103 and a continuously circulating traction means (not illustrated) and drive shafts (not illustrated). Attached to the ends of the drive shafts are castors 102. The traction means is guided by a drive section on the drive shafts. In this manner, the two castors 102 on the first side of the storage and retrieval vehicle are driven. The drive shafts transmit the driving torque from the first side to the second side of the storage and retrieval vehicle so that the two castors 102 on the second side are driven.

Based on a second embodiment, it may also be that only one pair of drive wheels is driven, for example the front drive wheel pair or rear drive wheel pair in the direction of travel of the storage and retrieval vehicle.

As may be seen from FIGS. 18, 19*a*, the goods receiving carrier 97 is disposed on the storage and retrieval vehicle and is thus separate from the goods transport device 88, and is mounted on the base frame 101 so as to be displaceable by means of a displacement device 104 in the x-direction and y-direction.

In the embodiment illustrated, the displacement device 104 comprises mounting plates 105 spaced at a distance apart in the z-direction on which respectively a sliding block guide 106 is disposed and a drive motor 107 which is coupled with the goods receiving carrier 97 so as to move with it. The goods receiving carrier 97 is mounted on the sliding block guides 106 so as to be displaceable by means of guide means and can be moved in the x-direction and y-direction between a first end position (right-hand end of the sliding block guides 106) and a second end position (left-hand end of the sliding block guides 106) by operating the drive motor 107 of the goods receiving carrier 97. FIG. 18 illustrates an intermediate position in which the clothes hangers 4 of the goods 2 are in the process of being gripped by the goods receiving carrier 97. When the goods receiving carrier 97 is moved out of the intermediate position into the second end position, the clothes hangers 4 of the goods 2 are lifted off the goods receiving carrier 89 (of either the storage rack 5 or delivery station 85) and transferred to the goods receiving carrier 97 of the storage and retrieval vehicle.

When the goods receiving carrier 97 is moved out of the intermediate position into the first end position, the clothes hangers 4 of the goods 2 are transferred from the goods receiving carrier 97 of the storage and retrieval vehicle to the goods receiving carrier 89 (of either the storage rack 5 or receiving station 86).

Based on another embodiment, although this is not illustrated, the displacement device 104 is configured so that the goods receiving carrier 97 is mounted on the base frame 101 so as to be displaceable exclusively in the y-direction between the first position and second position.

As may also clearly be seen in FIG. 18, the goods receiving carrier 97 has a carrier piece 108 extending in the z-direction which is able to pick up one or more clothes hangers 4. The carrier piece 108 forms a gripper unit by means of which individual ones of the goods 2 or the goods 2 can be moved between the storage space or storage region and the goods transport device 88 or by means of which individual ones of the goods 2 or the goods 2 can be moved between the receiving and/or delivery station 85, 86 and the goods transport device 88.

A horizontal support plane on the goods receiving carrier 97, in particular the carrier piece 108, extends underneath the storage level 13 in the first position and above the storage level 13 in the second position.

A storage operation and a retrieval operation will be described below.

Storage Operation

The goods 2 to be stored are conveyed to the vertical conveyor 87 by means of a first conveyor system (not illustrated). There, the goods 2 are conveyed from the first conveyor system onto the warehouse vehicle (goods-in vehicle) which is provided with the goods receiving carrier. After that, the lifting frame 93 together with the warehouse vehicle is moved vertically to the height of one of the storage levels 13. In addition, the goods receiving carrier 91 and the guide rails 90 in this storage level 13 are moved by means of an actuator drive (not illustrated) into the holding position. After that, the warehouse vehicle together with the goods 2 can be moved from the vertical conveyor 87 into the delivery station 85 (buffer). To this end, the warehouse vehicle travels along the guide rails 90, 96.

When the warehouse vehicle is located in the delivery station 85, the goods receiving carrier is moved by means of the displacement device in the y-direction and z-direction or exclusively in the y-direction and the goods 2 are transferred from the goods receiving carrier onto the goods receiving carrier 91. After that, the warehouse vehicle travels back to the vertical conveyor 87 again and the goods receiving carrier 91 and the guide rails 90 in this storage level 13 are moved into the depositing position.

The goods transport device 88 is positioned in the x-direction in front of the goods receiving carrier 91 so that the goods displacement means 100 (storage and retrieval vehicle) is able to travel along the guide rails 90, 98 in the z-direction between the goods transport device 88 and the delivery station 85. When the goods displacement means 100 is located in the delivery station 85, the goods receiving carrier 97 is moved by means of the displacement device 104 in the x-direction and y-direction or exclusively in the y-direction and the goods 2 are transferred from the goods receiving carrier 91 onto the goods receiving carrier 97.

After that, the goods displacement means 100 (storage and retrieval vehicle) travels back to the goods transport device 88 again.

Thee goods transport device 88 together with the goods displacement means 100 (storage and retrieval vehicle), which carries the goods 2 on the goods receiving carrier 97 with it, is then moved in the x-direction to a defined storage space and positioned in front of a goods receiving carrier 89.

The goods displacement means 100 (storage and retrieval vehicle) can now be moved along the guide rails 90, 98 in the z-direction between the goods transport device 88 and the storage rack 5. When the goods displacement means 100 is located in the storage rack 5, the goods receiving carrier 97 is moved by means of the displacement device 104 in the x-direction and y-direction or exclusively in the y-direction and the goods 2 are transferred from the goods receiving carrier 97 onto the goods receiving carrier 89. After that, the goods displacement means 100 (storage and retrieval vehicle) travels back to the goods transport device 88 again.

As may be seen from the drawings, the goods 2 can be conveyed and placed in storage as hanging goods groups 109 or the goods 2 can be conveyed and placed in storage separately during the storage operation, as described in detail above.

By contrast with the first embodiment of the storage system 1, the hooks of the clothes hangers 4 are not pushed onto the goods receiving carriers 89, 91, 97 but are lifted from the goods receiving carriers 89, 91, 97 and/or lowered onto the goods receiving carriers 89, 91, 97.

Retrieval Operation

To this end, the goods transport device 88 is moved together with the goods displacement means 100 (storage and retrieval vehicle) in the x-direction and positioned in front of one of the goods receiving carriers 89, see FIG. 19a.

After that, the goods displacement means 100 (storage and retrieval vehicle) can be moved along the guide rails 90, 98 in the z-direction between the goods transport device 88 and the storage rack 5, as may be seen in FIG. 20. When the goods displacement means 100 is located in the storage rack 5, the goods receiving carrier 97 is moved by means of the displacement device 104 in the x-direction and y-direction or exclusively in the y-direction and the goods 2 are lifted from the goods receiving carrier 89 and transferred to the goods receiving carrier 97. After that, the goods displacement means 100 (storage and retrieval vehicle) travels back to the goods transport device 88 again, see FIG. 18, 19a.

The goods transport device 88 together with the goods displacement means 100 (storage and retrieval vehicle) which carries the goods 2 on the goods receiving carrier 97 with it, is then moved in the x-direction to the receiving station 15 and positioned in front of a goods receiving carrier 91, see FIG. 19b.

The goods 2 to be retrieved are then transferred from the goods displacement means 100 (storage and retrieval vehicle) to the receiving station 86. To this end, the goods displacement means 100 (storage and retrieval vehicle) travels along the guide rails 90, 98 in the z-direction between the goods transport device 88 and the receiving station 86. When the goods displacement means 100 is located in the receiving station 86, the goods receiving carrier 97 is moved by means of the displacement device 104 in the x-direction and y-direction or exclusively in the y-direction and the goods 2 are transferred from the goods receiving carrier 97 onto the goods receiving carrier 94. After that, the goods displacement means 100 (storage and retrieval vehicle) travels back to the goods transport device 88 again.

The goods receiving carrier 91 and the guide rails 96 of the receiving station 86 are then moved out of a receiving position into a dispatching position. After that, the goods transfer device 95 (warehouse vehicle) travels along the guide rails 91, 96 from the vertical conveyor 87 to the receiving station 86. When the goods transfer device 95 is located in the receiving station 86, the goods receiving carrier 78 is moved by means of the displacement device in the y-direction and z-direction or exclusively in the y-direction and the goods 2 are transferred from the goods receiving carrier 91 onto the goods receiving carrier 78.

After that, the warehouse vehicle together with the goods 2 can be moved out of the receiving station 86 to the vertical conveyor 87.

Finally, the goods 2 are conveyed by means of the second conveyor system 27 (not illustrated) to a picking station or a packing station.

FIGS. 22 and 23 illustrate a goods transport device 110 having a base frame 30, wheels 31, a drive unit 32, a storage and removal device 111 and a goods receiving carrier 34.

The storage and removal device 111 based on this example of an embodiment is a telescopic unit which is arranged on the base frame 30 and can be moved out from an initial position in both z-directions so that goods 2 can be stored in and/or goods 2 can be retrieved from storage racks 5 disposed on both sides of the goods transport device 110. The telescopic unit has a supporting frame 57 and rails 58, 59, 60 which can be retracted and/or moved out horizontally in the z-direction relative to the supporting frame 57, as described above.

By contrast with the embodiment illustrated in FIG. 2, the third rail 60 of the telescopic unit is equipped with a traction drive. The traction drive comprises a traction means 112 which is guided around pulley wheels mounted in the oppositely lying end regions of the third rail 60. One of the pulley wheels 113 is coupled with a drive motor 114. The traction means 112 is a toothed belt, a chain or similar, for example. The drive motor 114 is preferably an electric motor. The traction means 112 is provided with driving members 115 projecting out from the external circumference and disposed at equal distances from one another. The driving members 115 are fixedly connected to the traction means 112. Accordingly, only a single clothes hanger 4 (in the case of winter coats, for example) or several clothes hangers 4 (in the case of summer frocks, for example) can be received between consecutive driving members 115. The telescopic unit together with the traction drive on the third rail 60 constitutes a displacement means 116. The driving members 115 form a gripper unit.

Based on this embodiment, the displacement device for displacing the storage and removal device 111 and/or telescopic unit in the x-direction can be dispensed with.

When goods 2 have to be moved from the goods transport device 110 and placed in storage in the storage rack 5, the goods transport device 110 is positioned in the x-direction so that the goods receiving carrier 34 and goods receiving carrier 12 extend flush with one another. After that, the goods receiving carrier 34 is moved into the first depositing position (see FIG. 13), as described above. During the extraction movement of the displacement means 116 in the z-direction, the traction means 115 is not driven (blocked) so that the clothes hangers 4 between the driving members 115 are pushed from the goods receiving carrier 34 onto the goods receiving carrier 12. The displacement means 116 is then retracted in the z-direction into the initial position and the traction means 115 thus driven synchronously with the retracting movement so that the stored goods 2 remain on the goods receiving carrier 12.

When goods 2 have to be retrieved by the goods transport device 110 in the storage rack 5, the goods transport device 110 is positioned in the x-direction so that the goods receiving carrier 34 and goods receiving carrier 12 extend flush with one another. After that, the goods receiving carrier 34 is moved into the second depositing position (see FIG. 16), as described above. With the displacement of the displacement means of 116 in the z-direction, the traction means 115 is driven in the opposite direction and synchronously with the extracting movement so that the clothes hangers 4 are picked up between the driving members 115. Once the displacement means 116 has been moved out, the traction means 115 is stopped. The displacement means 116 is retracted in the z-direction into the initial position and the traction means 115 is then not driven (blocked) so that the goods 2 to be retrieved are pushed by means of the driving members 115 from the goods receiving carrier 12 onto the goods receiving carrier 34. The driving members 115 thus engage round the clothes hangers 4. In the same manner, the goods 2 are transferred from the delivery station 14 and the goods 2 are passed on to the receiving station 15.

Finally, it should be noted that with the embodiments described above, instead of using single-level rack serving devices as goods transport devices 7; 88, it would also be possible to use (multi-level) storage and retrieval machines which are able to move in the x-direction along guide rails and have a mast extending across all the storage levels 13 on which a base frame which can be raised and lowered is mounted. The storage and removal device 33 (FIG. 2) or storage and removal device 99 (FIG. 18) or storage and removal device 111 (FIG. 22) is disposed on this base frame. Such a storage and retrieval machine is known from EP 2 419 365 B1, for example. Based on another embodiment, such storage and retrieval machines are provided in several travel planes one above the other and each of these storage and retrieval machines services several storage levels 13.

It should also be pointed out that the delivery and receiving stations 14, 15; 85, 86 described above do not necessarily have to be disposed separately and on both sides of the goods transport device 7; 88; 110 but can be configured as a combined delivery and receiving station 14, 15; 85, 86, which serves as a buffer for goods 2 and/or goods groups 109 to be stored and also for goods 2 and/or goods groups to be retrieved. The combined delivery and receiving station is disposed on one side of the goods transport device 7; 88; 110. In this case, the delivery and receiving station may have two goods receiving carriers 16; 91 respectively in the storage levels 13 lying one above the other, in which case a first goods receiving carrier 16; 91 is used for the goods 2 and/or goods groups 109 to be stored and a second goods receiving carrier 16; 91 is used for the goods 2 and/or goods groups 109 to be retrieved. The delivery and receiving stations 14, 15; 85, 86 may also have a first goods receiving carrier 16; 91 for the goods 2 and/or goods groups 109 to be stored and a second goods receiving carrier 16; 91 for the goods 2 and/or goods groups 109 to be retrieved respectively on only one height level. Alternatively, the combined delivery and receiving station 14, 15; 85, 86 may also have a first goods receiving carrier 16; 91 for the goods 2 and/or goods groups 109 to be stored and a second goods receiving carrier 16; 91 for the goods 2 and/or goods groups 109 to be retrieved on only one height level.

Based on the embodiments described above, the goods 2 on the goods receiving carriers 12, 16, 34, 89, 91, 97 each define a hanging plane 77 extending in a direction perpendicular to the longitudinal extension of the goods receiving carriers 12, 16, 34, 89, 91, 97 and the hanging plane 77 therefore extends parallel with the x-direction. A direction of movement for the goods 2 during the receiving and/or deposition movement between the goods receiving carriers 12, 16, 34, 89, 91, 97 extends parallel with the z-direction (indicated by a double arrow in FIG. 1 for example).

FIGS. 24 to 29 illustrate one possible embodiment of a unit load transport device or goods transport device 117 for storing unit loads in the storage rack 5 (FIG. 1) and retrieving unit loads from the storage rack 5 (FIG. 1) in a storage system 1, as described above. The unit loads are hanging goods 2, for example.

As described in detail above, the storage system 1 comprises the storage racks 5 and goods transport devices 117 which can be moved independently of one another in the (horizontal) travel planes 6 lying one above the other in front of the storage racks 5 in a first direction (x-direction). In principle, however, the storage system 1 may also comprise fewer goods transport devices 117 than there are travel planes 6, as also described in detail above. A first guide rail and a second guide rail are provided in every travel plane 6, along which a goods transport device 117 can be moved in the first direction (x-direction). The guide rails are formed by the front longitudinal members 10, for example.

It should also be noted that the storage system may also comprise only one storage rack 5, although this is not illustrated. In this case, only one of the stop devices described below is provided, for example stop device 125*a*, if the storage rack 5 is disposed on the right-hand side of the goods transport device 117 or stop device 125*b* if the storage rack 5 is disposed on the left-hand side of the goods transport device 117. However, the first guide rail and second guide rail are provided in every travel plane 6. In this context, the first guide rails are mounted on the storage rack 5 and the second guide rails are mounted on vertical posts, for example. If, on the other hand, storage racks 5 are provided on both sides of the goods transport device 117 the first guide rail and the second guide rail of each travel plane 6 are secured to the storage racks 5 (for example the front rack posts 8).

As described in detail above, the goods transport device 117 based on this embodiment is provided in the form of a single-level rack serving device and has a base frame 30, wheels 31*a*, 31*b*, a drive unit 32, a storage and removal device 33 and a goods receiving carrier 34. Reference may be made in particular to the description of the base frame 30, drive unit 32, storage and removal device 33 and goods receiving carrier 34.

The base frame 30 forms oppositely lying longitudinal sides and one of the longitudinal sides forms a first longitudinal side 118*a* and one of the longitudinal sides forms a second longitudinal side 118*b*. The wheels are disposed on both longitudinal sides 118*a*, 118*b* of the base frame 30, the wheels on the first longitudinal side 118*a* constituting first wheels 31*a* and the wheels on the second longitudinal side 118*b* constituting second wheels 31*b*.

The storage and removal device, for example storage and removal device 33 based on the first embodiment described above, comprises the goods displacement means 42 which can be moved relative to the base frame 30 in a second direction (z-direction) perpendicular to the first direction (x-direction) in order to store the unit loads in the storage rack 5 in depth positions lying one behind the other and/or to retrieve the unit loads from the storage rack 5 from depth positions lying one behind the other. The storage and removal device 33, as may be seen from FIGS. 4, 6 and 14 and as specifically described above, is provided in the form of a telescopic unit which is mounted on the base frame 30 and can be moved out from an initial position in both z-directions so that unit loads can be stored in and/or unit loads can be retrieved from storage racks 5 disposed on both sides of the goods transport device 117. The telescopic unit has a supporting frame 57 and rails 58, 59, 60 which can be horizontally retracted and moved out relative to the supporting frame 57 in the z-direction. The telescopic unit constitutes the goods displacement means 42.

As may be seen from FIGS. 24, 27*a*, 27*b*, the first wheels 31*a* are mounted on the base frame 30 so as to be rotatable (about horizontal axes) on the first longitudinal side 118*a* and lie so as to roll on a first guide 119*a* and the second wheels 31*b* on the base frame 30 are mounted so as to be rotatable (about horizontal axes) on the second longitudinal side 118*b* and lie so as to roll on a second guide 119*b*. The first guide 119*a* is provided on the first guide rail 10*a* and extends parallel with the longitudinal direction of the first storage rack 5 and in a guide plane extending parallel with the travel plane 6. In the embodiment illustrated, the guide rail 10*a* is formed by the front longitudinal member. A stop surface 120*a* is also provided on the first guide rail 10*a*. The stop surface 120a extends parallel with the travel plane 6 or guide plane. The second guide 119b is provided on the second guide rail 10b and extends parallel with the longitudinal direction of the second storage rack 5 and in a guide plane extending parallel with the travel plane 6. In the embodiment illustrated, the guide rail 10b is formed by the front longitudinal member. A stop surface 120b is also provided on the second guide rail 10b. The stop surface 120b extends parallel with the travel plane 6 or guide plane.

In detail, the first/second guide rail 10a, 10b comprises a first guide leg 121, a second guide leg 122 and a mounting leg 123, see FIG. 28 illustrating the first guide rail 10a. A profile leg 124 may optionally also be provided. The mounting leg 123 is formed by a vertical bottom profile leg and a top profile leg angled with respect to it in the direction towards the first guide leg 121. The first guide leg 121 forms the horizontal guide 119a, 119b or horizontal running surface on a top face directed towards the wheels 31a, 31b and the stop surface 120a, 120b on a bottom face remote from the wheels 31a, 31b. The second guide leg 122 forms mutually opposite vertical guide surfaces on which guide wheels of a guide device, not illustrated, lie so as roll, as described in AT 516 410 B1 for example. The mounting leg is provided with mounting bores in a spaced arrangement in the longitudinal direction of the first/second guide rails 10a, 10b to enable the first/second guide rails 10a, 10b to be mounted on the first/second storage rack 5 and/or the front rack posts 8.

It should be pointed out that the first/second guide rail 10a, 10b may also have a different cross-sectional shape. Within the meaning of the invention, it is of advantage if the guide 119a, 119b and the stop surface 120a, 120b are provided on the guide rail 10a, 10b. The stop surface 120a, 120b is located separately from the guide 119a, 119b and extends in the first direction (x-direction) parallel with the guide plane or travel plane 6.

As may be seen in FIGS. 25 to 29, the goods transport device 117 further comprises stop devices 125a, 125b, by contrast with the embodiments described above (illustrated in FIGS. 4 and 22).

A first stop device 125a is arranged on the base frame 30 on a second longitudinal side 118b lying opposite the first longitudinal side 118a. The first stop device 125a comprises at least one stop element 126a which co-operates with the stop surface 120b on the second guide rail 10b in such a way that a tipping movement of the goods transport device 117 about the wheels 31a disposed on the first longitudinal side 118a is prevented or limited when the goods displacement means 42 (illustrated in FIG. 4) or the goods displacement means 116 (illustrated in FIG. 22) is moved out in the second direction (positive z-direction) and projects out from the first longitudinal side 118a, as may be seen in FIG. 27a.

A second stop device 125b is arranged on the base frame 30 on a first longitudinal side 118a lying opposite the second longitudinal side 118b. The second stop device 125b comprises at least one stop element 126b which co-operates with the stop surface 120a on the first guide rail 10a in such a way that a tipping movement of the goods transport device 117 about the wheels 31b disposed on the second longitudinal side 118b is prevented or limited when the goods displacement means 42 (illustrated in FIG. 4) or the goods displacement means 116 (illustrated in FIG. 22) is moved out in the second direction (negative z-direction) and projects out from the second longitudinal side 118b, as may be seen in FIG. 27b.

FIG. 28 illustrates one of the stop devices, namely the second stop device 125b, in detail. The reference numbers for both the first stop device 125a and the second stop device 125b are shown in FIG. 29. The first stop device 125a and/or second stop device 125b comprises a supporting frame 127a, 127b mounted on the base frame 30 and the stop element 126a, 126b is configured as a stop wheel. The stop wheel is mounted on the supporting frame 127a, 127b and forms a pivot axis extending parallel with a respective pivot shaft of the wheels 31a, 31b.

The stop wheel of the first stop device 125a is assigned to one of the wheels 31b disposed on the second longitudinal side 118b, the stop wheel and this wheel 31b being disposed at a mutual distance 128 one above the other 128, as illustrated in FIG. 26. The stop wheel of the second stop device 125b is assigned to one of the wheels 31a disposed on the first longitudinal side 118a, the stop wheel and this wheel 31a being disposed at a mutual distance 128 one above the other, as illustrated in FIG. 25.

As indicated by broken lines in FIG. 25, the second stop device 125b may have an additional stop element 126b which co-operates with the stop surface 120a on the first guide rail 10a (FIG. 27b) in such a way that a tipping movement of the goods transport device 117 about the wheels 31b disposed on the second longitudinal side 118b is prevented or limited when the goods displacement means 42 (illustrated in FIG. 4) or the goods displacement means 116 (illustrated in FIG. 22) is moved out in the second direction (negative z-direction) and projects out from the second longitudinal side 118b. The additional stop element 126b is configured as a stop wheel. The stop wheel is mounted on the supporting frame 127b and forms a pivot axis extending parallel with a respective pivot shaft of the wheels 31a. The stop wheel is assigned to the other one of the wheels 31a disposed on the first longitudinal side 118a, the stop wheel and this wheel 31a being disposed at a mutual distance 128 one above the other.

As indicated by broken lines in FIG. 26, the first stop device 125a may have an additional stop element 126a which co-operates with the stop surface 120b on the second guide rail 10b (FIG. 27a) in such a way that a tipping movement of the goods transport device 117 about the wheels 31a disposed on the first longitudinal side 118a is prevented or limited when the goods displacement means 42 (illustrated in FIG. 4) or the goods displacement means 116 (illustrated in FIG. 22) is moved out in the second direction (positive z-direction) and projects out from the first longitudinal side 118a. The additional stop element 126a is configured as a stop wheel. The stop wheel is mounted on the supporting frame 127a and forms a pivot axis extending parallel with a respective pivot shaft of the wheels 31b. The stop wheel is assigned to the other one of the wheels 31b disposed on the second longitudinal side 118b, the stop wheel and this wheel 31b being disposed at a mutual distance 128 one above the other.

The stop wheel preferably comprises an elastically flexible tread, in particular made from plastic, such as polyurethane. Due to its elastic property, the tread is basically suitable for compensating for irregularities to a limited degree, although the tread should not be too soft as otherwise wear would be too high.

FIGS. 30a, 30b and 31 illustrate a second embodiment for stop devices 130a, 130b, such as may be used with the unit load transport device or goods transport device 117 described above.

A first stop device 130a is arranged on the base frame 30 on a second longitudinal side 118b lying opposite the first longitudinal side 118a. The first stop device 130a comprises at least one stop element 131a which co-operates with the stop surface 120b on the second guide rail 10b so as to prevent or limit a tipping movement of the goods transport device 117 about the wheels 31a disposed on the first longitudinal side 118a when the goods displacement means 42 (illustrated in FIG. 4) or the goods displacement means 116 (illustrated in FIG. 22) is moved out in the second direction (positive z-direction) and projects out from the first longitudinal side 118a, as illustrated in FIG. 30a.

A second stop device 130b is arranged on the base frame 30 on a first longitudinal side 118a lying opposite the second longitudinal side 118b. The second stop device 130b comprises at least one stop element 131b which co-operates with the stop surface 120a on the first guide rail 10a so as to prevent or limit a tipping movement of the goods transport device 117 about the wheels 31b disposed on the second longitudinal side 118b when the goods displacement means 42 (illustrated in FIG. 4) or the goods displacement means 116 (illustrated in FIG. 22) is moved out in the second direction (negative z-direction) and projects out from the second longitudinal side 118b, as illustrated in FIG. 30b.

FIG. 31 illustrates one of the stop devices, namely the second stop device 130b in detail. The first stop device 130a and/or second stop device 130b comprises the stop element 131a, 131b mounted on the base frame 30 which is configured as a stop bracket. As may be seen from this drawing, the stop surface 120a (120b) is disposed on the second guide leg 122. The stop surface 120a (120b) is located separately from the guide 119a (119b) and extends in the first direction (x-direction) parallel with the guide plane or travel plane 6.

Although not illustrated, the first stop device 130a may comprise an additional stop element 131a on the second longitudinal side 118b and/or the second stop device 130b may comprise an additional stop element 131b on the first longitudinal side 118a.

The stop bracket of the first stop device 130a is assigned to one of the wheels 31b disposed on the second longitudinal side 118b, the stop bracket and this wheel 31b being disposed at a mutual distance 128 one above the other. The stop bracket of the second stop device 130b is assigned to one of the wheels 31a disposed on the first longitudinal side 118a, the stop bracket and this wheel 31a being disposed at a mutual distance 128 one above the other.

As may be seen from FIGS. 28 and 31, the stop element 126a, 126b; 131a, 131b (and optionally the additional stop element 126a, 126b; 131a, 131b) is disposed with its engaging surface 129 at a slight distance from the stop surface 120a, 120b. The distance is up to 3 mm, for example. In other words, the stop element 126a, 126b; 131a, 131b (and optionally the additional stop element 126a, 126b; 131a, 131b) does not lie against the stop surface 120a, 120b during the travelling movement of the goods transport device 117 in the x-direction.

Alternatively, however, it would also be possible for the stop element 126a, 126b; 131a, 131b to lie with its engaging surface 129 against the guide rail 10a, 10b on the stop surface 120a, 120b. If the stop element 126a, 126b is a stop wheel, it lies on the stop surface 120a, 120b in a rolling manner during the travelling movement of the goods transport device 117 in the x-direction. If the stop element 131a, 131b is a stop bracket, it lies on the stop surface 120a, 120b in a sliding manner during the travelling movement of the goods transport device 117 in the x-direction.

The embodiment in which the stop element 126a, 126b is a stop wheel is predominantly used if a goods transport device 7 is moved between travel planes 6 by means of a lifting device (not illustrated). Such a lifting device is known from WO 2012/106745 A1, for example. In this instance, the goods transport device 117 is transported by means of a receiving device that can be moved vertically relative to the travel planes 6. The receiving device comprises guide rails disposed parallel with the guide rails 10a, 10b. When the receiving device is positioned on one of the travel planes 6, the guide rails extend on the receiving device in the extension to the guide rails 10a, 10b in the aisle between the storage racks 5. The guide rails on the receiving device and the guide rails 10a, 10b in the aisle are provided with the same profiled cross-section.

Although the guide rails are positioned on the receiving device relative to the guide rails 10a, 10b in every travel plane 6 with a sufficiently high accuracy, a deviation of a few millimeters in the positioning cannot be ruled out. The deviation in positioning results in an increment (difference in height) between the guide rails on the receiving device and the guide rails 10a, 10b of each travel plane 6. On the other hand, there may be an increment (difference in height) between guide rails if two first guide rails are disposed one after the other and mutually facing rail ends are connected to one another by screws for example and/or two second guide rails are disposed one after the other and mutually facing rail ends are connected to one another by screws for example.

The stop wheel is able to travel across this increment (difference in height) between the guide rails of up to a few millimeters unhindered.

In this respect, it is of advantage if the stop wheel comprises an elastically flexible tread. The elastically flexible tread thus constitutes the engaging surface 129. If it is necessary to make allowance for a bigger increment (difference in height) between the guide rails on the receiving device and the guide rails 10a, 10b of each travel plane 6, it may be of advantage if the stop wheel is disposed at a slight distance from the stop surface 120a, 120b, as described above.

The embodiment in which the stop element 131a, 131b is a stop bracket is predominantly used if each travel plane 6 is provided with a goods transport device 117. If the stop bracket is provided with an elastically flexible facing, for example a low-wear plastic layer constituting the engaging surface 129 (as indicated by broken lines in FIG. 31), tolerance deviations on the stop surfaces 120a, 120b of the guide rails 10a, 10b can also be compensated.

Finally, it should be pointed out that instead of the embodiments illustrated in FIGS. 24 to 31, storage and removal devices and goods displacement means other than those illustrated may also be used. For example, the storage and removal device may be based on an embodiment known from AT 516 410 A4. Based on this embodiment, the storage rack comprises transverse members in the storage levels lying one above the other extending between the front longitudinal members and rear longitudinal members which form storage surfaces on which the unit loads may be placed. It should also be noted that the unit loads may also be containers, boxes or packaging units (packages) which are manipulated by the goods transport device (and storage and removal device) and stored on the storage surfaces.

The embodiments illustrated as examples represent possible variants of the storage system, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

Furthermore, individual features or combinations of features from the different embodiments illustrated and described may be construed as independent inventive solutions or solutions proposed by the invention in their own right.

Above all, the individual embodiments illustrated in FIGS. 1 to 31 may be construed as the subject matter of independent inventive solutions.

For the sake of good order, finally, it should be pointed out that, in order to provide a clearer understanding of the structure of the storage system and the goods transport device, they and their constituent parts are illustrated to a certain extent out of scale and/or on an enlarged scale and/or on a reduced scale.

LIST OF REFERENCE NUMBERS

1 Storage system
2 Goods
3 Goods distribution system
4 Clothes hanger
5 Storage rack
6 Travel plane
7 Goods transport device
8 Front rack post
9 Rear rack post
10 Front longitudinal member
11 Rear longitudinal member
12 Goods receiving carrier
13 Storage level
14 Delivery station
15 Receiving station
16 Goods receiving carrier
17
18 Vertical conveyor
19 Mounting plate
20 Storage/retrieval movement
21 Guide frame
22 Lifting frame
23 Goods receiving carrier
24 Goods transfer device
25 Goods receiving carrier
26 Conveyor system (goods-in)
27 Conveyor system (goods-out)
28 Traction drive
29 Drive motor
30 Base frame
31 Wheel
32 Drive unit
33 Storage and removal device
34 Goods receiving carrier
35 Drive motor
36 Drive wheel
37 Guide pulley
38 Guide wheel
39 Traction means
40 Drive shaft
41 Drive section
42 Goods displacement means
43 Displacement device
44 Pivot lever 45 Pivot shaft
46 Toothed belt
47 Drive motor
48 Support plane
49 Supporting leg
50 Front edge
51 Front edge
52 Profile leg
53 Profile leg
54 Profile leg
55 Mounting leg
56 Notch
57 Supporting frame
58 Rail
59 Rail
60 Rail
61 Guide arrangement
62 Guide arrangement
63 Guide arrangement
64 Drive means
65 Drive means
66 Drive motor
67 Belt
68 Belt
69 Belt
70 Belt
71 Driving member
72 Engaging surface
73 Guide
74 Traction means
75 Drive shaft
76 Drive motor
77 Hanging plane
78 Goods receiving carrier
79 Goods locking means
80 Actuator drive
81 Lock finger
82 Retaining arm
83 Storage system
84 Goods distribution system
85 Delivery station
86 Receiving station
87 Vertical conveyor
88 Goods transport device
89 Goods receiving carrier
90 Guide rail
91 Goods receiving carrier
92 Guide frame
93 Lifting frame
94 Goods receiving carrier
95 Goods transfer device
96 Guide rail
97 Goods receiving carrier
98 Guide rail
99 Storage and removal device
100 Goods displacement means
101 Base frame
102 Castor
103 Drive motor
104 Displacement device
105 Mounting plate
106 Sliding block guide
107 Drive motor
108 Carrier piece
109 Hanging goods group
110 Goods transport device
111 Storage and removal device
112 Traction means
113 Guide pulley
114 Drive motor
115 Driving member
116 Goods displacement means
117 Goods transport device
118 Longitudinal side 119 Guide
120 Stop surface
121 Guide leg
122 Guide leg
123 Mounting leg
124 Profile leg
125 Stop device
126 Stop element
127 Supporting frame
128 Distance
129 Engaging surface
130 Stop device
131 Stop element

The invention claimed is:

1. A method for storing hanging goods on clothes hangers in an automated storage system comprising a stationary storage rack with storage regions for the hanging goods in storage levels lying one above the other, and a goods transport device having a base frame which is displaceable in front of the storage rack in a first direction, and at least one storage and removal device having a goods displacement device which is displaceable relative to the base frame in a second direction perpendicular to the first direction, whereby a hanging good of the hanging goods is moved via the goods displacement device between a goods receiving carrier assigned to a storage region of the storage regions and a goods receiving carrier assigned to the goods transport device, and wherein the goods receiving carriers in the storage regions remain in the storage rack, wherein
the goods receiving carriers are oriented parallel with the second direction and the hanging goods on the goods receiving carriers each define a hanging plane extending in a direction perpendicular to the goods receiving carriers; and
a gripper unit is mounted on the goods displacement device and the gripper unit grips a clothes hanger of the clothes hangers and can move a hanging good of the hanging goods between the goods receiving carriers and on the goods receiving carriers.

2. The method according to claim 1, wherein prior to being stored in the storage rack, the hanging goods are received by a goods receiving carrier at a delivery station and, after having been retrieved from the storage rack are deposited to a goods receiving carrier at a receiving station, and during the receiving and/or deposition operation the hanging goods are moved via the goods displacement device between the goods receiving carrier assigned to the goods transport device and the goods receiving carrier assigned to the delivery and/or receiving station, and the goods receiving carrier at the delivery and/or receiving station remains in the delivery and/or receiving station.

3. The method according to claim 2, wherein the hanging goods on the goods receiving carriers of the delivery and/or receiving station also each define a hanging plane which extends in a direction perpendicular to the goods receiving carriers.

4. The method according to claim 2, wherein a direction of movement for the hanging goods during the receiving and/or deposition movement between the goods receiving carriers extends parallel with the second direction.

5. The method according to claim 2, wherein the goods displacement device grips a plurality of clothes hangers by via the gripper unit and can move a plurality of the hanging goods as a hanging goods group between the goods receiving carriers assigned to the goods transport device and the delivery and/or receiving station.

6. The method according to claim 2, wherein a plurality of the gripper units are mounted on the goods displacement device, and the goods displacement device with each of the gripper units grips a clothes hanger and can move the hanging goods separately between the goods receiving carriers assigned to the goods transport device and the delivery and/or receiving station and on the goods receiving carriers.

7. The method according to claim 2, wherein the hanging goods are transported between the delivery and/or receiving station and the goods transport device and on the goods transport device as a hanging goods group.

8. An automated storage system for hanging goods on clothes hangers, comprising:
a stationary storage rack having storage regions for the hanging goods disposed in storage levels lying one above the other;
a goods transport device having a base frame which can be moved in front of the storage rack in a first direction;
a goods receiving carrier assigned to the goods transport device and arranged on the base frame;
goods receiving carriers assigned to the storage regions;
at least one storage and removal device having a goods displacement device which can be moved relative to the base frame in a second direction perpendicular to the first direction, wherein the goods displacement device moves the hanging goods between a goods receiving carrier of the goods receiving carriers assigned to a storage region of the storage regions and the goods receiving carrier assigned to the goods transport device, and the goods receiving carriers assigned to the storage regions remain in the storage rack and are fixedly connected to the storage rack,
wherein
the goods receiving carriers are oriented parallel with the second direction and the hanging goods on the goods receiving carriers each define a hanging plane which extends in a direction perpendicular to the goods receiving carriers; and
wherein the goods displacement device is displaceable relative to the goods carriers in the second direction and is provided with a gripper unit, and the gripper unit grips a clothes hanger of the clothes hangers and can move a hanging good of the hanging goods between the goods receiving carriers and on the goods receiving carriers.

9. Automated storage system according to claim 8, wherein the storage system adjoins a goods distribution system and has
a delivery station at which hanging goods to be stored can be collected by the goods transport device; and
a receiving station at which hanging goods to be removed from stock can be deposited;
wherein the delivery station is equipped with at least one goods receiving carrier and/or the receiving station is equipped with at least one goods receiving carrier; and
during the receiving and/or deposition operation, the hanging goods are moved via the storage and removal device between the goods receiving carrier assigned to the goods transport device and the goods receiving carrier assigned to the delivery and/or receiving station.

10. The automated storage system according to claim 9, wherein the at least one goods receiving carrier assigned to the delivery station and/or the at least one goods receiving carrier assigned to the receiving station is also disposed parallel with the second direction and the hanging goods on the goods receiving carrier each define a hanging plane extending in a direction perpendicular to the goods receiving carrier.

11. The automated storage system according to claim 9, wherein the goods displacement device is displaceable relative to the goods receiving carrier assigned to the delivery and/or receiving station in the second direction and is provided with a gripper unit which grips a clothes hanger of the clothes hangers and can move a hanging good of the hanging goods between the delivery station and the goods transport device and/or between the receiving station and the goods transport device and on the goods receiving carriers.

12. The automated storage system according to claim 8, wherein the goods displacement device comprises at least one telescopic unit with a supporting frame arranged on the base frame and rails displaceable relative to the supporting frame, and the rail with the biggest range of motion is provided with the gripper unit, wherein the gripper unit comprises an outer gripper unit at its oppositely lying end regions, which are each displaceable between an initial position in which the gripper unit is retracted from a clothes hanger of the clothes hangers and an operating position in which the gripper unit can grip a clothes hanger of the clothes hangers.

13. The automated storage system according to claim 12, wherein the gripper unit further comprises inner gripper units between the outer gripper units, and the inner gripper units are each displaceable between an initial position in which the gripper unit is retracted from a clothes hanger of the clothes hangers and an operating position in which the gripper unit can grip a clothes hanger of the clothes hangers.

14. The automated storage system according to claim 8, wherein the goods displacement device comprises at least one telescopic unit with a supporting frame arranged on the base frame and rails displaceable relative to the supporting frame, and the rail with the biggest range of motion is equipped with a traction device which is coupled with a drive and on which gripper units of the gripper unit are disposed at a mutual distance, and the gripper units are each able to grip at least one clothes hanger.

15. The automated storage system according to claim 8, wherein the goods transport device is a single-level rack serving device and the storage system has a number of single-level rack serving devices, and each single-level rack serving device is provided with the storage and removal device and the single-level rack serving device of a storage level services the storage regions in this storage level.

16. An automated storage system for unit loads, comprising:
   at least one storage rack having storage regions for the unit loads disposed in storage levels lying one above the other;
   guide rails each forming a guide and being disposed in travel planes lying one above the other, and the guides extend parallel with the longitudinal direction of the at least one storage rack and in a guide plane extending parallel with the travel plane, some of which guide rails form first guide rails and some of which guide rails form second guide rails, and the first guide rail (10a) and/or the second guide rail of each travel plane has a stop surface spatially separate from the guide; and
   a goods transport device for storing unit loads in the at least one storage rack and retrieving unit loads from the at least one storage rack which are displaceable along the guide rails in a first direction, and the goods transport device comprises:
   a base frame having mutually opposite longitudinal sides, one of which longitudinal sides forms a first longitudinal side and one of which longitudinal sides forms a second longitudinal side;
   first wheels which lie so as to roll on the guide on the first guide rail and are mounted on the base frame on the first longitudinal side, and second wheels which lie so as to roll on the guide on the second guide rail and are mounted on the base frame on the second longitudinal side;
   a first stop device on the base frame which forms at least one stop element disposed between the second guide rail and the base frame; and
   at least one storage and removal device having a goods displacement device displaceable relative to the base frame in a second direction perpendicular to the first direction in order to store unit loads in the at least one storage rack in depth positions lying one behind the other and retrieve unit loads from the at least one storage rack from depth positions lying one behind the other;
   wherein the at least one stop element forms an engaging surface and is disposed with the latter at a slight distance from the stop surface and which co-operates with the stop surface on the second guide rail in such a way that a tipping movement of the goods transport device about the wheels disposed on a first longitudinal side is limited when the goods displacement device is moved out in the second direction and projects out from the first longitudinal side.

17. The automated storage system according to claim 16, wherein a second stop device is arranged on the base frame which acts as at least one stop element disposed between the first guide rail and the base frame and which co-operates with a stop surface on the first guide rail in such a way that a tipping movement of the goods transport device about the wheels disposed on a second longitudinal is limited when the goods displacement device is moved out in the second direction and projects out from the second longitudinal side.

18. The automated storage system according to claim 16, wherein the first stop device and/or second stop device comprises a supporting frame mounted on the base frame and the stop element is configured as a stop wheel which is mounted on the supporting frame and forms a rotational axis extending parallel with a respective rotational axis of the wheels.

19. The automated storage system according to claim 16, wherein the stop element of the first stop device and/or second stop device is configured as a stop bracket arranged on the base frame.

20. The automated storage system according to claim 16, wherein the stop element is assigned to one of the wheels of each longitudinal side, the stop element and this wheel being disposed at a mutual distance one above the other.

21. The method according to claim 1, wherein the goods displacement device grips one of the clothes hangers via the gripper unit and can move one of the hanging goods between the goods receiving carriers.

22. The method according to claim 1, wherein the goods displacement device grips a plurality of the clothes hangers via the gripper unit and can move a plurality of the hanging goods as a hanging goods group between the goods receiving carriers.

23. The method according to claim 1, wherein a plurality of gripper units are mounted on the goods displacement device, and the goods displacement device with each of the gripper units grip a clothes hanger and can move the hanging goods separately between the goods receiving carriers and on the goods receiving carriers.

24. The method according to claim 23, wherein the goods displacement device with each of the gripper units grip a plurality of the clothes hangers and can move the hanging goods as a hanging goods group between the goods receiving carriers.

25. The method according to claim 1, wherein the hanging goods in the respective storage region are stored on the goods receiving carriers as separated hanging goods groups.

26. The method according to claim 1, wherein the hanging goods are transported between a storage region of the storage regions and the goods transport device as well as on the goods transport device as a hanging goods group.

27. The method according to claim 2, wherein the goods displacement device grips one of the clothes hangers via the gripper unit and can move one of the hanging goods between the goods receiving carriers assigned to the goods transport device and the delivery and/or receiving station.

28. The method according to claim 6, wherein the goods displacement device with each of the gripper units grip a plurality of the clothes hangers and can move the hanging goods as a hanging goods group between the goods receiving carriers.

29. The automated storage system according to claim 8, wherein the goods displacement device is provided with a plurality of gripper units, wherein the goods displacement device with each of the gripper units grip a clothes hanger and can move the hanging goods separately between the goods receiving carriers and on the goods receiving carriers.

30. The automated storage system according to claim 9, wherein the goods displacement device is displaceable relative to the goods receiving carrier assigned to at least one of the delivery and the receiving station in the second direction and is provided with a plurality of gripper units which grip a clothes hanger and can move the hanging goods separately between the delivery station and the goods transport device and/or between the receiving station and the goods transport device and on the goods receiving carriers.

31. An automated storage system for hanging goods, comprising:
   at least one storage rack having storage regions for the hanging goods disposed in storage levels lying one above the other, the at least one storage rack comprises goods receiving carriers assigned to the storage regions;
   guide rails being disposed in travel planes lying one above the other and extend parallel with the longitudinal direction of the at least one storage rack, wherein the guide rails comprise a first guide rail and a second guide rail in each travel plane;
   a number of single-level rack serving devices for storing hanging goods in the at least one storage rack and retrieving hanging goods from the at least one storage rack and which are displaceable along the guide rails in a first direction, wherein each of the single-level rack serving devices comprises:
      a base frame having mutually opposite longitudinal sides, one of which longitudinal sides forms a first longitudinal side and one of which longitudinal sides forms a second longitudinal side;
      first wheels which lie so as to roll on the first guide rail and are mounted on the base frame on the first longitudinal side, and second wheels which lie so as to roll on the second guide rail and are mounted on the base frame on the second longitudinal side;
      a goods receiving carrier arranged on the base frame;
      at least one storage and removal device having a goods displacement device which can be moved relative to the base frame in a second direction perpendicular to the first direction, wherein the goods displacement device moves at least one hanging good of the hanging goods between a goods receiving carrier of the goods receiving carriers assigned to a storage region of the storage regions and the goods receiving carrier assigned to a single-level rack serving device of the single-level rack serving devices,
   a delivery station having goods receiving carriers in the storage levels lying one above the other and at which one or more hanging goods can be picked up by a single-level rack serving device of the single-level rack serving devices; and
   a receiving station having goods receiving carriers in the storage levels lying one above the other and at which one or more hanging goods can be deposited by a single-level rack serving device of the single-level rack serving devices;
   wherein during at least one of a picking and a deposition operation, at least one hanging good of the hanging goods can be moved via the at least one storage and removal device between the goods receiving carrier assigned to the single-level rack serving device and the goods receiving carrier assigned to at least one of the delivery station and the receiving station;
   the goods receiving carriers assigned to the storage regions, the goods receiving carriers assigned to the delivery and receiving stations and the goods receiving carriers assigned to each of the single-level rack serving devices are oriented parallel with the second direction and the hanging goods on the aforesaid goods receiving carriers each define a hanging plane which extends in a direction perpendicular to the goods receiving carriers.

32. The automated storage system according to claim 31, wherein the hanging goods each hang on a clothes hanger.

33. The automated storage system according to claim 32, wherein the goods displacement device is displaceable relative to a goods receiving carrier of the goods receiving carriers assigned to the storage regions or assigned to the delivery and receiving stations in the second direction and is provided with a gripper unit which grips a clothes hanger and can move a hanging good of the hanging goods between the goods receiving carriers and on the goods receiving carriers.

34. The automated storage system according to claim 31, wherein the delivery station and the receiving station are separate delivery and receiving stations which are disposed on both sides of the single-level rack serving devices.

35. The automated storage system according to claim 31, wherein the delivery station and the receiving station comprise a combined delivery and receiving station which is disposed on one side of the single-level rack serving devices.

* * * * *

UNITED STATES PATENT AND TRADEMARK OFFICE
CERTIFICATE OF CORRECTION

PATENT NO. : 10,710,802 B2
APPLICATION NO. : 15/766135
DATED : July 14, 2020
INVENTOR(S) : Grosse et al.

Page 1 of 1

It is certified that error appears in the above-identified patent and that said Letters Patent is hereby corrected as shown below:

In the Claims

In Claim 5, Line 2 (Column 35, Line 63), after "hangers" please delete "by".

Signed and Sealed this
Eighteenth Day of August, 2020

Andrei Iancu
*Director of the United States Patent and Trademark Office*